US010130892B2

(12) United States Patent
Chesser et al.

(10) Patent No.: US 10,130,892 B2
(45) Date of Patent: Nov. 20, 2018

(54) MODULAR CONSTRUCTION PRODUCTS AND METHOD OF ASSEMBLY THEREOF

(71) Applicants: William R. Chesser, Fayetteville, AR (US); Jeremy Lehrman, Lawrence, KS (US)

(72) Inventors: William R. Chesser, Fayetteville, AR (US); Jeremy Lehrman, Lawrence, KS (US)

( * ) Notice: Subject to any disclaimer, the term of this patent is extended or adjusted under 35 U.S.C. 154(b) by 326 days.

(21) Appl. No.: 14/440,009

(22) PCT Filed: Oct. 31, 2013

(86) PCT No.: PCT/US2013/067801
§ 371 (c)(1),
(2) Date: Apr. 30, 2015

(87) PCT Pub. No.: WO2014/071036
PCT Pub. Date: May 8, 2014

(65) Prior Publication Data
US 2015/0298018 A1    Oct. 22, 2015

Related U.S. Application Data

(60) Provisional application No. 61/720,536, filed on Oct. 31, 2012.

(51) Int. Cl.
*A63H 33/04* (2006.01)
*F16B 5/06* (2006.01)
(Continued)

(52) U.S. Cl.
CPC ........... *A63H 33/04* (2013.01); *A63H 33/101* (2013.01); *F16B 2/243* (2013.01); *F16B 5/0642* (2013.01); *F16B 12/26* (2013.01)

(58) Field of Classification Search
CPC .. A63H 33/101; A63H 33/106; A63H 33/062; A63H 33/08; A63H 33/105;
(Continued)

(56) References Cited

U.S. PATENT DOCUMENTS 559,924 A  *  5/1896  Arnold ..................... F16B 2/065
                                                 279/104
1,344,596 A  *  6/1920  Schaefer ............... F16B 21/086
                                                 411/479
(Continued)

FOREIGN PATENT DOCUMENTS

DE          1603337 A1      5/1970
DE       295 12 467 U1     10/1995
(Continued)

OTHER PUBLICATIONS

Kannan, S., et al., "VStore++: Virtual Storage Services for Mobile Devices", International Workshop on Mobile Computing and Clouds (MobiCloud2010), Center for Experimental Research in Computer Systems, Georgia Institute of Technology, Oct. 28, 2010.
(Continued)

*Primary Examiner* — Ryan D Kwiecinski
*Assistant Examiner* — Matthew J Gitlin
(74) *Attorney, Agent, or Firm* — Arent Fox LLP

(57) ABSTRACT

A modular construction system and method of assembly designed to provide the user with the flexibility to build a wide array of customized buildings and other similar items, while offering lifelike detail of construction materials in those items. The system and method include a number of stackable unique part shapes which may be used in different orientations to construct a building, partial building, sculpture, or other item. The pieces have an integrated system for attaching to one another, which is designed so that pieces may be oriented a number of different ways relative to one
(Continued)

another, for example, in order to minimize the chance of pattern repetition in the texture of the walls of the final structure. The structural pieces of the product may contain only female receptacles for attachment. Attachment may be accomplished by inserting a double ended male piece into each of two abutting female receptacles.

8 Claims, 77 Drawing Sheets
(77 of 77 Drawing Sheet(s) Filed in Color)

(51) Int. Cl.
  *F16B 12/26* (2006.01)
  *F16B 2/24* (2006.01)
  *A63H 33/10* (2006.01)
(58) Field of Classification Search
  CPC ...... A63H 33/04; A63H 33/10; A63H 33/107; A63H 33/108; F16B 12/26; F16B 2/20; F16B 2/22; F16B 2/243; F16B 5/06; F16B 5/0607; F16B 5/0642; F16B 2005/0678; F16B 5/12; F16B 5/125; F16B 21/086; F16B 21/082; Y10T 403/335; Y10T 403/342; Y10T 24/44026
  USPC ....... 403/361; 52/285.1, 285.4, 582.1, 582.2, 52/585.1; 411/388, 508
  See application file for complete search history.

(56) References Cited

U.S. PATENT DOCUMENTS

| | | | | |
|---|---|---|---|---|
| 2,118,800 | A * | 5/1938 | Smith | B60R 13/04 24/295 |
| 2,885,822 | A * | 5/1959 | Onanian | A63H 33/101 174/138 D |
| 3,697,104 | A * | 10/1972 | Soulie | E21B 23/10 24/607 |
| 4,012,155 | A * | 3/1977 | Morris | F16B 7/0413 24/625 |
| 4,551,110 | A * | 11/1985 | Selvage | A63H 33/10 24/DIG. 53 |
| 5,137,486 | A | 8/1992 | Glickman | |
| 5,387,065 | A * | 2/1995 | Sullivan | F16B 19/1081 411/45 |
| 5,476,350 | A * | 12/1995 | Kurtz | F16B 19/1081 411/508 |
| D411,864 | S * | 7/1999 | Krog | D21/500 |
| 5,928,051 | A * | 7/1999 | Krog | A63H 33/10 446/104 |
| 5,964,635 | A | 10/1999 | Krog | |
| 6,209,178 | B1 * | 4/2001 | Wiese | F16B 5/0642 24/289 |
| 6,481,942 | B2 * | 11/2002 | Tanaka | F16B 19/1081 411/41 |
| 6,736,691 | B1 | 5/2004 | Bach | |
| 7,481,692 | B2 * | 1/2009 | Bruder | A63H 33/101 446/111 |
| 7,736,211 | B2 * | 6/2010 | Marzetta | A63H 33/105 446/113 |
| 8,157,470 | B2 * | 4/2012 | De Wilde | A63H 33/106 403/348 |
| 9,377,042 | B2 * | 6/2016 | De Wilde | A63H 33/101 |
| 2005/0272301 | A1 * | 12/2005 | Bruder | A63H 33/101 439/409 |
| 2007/0060012 | A1 | 3/2007 | Comfort | |
| 2010/0284760 | A1 * | 11/2010 | Rotolo | F16B 19/1081 411/44 |
| 2010/0299313 | A1 | 11/2010 | Orsini et al. | |
| 2011/0236156 | A1 * | 9/2011 | Rottinghaus | F16B 21/086 411/508 |
| 2012/0124792 | A1 * | 5/2012 | Ooki | F16B 5/0642 24/606 |
| 2012/0210546 | A1 | 8/2012 | Jang et al. | |
| 2013/0195547 | A1 * | 8/2013 | De Wilde | A63H 33/101 403/330 |
| 2017/0211607 | A1 * | 7/2017 | Hernandez | F16B 5/0642 |

FOREIGN PATENT DOCUMENTS

| | | |
|---|---|---|
| EP | 0367719 A1 | 5/1990 |
| WO | WO 2007/011164 A1 | 1/2007 |
| WO | WO 2012/015304 A1 | 2/2012 |

OTHER PUBLICATIONS

Singapore Office Action of related Singapore Patent Application No. 11201506657V dated Sep. 7, 2016.
Supplementary European Search Report of related European Patent Application No. 13 85 0863 dated Oct. 14, 2016.
International Search Report and Written Opinion of PCT/US2013/067801 dated Mar. 6, 2014.
New Zealand Office Action of related New Zealand Patent Application No. 707996 dated Nov. 8, 2016.

* cited by examiner

Position 1: Legs or extensions biased to an extended position

Position 3: Legs or extensions return to original positions, locking them in place on the far side of the shoulder Direction D
Direction D'

Direction D
Direction D'

Direction E

Direction E'

Direction E

Direction E'

Direction F
Direction F'

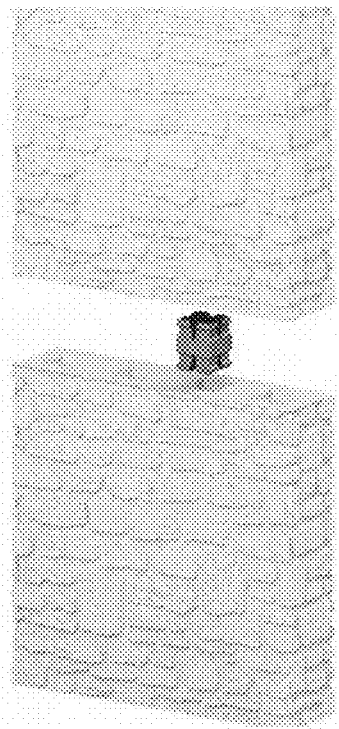 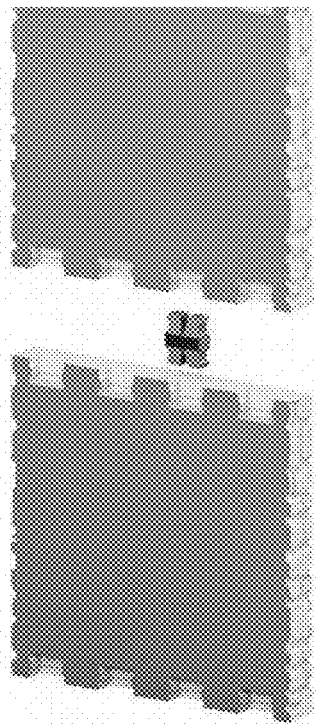 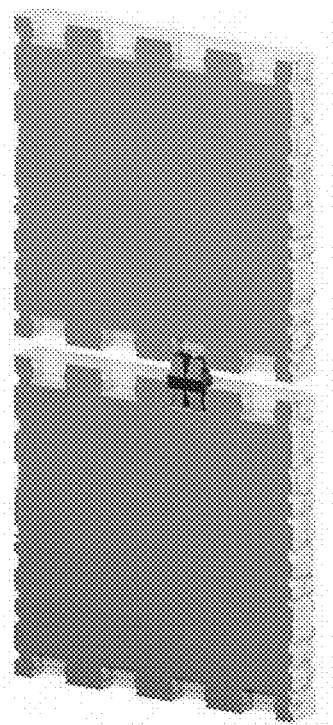
FIG.64A  FIG.64B  FIG.64C
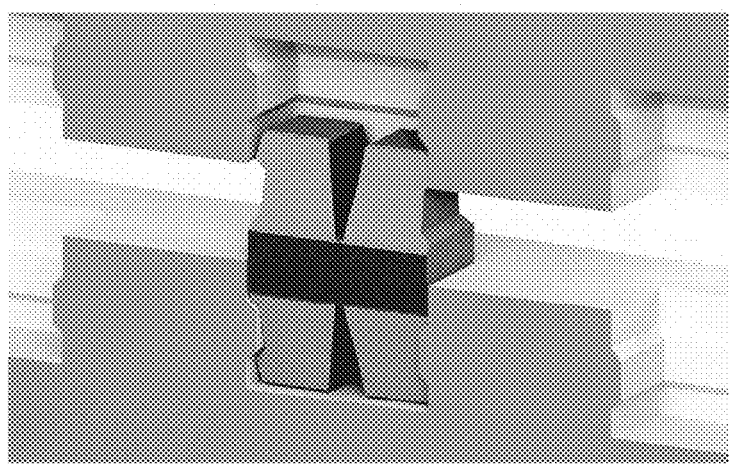
FIG.65

US 10,130,892 B2

MODULAR CONSTRUCTION PRODUCTS AND METHOD OF ASSEMBLY THEREOF

This application is a National Stage entry of International Application No. PCT/US2013/067801, filed Oct. 31, 2013, which claims priority from U.S. Provisional Patent Application Ser. No. 61/720,536 entitled "Modular Construction Products and Method of Assembly Thereof" filed Oct. 31, 2012, which are hereby incorporated in its their entirety herein by reference.

BACKGROUND OF THE INVENTION

Field of the Invention

Aspects of the invention relate to assembleable and disassembleable building systems, particularly for model and toy applications, comprising a plurality of building piece portions and at least one type of connection piece designed to interconnectedly work together to allow assembly of construction products.

SUMMARY OF THE INVENTION

Aspects of the present invention provide a modular construction product designed to give the user the flexibility to build a wide array of customized buildings, while offering lifelike detail of construction materials in those buildings. The product includes a number of stackable or otherwise connectible unique part shapes (also interchangeably referred to herein as structural assembly components) that may be used in different orientations with connection pieces to construct a building, partial building, or sculpture, for example. The unique part shapes and connectors provide an integrated system for attachment, which is designed so that pieces may be oriented a number of different ways in relation to one another. In some variations, the attachment features are designed so as to minimize the chance of pattern repetition in the texture of the walls and/or other features of the assembled structure.

In one example variation of a system in accordance with aspects of the present invention, the main structural pieces of the product contain one or more female receptacles (also interchangeably referred to herein as female cavities) for use in attachable assembly. Attachment is accomplished by inserting a double ended male piece (also interchangeably referred to herein as a male connector portion) into each of two female receptacles. In some variations, the male and female pieces are designed to lock together so that the pieces do not separate unintentionally. In other variations, the female receptacles are designed without the locking mechanism, so as to make disassembly/deconstruction of certain portions of the structure easier for use in game and other play.

Additional advantages and novel features relating to aspects of the present invention will be set forth in part in the description that follows, and in part will become more apparent to those skilled in the art upon examination of the following or upon learning by practice thereof.

BRIEF DESCRIPTION OF THE DRAWINGS

The patent or application file contains at least one drawing executed in color. Copies of this patent or patent application publication with color drawing(s) will be provided by the Office upon request and payment of the necessary fee. Aspects of the present invention will become fully understood from the detailed description given herein below and the accompanying drawings, which are given by way of illustration and example only and thus not limited to aspects of the present invention shown, wherein:

FIGS. 64A-64C and 65-76 show perspective, partial cutaway, and other views of example connectible product portions and connectors in various states of partial and full assembly, in accordance with aspects of the present invention.

DETAILED DESCRIPTION

Aspects of the present invention include a variety of shaped three dimensional pieces (see below) that may be assembled to create structures, models, toys, or artwork, among other things. The system of specific piece sizes and shapes, combined with connecting features, such as double female/double male connection mechanisms allow greater flexibility when interconnecting pieces together than typical conventional modular construction systems of the related art.

In some variations in accordance with aspects of the present invention, a number of different connectors, such as locking and slip-fit connectors, allow a user to lock specific pieces together, while allowing other components to be easily taken apart for ease of use or other purposes, for example, such as when utilizing the product for hobby activities (e.g., role-playing or other miniature combat games).

In accordance with aspects of the present invention, textures of the body pieces may be varied in order to add variety to the types of buildings that may be constructed with various sets of parts. For example, the parts shown in FIGS. 15-63 may provide for at least a portion of their external surfaces to have the appearance of rough stone construction typical of medieval fortifications (castles); however, by changing the texture to cut stone and adding vaulted ceilings, stained glass windows, flying buttresses, etc., the models could be used to represent cathedral and church architecture, for example. By varying the textures to half-timbered style, for example, the pieces may be used to represent European urban architecture. By changing to more modern or futuristic textures, the product can be used to represent futuristic or science-fiction settings, etc.

Figure 1:
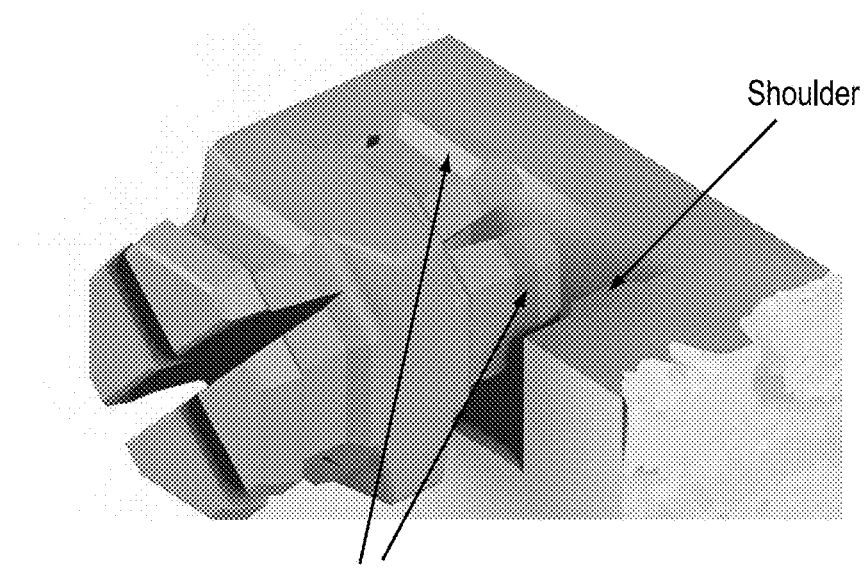
FIGS. 1 and 2 show example partial cutaway views of an example connector and pieces connectable by the connectors in accordance with a first example connector mechanism for securing elements of the product to one another, in accordance with aspects of the present invention.
Figure 2:
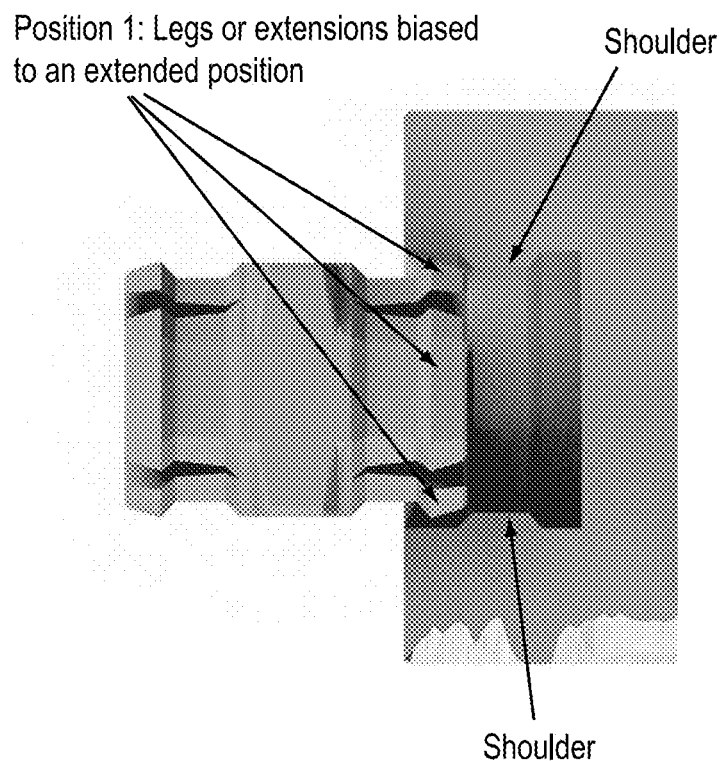

FIGS. 1 and 2 show partial cutaway views of an example connector and pieces connectable via the connectors, in accordance with a first example connector mechanism (interchangeably referred to herein as example Peg Type 1) for securing elements of the product to one another. Example Peg Type 1 is designed so that male portions of the connectors have legs or extensions that extend from a central body portion and are biased to a radially extended position, such that when inserted into a cooperating female opening, the legs or extensions biasedly engage a receiving slot shoulder in the female opening wall, thereby retaining the male extension within the female opening.

Figure 3:
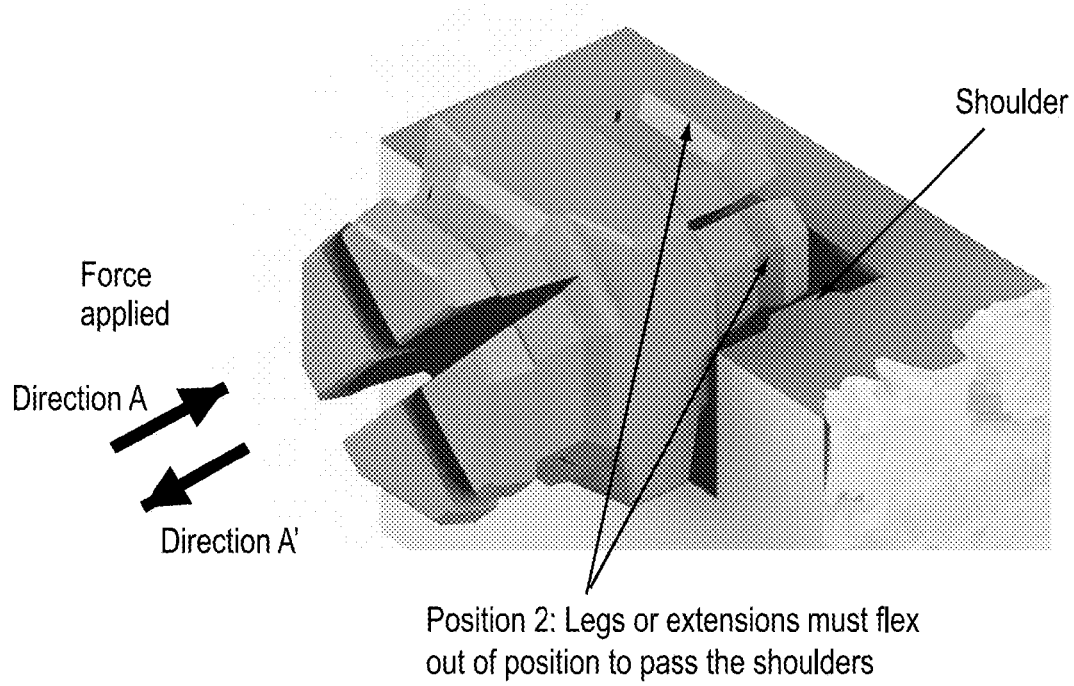
FIGS. 3 and 4 show cutaway views of portions of the example connector and pieces of FIGS. 1 and 2, the receiving female cavity containing a portion too small for the legs or extensions of the male portion to easily pass through in their extended positions, the legs or extensions being capable of flexing out of position in order to pass the shoulders of the female part, in accordance with aspects of the present invention.
Figure 4:
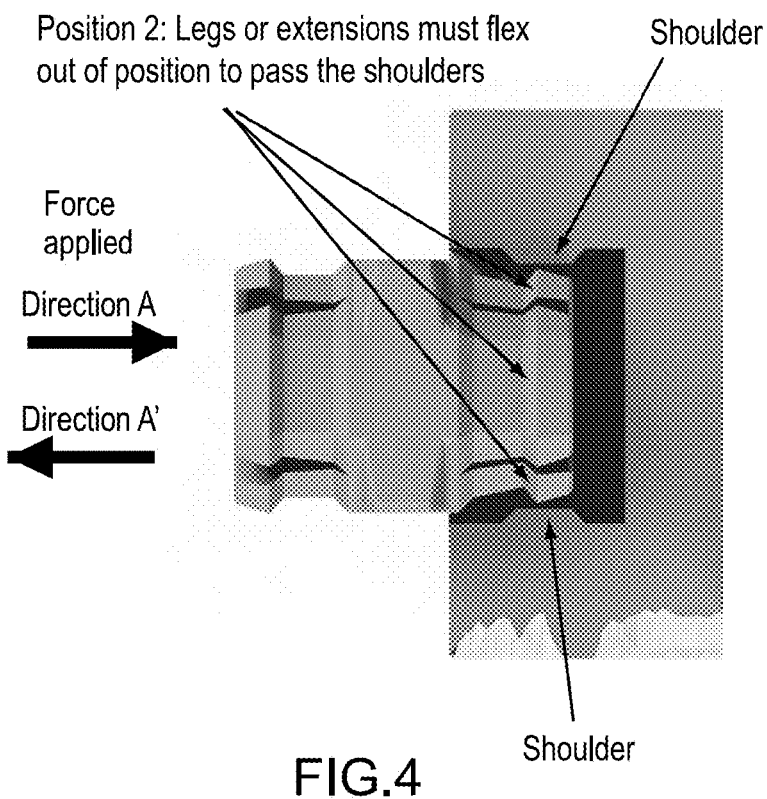

Specifically, as further shown in the cutaway views of FIGS. 3 and 4, because some portions of the receiving female cavity may be too small for the legs or extensions to pass therethrough in their extended positions, the legs or extensions may flex out of position (inwardly radially, relative to one another and relative to an axis longitudinally extending [e.g., in the A/A' direction as shown in FIGS. 3 and 4] through the center of the peg) in order to pass the shoulders of the female part, via, for example, a ramp portion declinably extending toward the cavity opening. The shoulders in the female part may be designed so as to provide a narrow passage, through which the legs or extensions cannot easily pass in their extended state, via a retaining section located adjacent the shoulder at the end of the cavity opposite the opening. Force applied in the A or A' direction as shown in FIGS. 3 and 4 may cause the legs or extensions to flex inward in order to pass through the opening.

Figure 5:
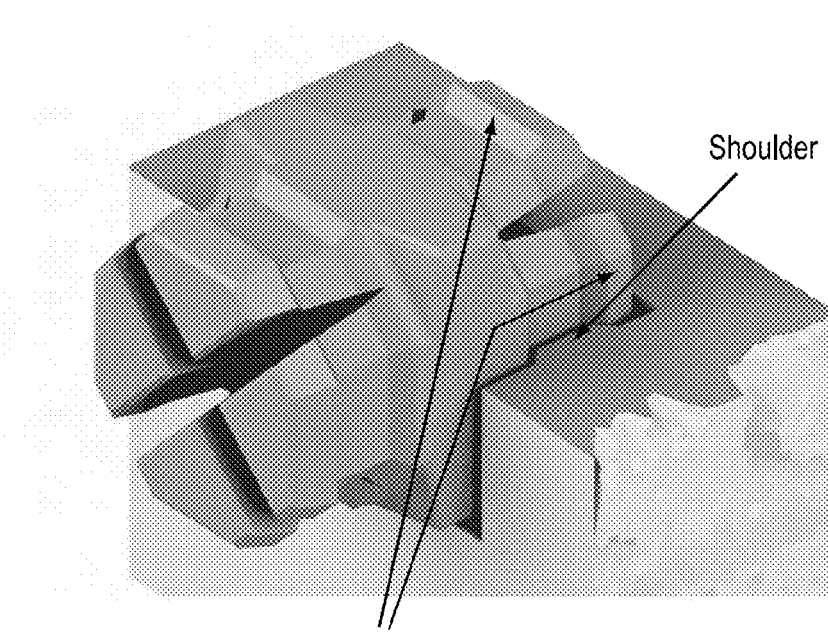
FIGS. 5 and 6 show cutaway views of the example connector and pieces of FIGS. 1 and 2, wherein the legs or extensions are shown having passed the shoulders and returned to their original, extended position upon reaching a section of the opening that widens to its original dimensions past the shoulders section of the receiving opening, in accordance with aspects of the present invention.
Figure 6:
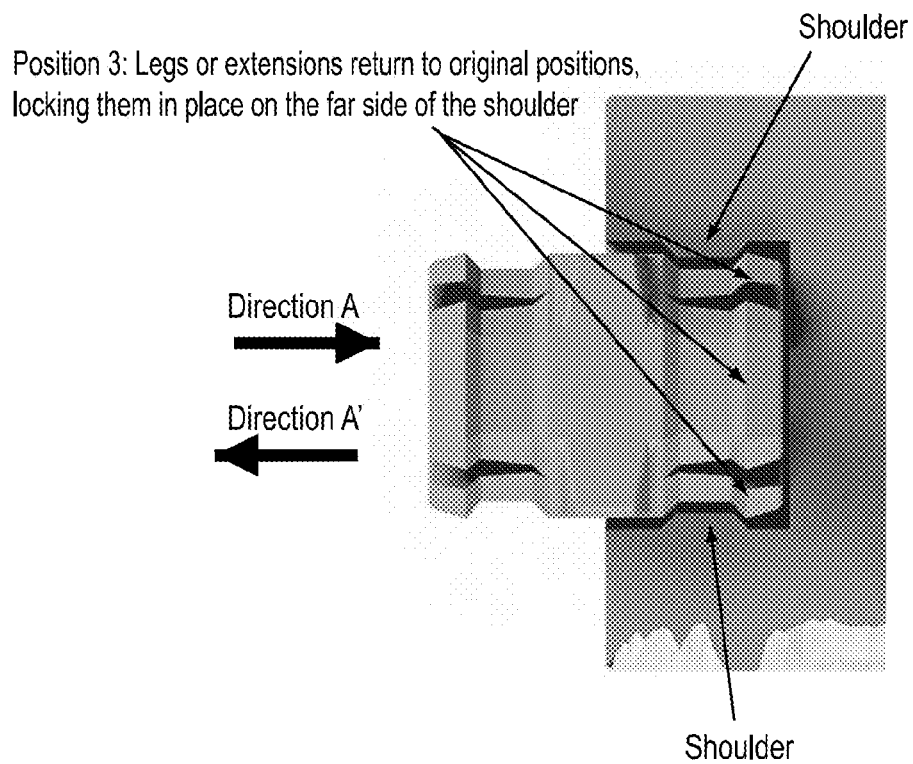

As further shown in FIGS. 5 and 6, with regard to the example implementation of FIGS. 1-4, the legs or extensions, having passed the shoulders, may return to their original position (e.g., extend outwardly relative to one another) when reaching the section of the opening that widens to its original dimensions past the shoulders section of the receiving opening. Once returned to their original, extended position, as shown in FIGS. 5 and 6, the legs or extensions may be locked in place by the shoulder cooperating with an outwardly extending tab or other extending or otherwise retaining feature of the leg. Until a force equal to or greater than the force applied in the A direction in FIG. 6 (the B' direction) is applied, for example, the two pieces may remain locked together. The adjoining cavities of two pieces locked together may be sized and shaped such that the central body portion is contained within the adjoining cavities and is thereby not visible, with the pieces being tightly fitted to one another, for example. When a force is applied in the B' direction, such as a force equal or greater than the force that was applied in the B direction, then the pieces may separate.

Figure 7:
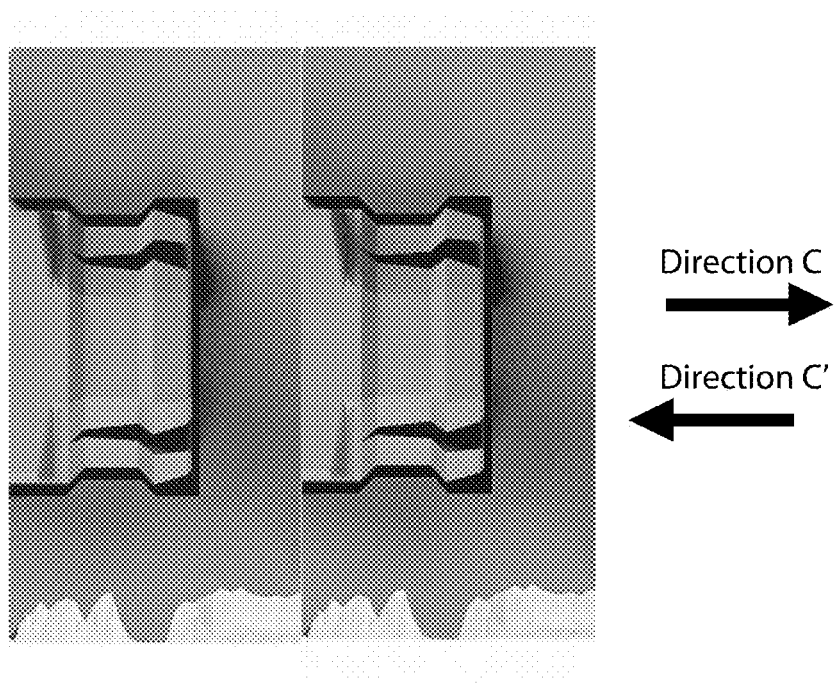
FIG. 7 shows a cutaway view of the example connector and pieces of FIGS. 1-6, wherein a second piece of wall or floor may be added to the assembled portions of FIGS. 5 and 6, such as by attaching the second piece to the pieces of FIGS. 5 and 6, in a similar manner to as described with regard to FIGS. 1-6, in accordance with aspects of the present invention.

As shown in FIG. 7, further to the example implementation of FIGS. 1-6, a second piece of wall or floor may be added to the assembled portions of FIGS. 5 and 6, such as by attaching the second piece to the pieces of FIGS. 5 and 6, along the A' direction of the peg, in a similar manner to as described with regard to FIGS. 1-6. As with the assembly of FIGS. 5 and 6, the second piece may similarly be locked via the peg, so that the three pieces together are assembled, unless and until force is applied in both the C and the C' direction (e.g., contemporaneously), at which time the pieces may be separated.

Figure 8A:
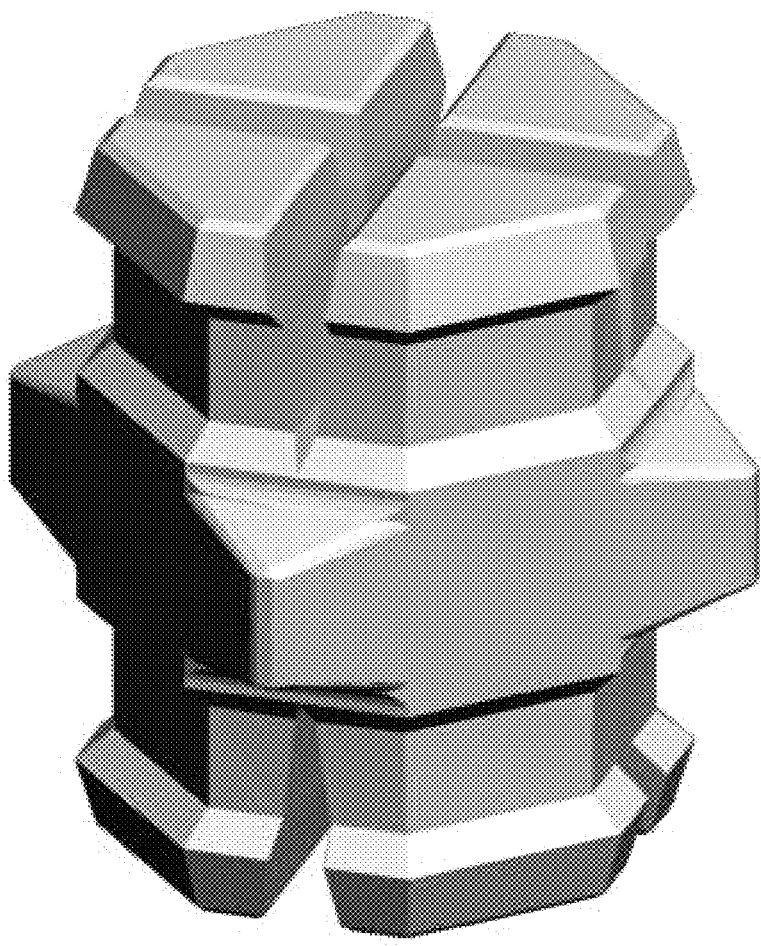
FIGS. 8A-8C show example perspective views of the first example connection mechanism for holding the product together, in accordance with aspects of the present invention.
Figure 8B:
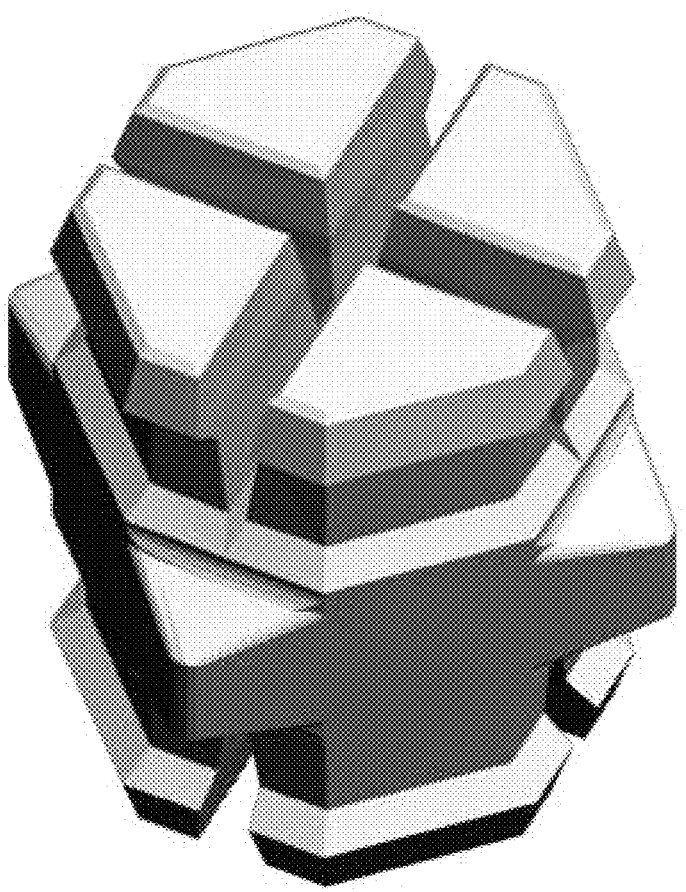
Figure 8C:
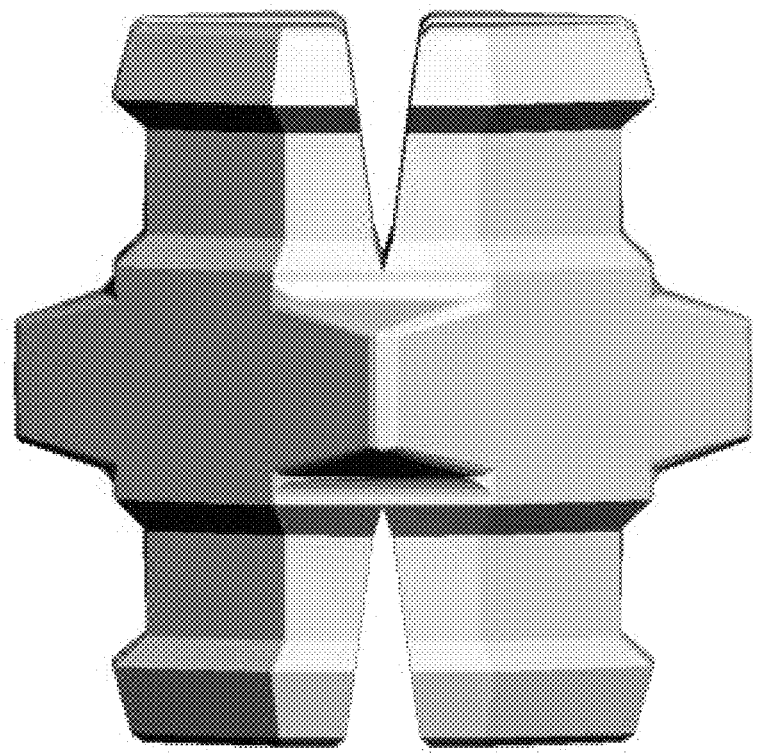
Figure 9A:
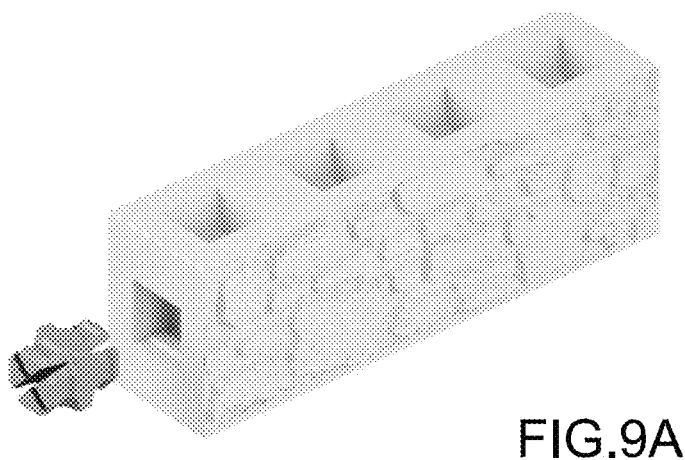
FIGS. 9A-9F show aspects of the an example second connection mechanism wherein the male portion of each of the connectors has legs or extensions biased to an extended position, in accordance with aspects of the present invention.
Figure 9B:
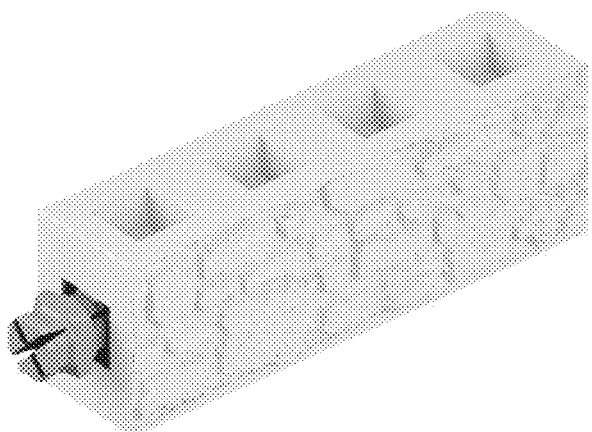
Figure 9C:
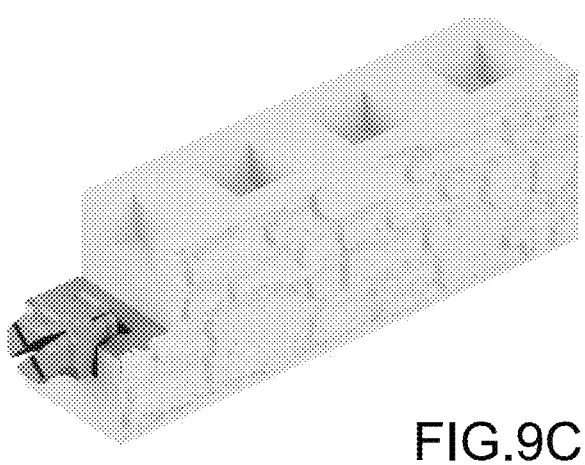
Figure 9D:
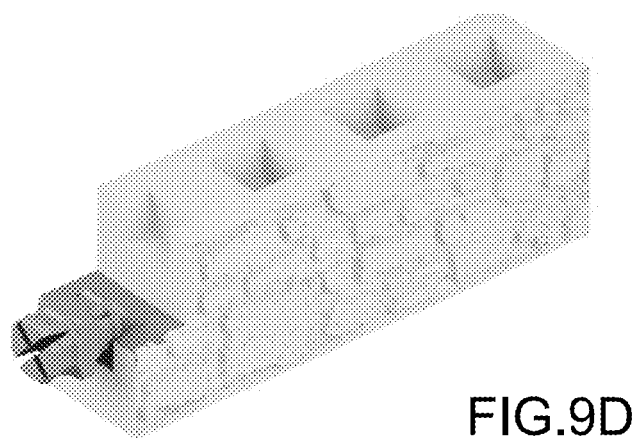
Figure 9E:
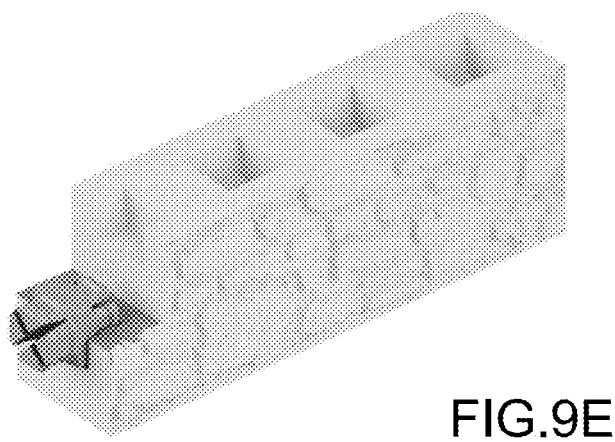
Figure 9F:
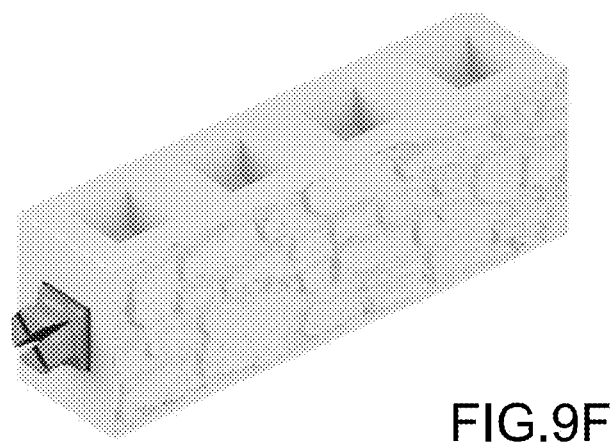
Figure 10A:
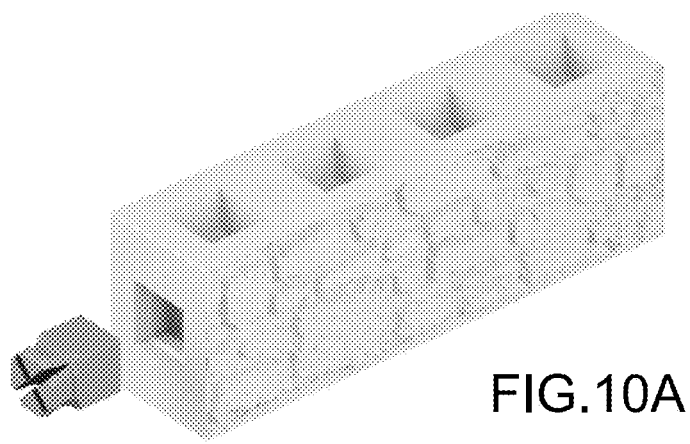
FIGS. 10A-10F, 11, and 12 show various cutaway views of the example second type connector mechanism and connected portions, in accordance with aspects of the present invention.
Figure 10B:
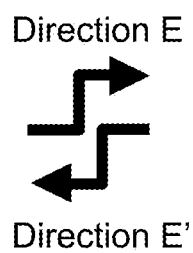
Figure 10B:
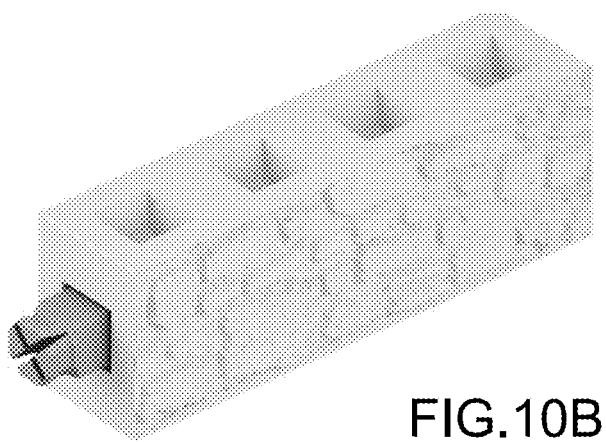
Figure 10C:
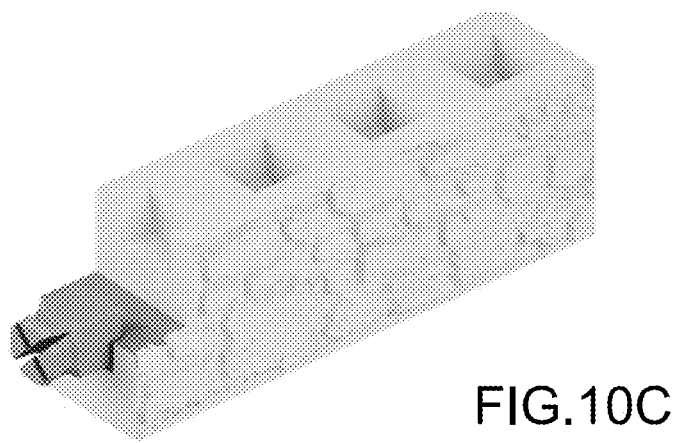
Figure 10D:
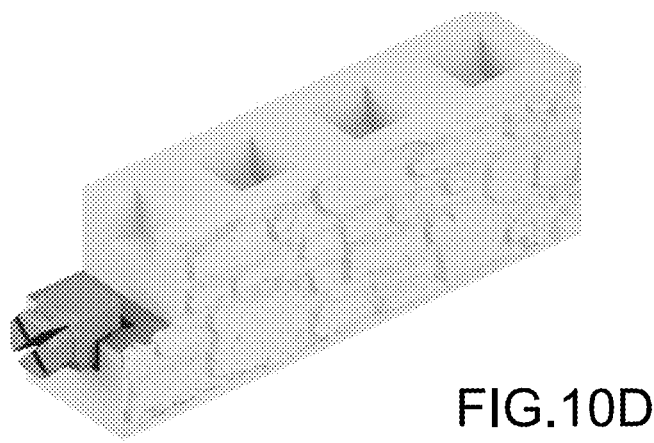
Figure 10E:
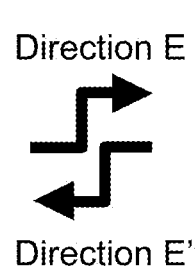
Figure 10E:
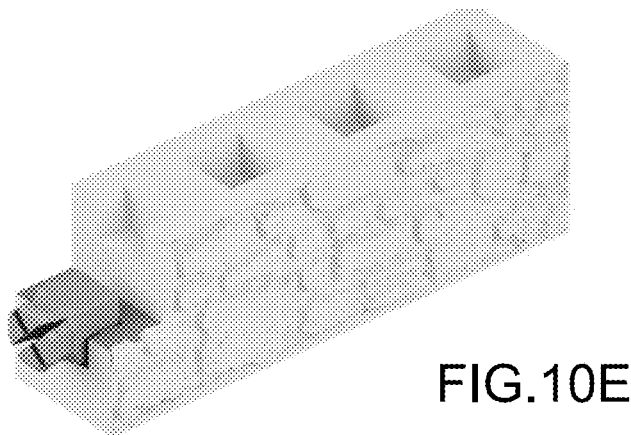
Figure 10F:
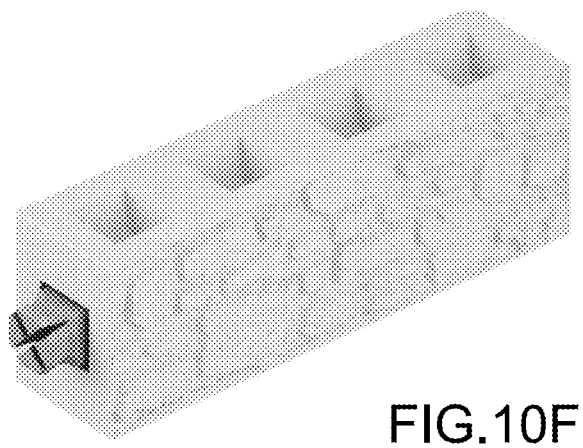
Figure 11:
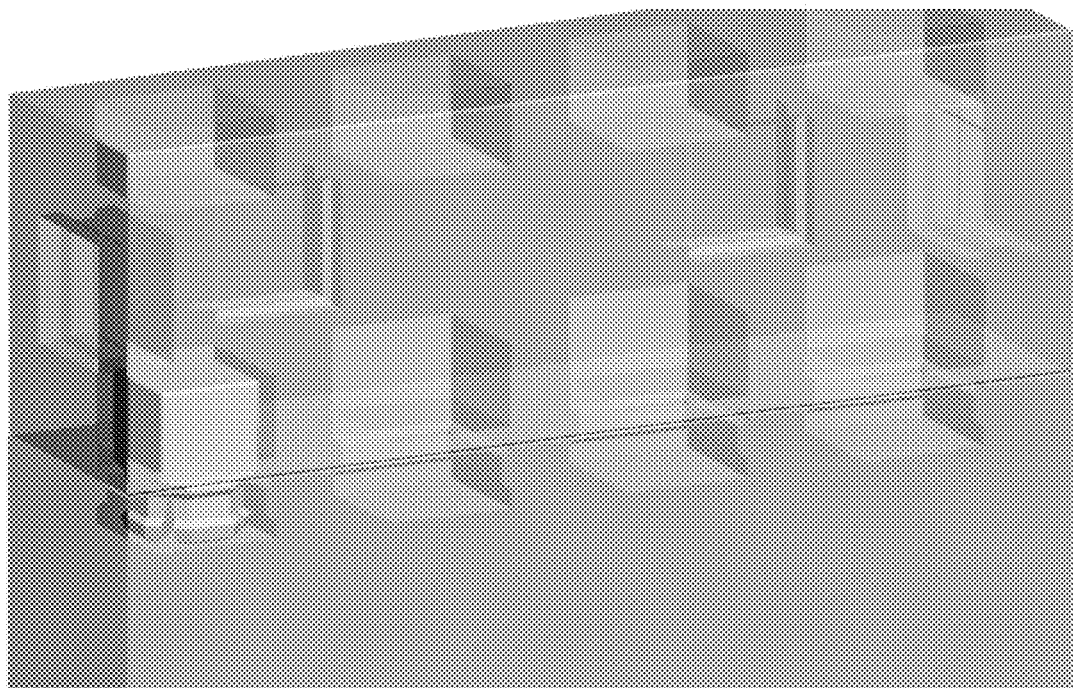
Figure 12:
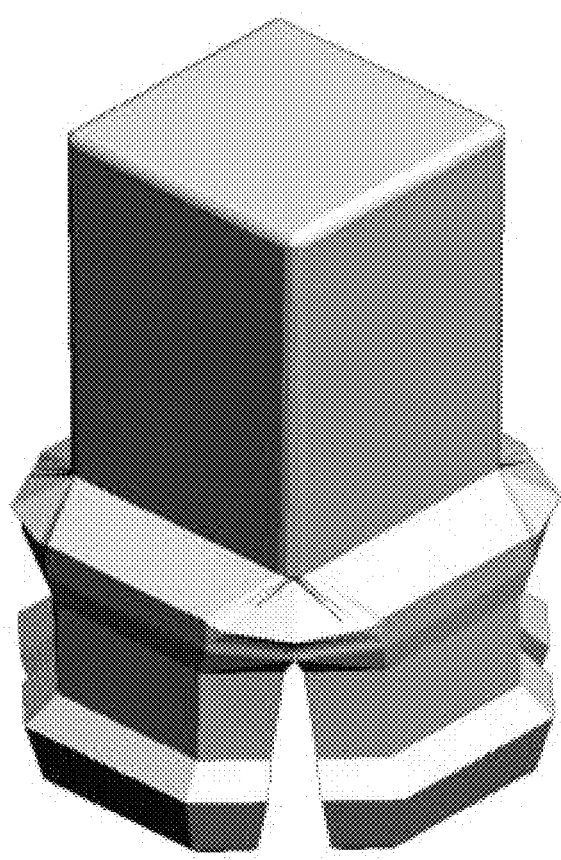
Figure 13A:
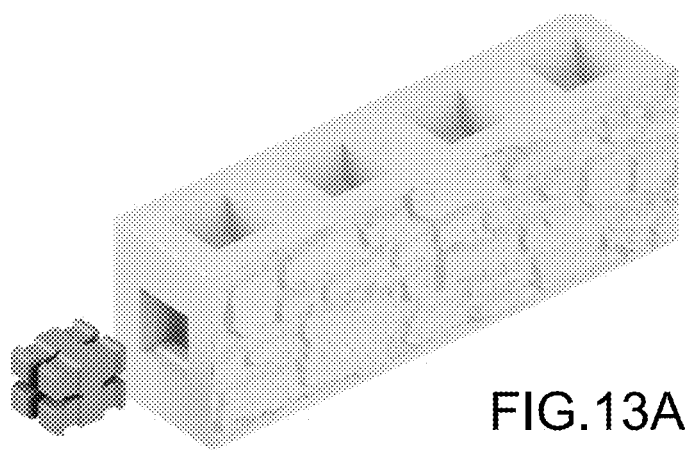
FIGS. 13A-13E, and 14 show a third example connection mechanism for holding various portions of the product together, in accordance with aspects of the present invention.
Figure 13B:
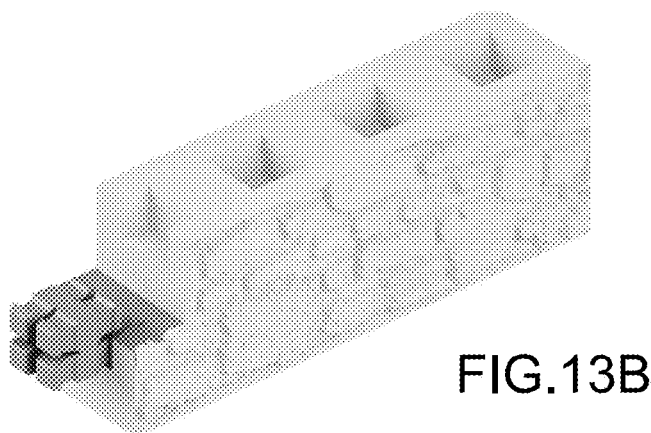
Figure 13C:
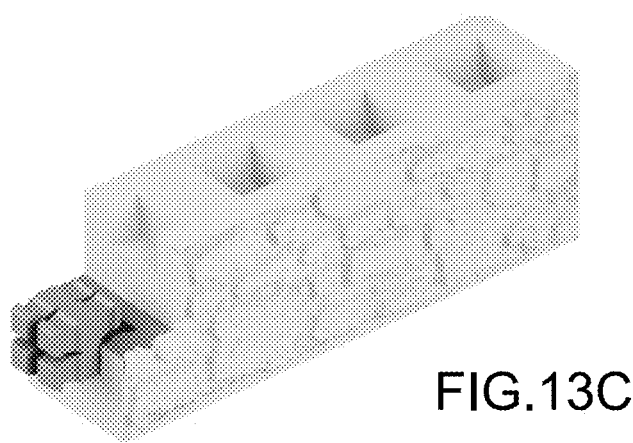
Figure 13D:
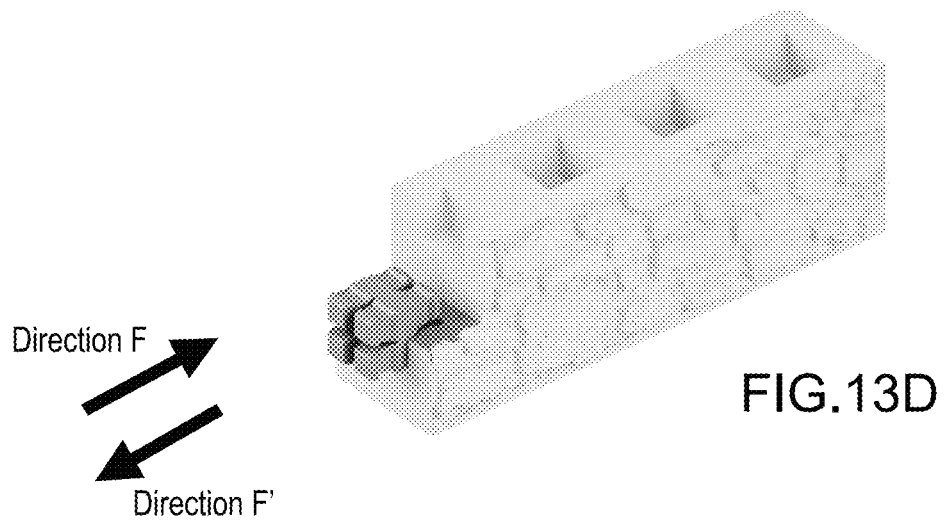
Figure 13E:
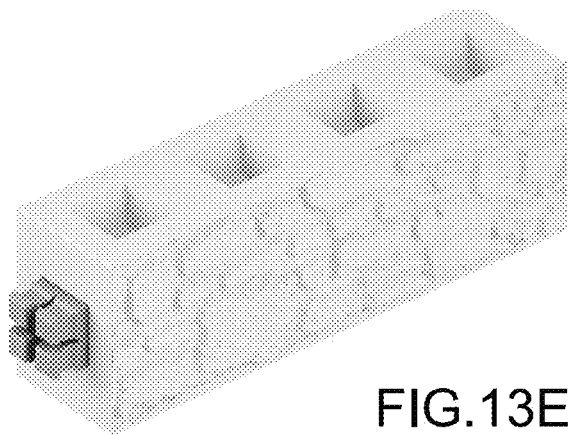
Figure 14:
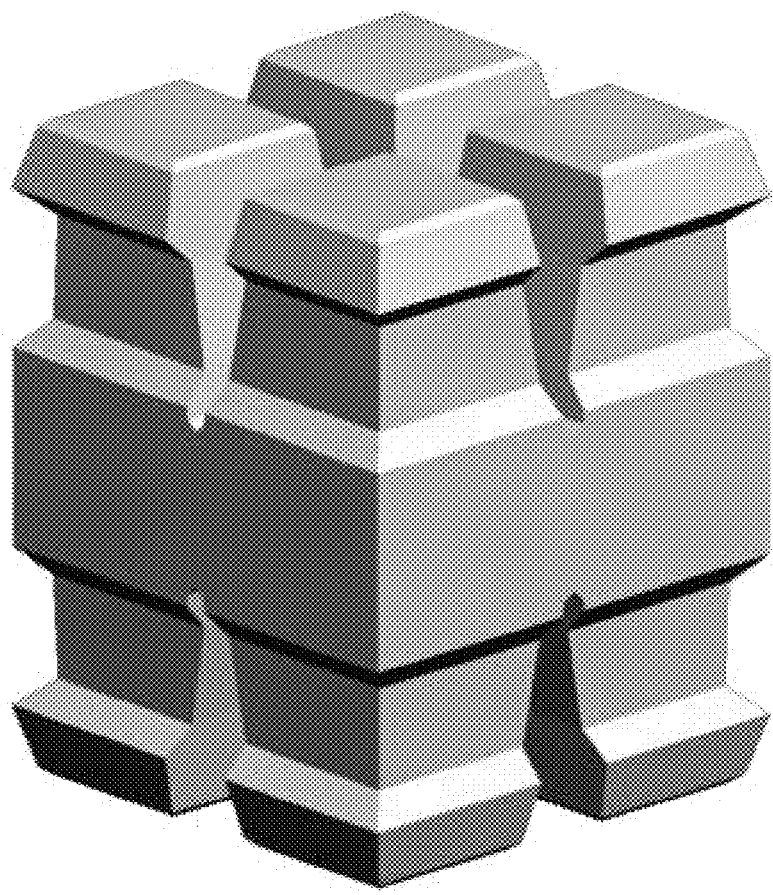
Figure 15:
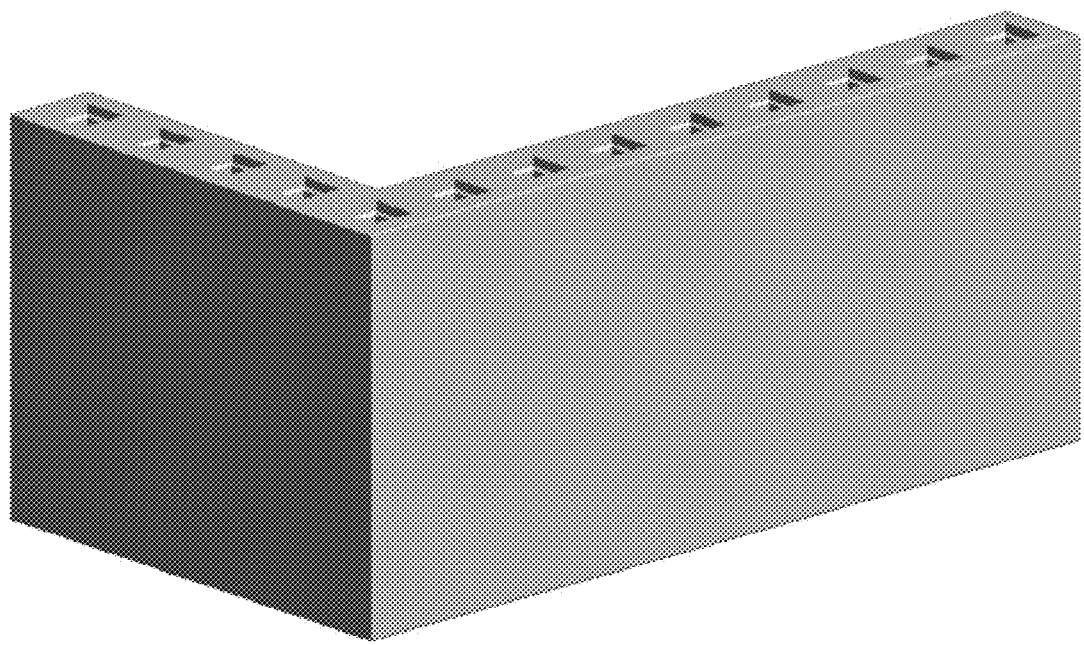
FIGS. 15-63 show perspective and other views of various example connectible product portions for use in accordance with aspects of the present invention.
Figure 16:
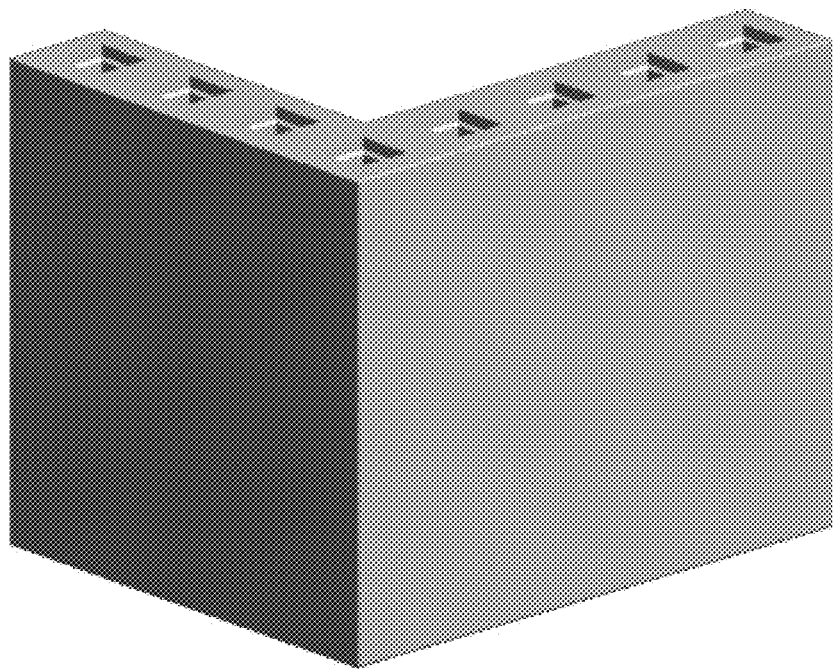
Figure 17:
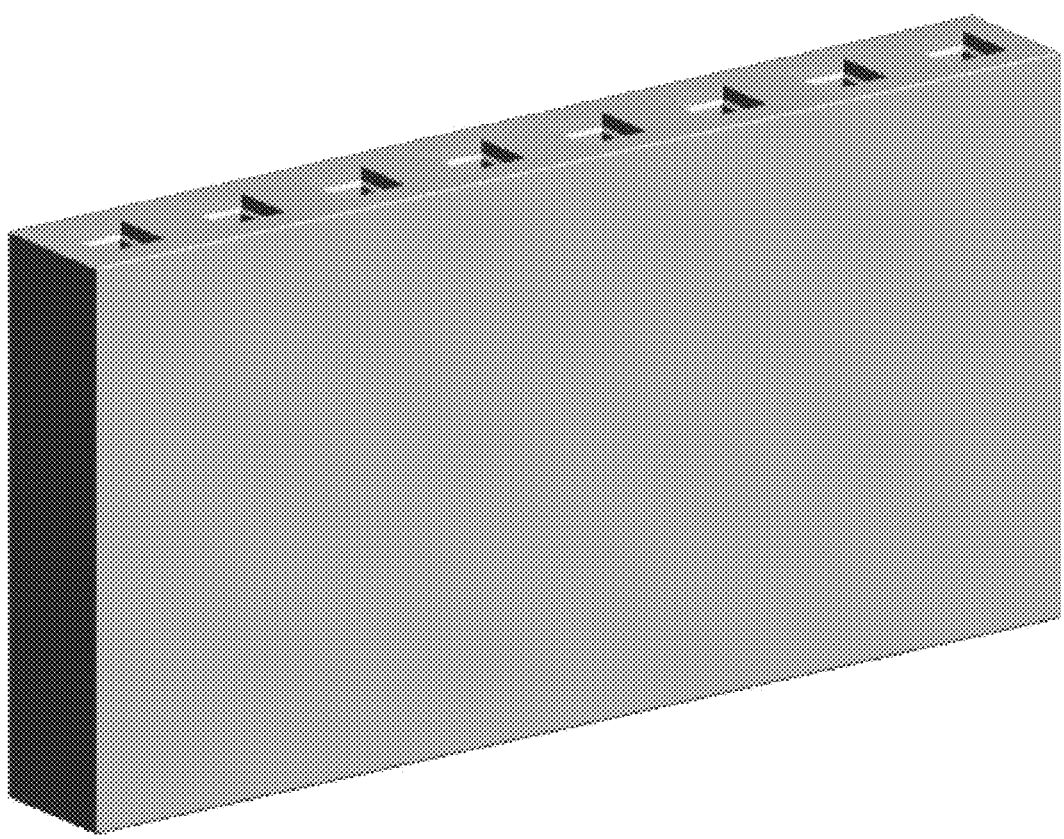
Figure 18:
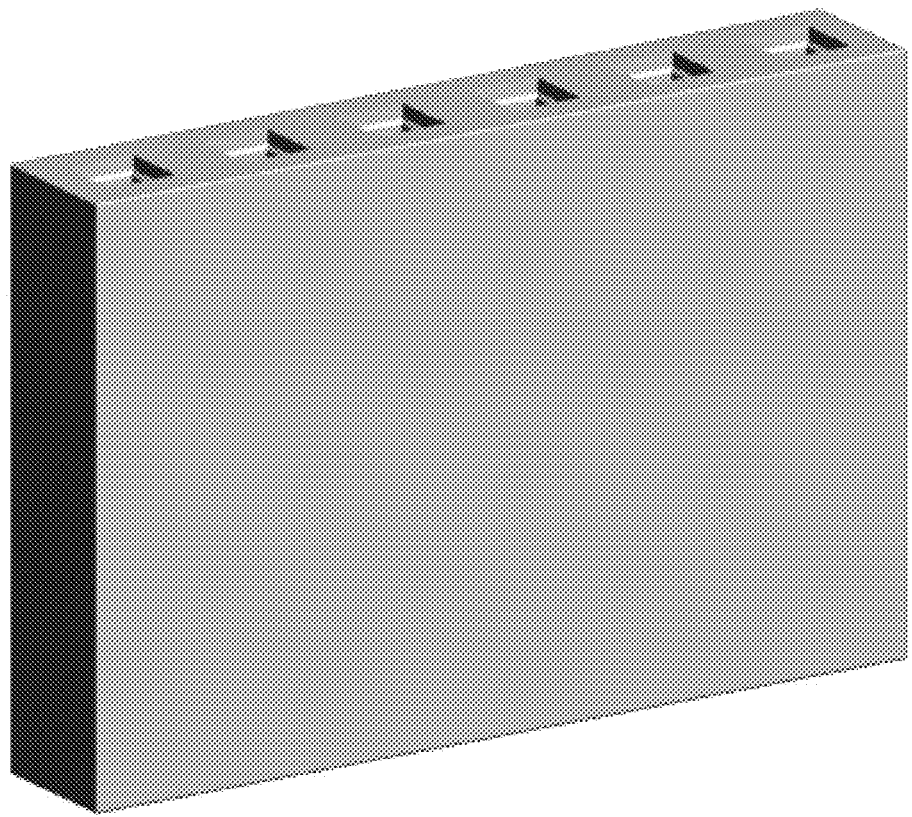
Figure 19:
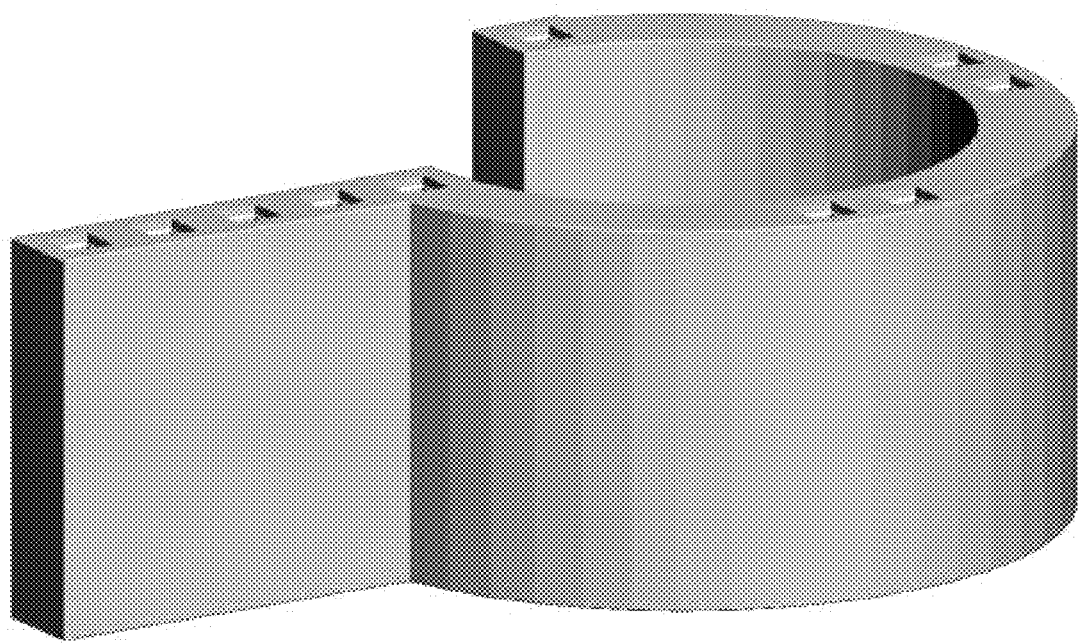
Figure 20:
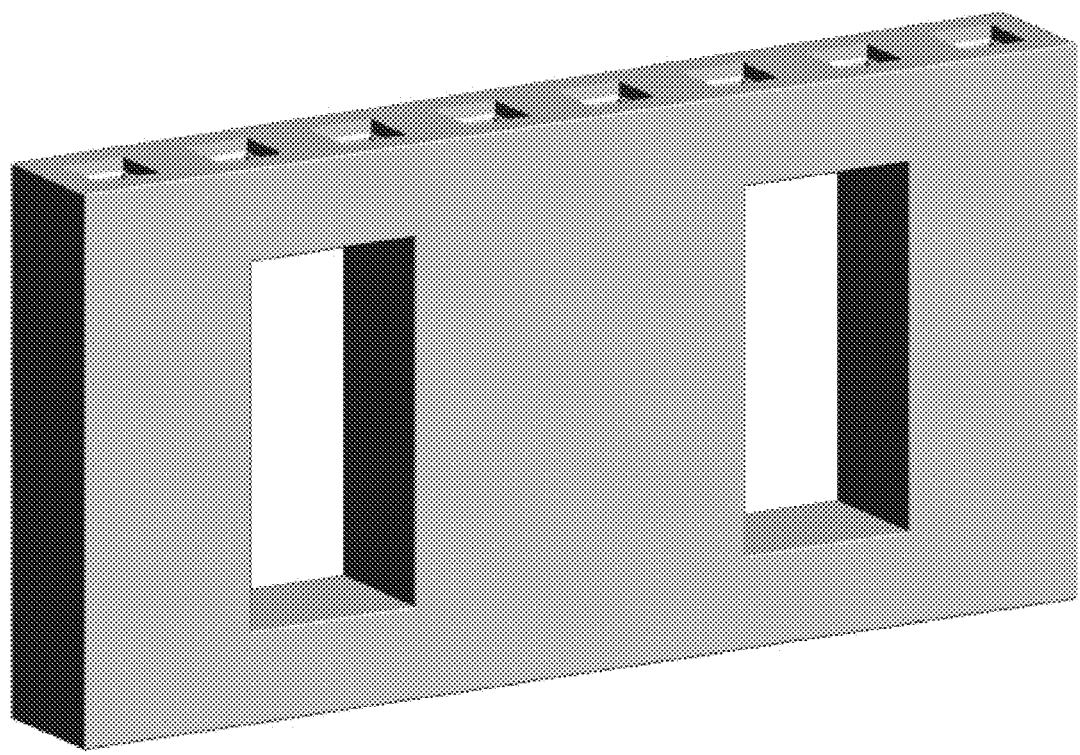
Figure 21:
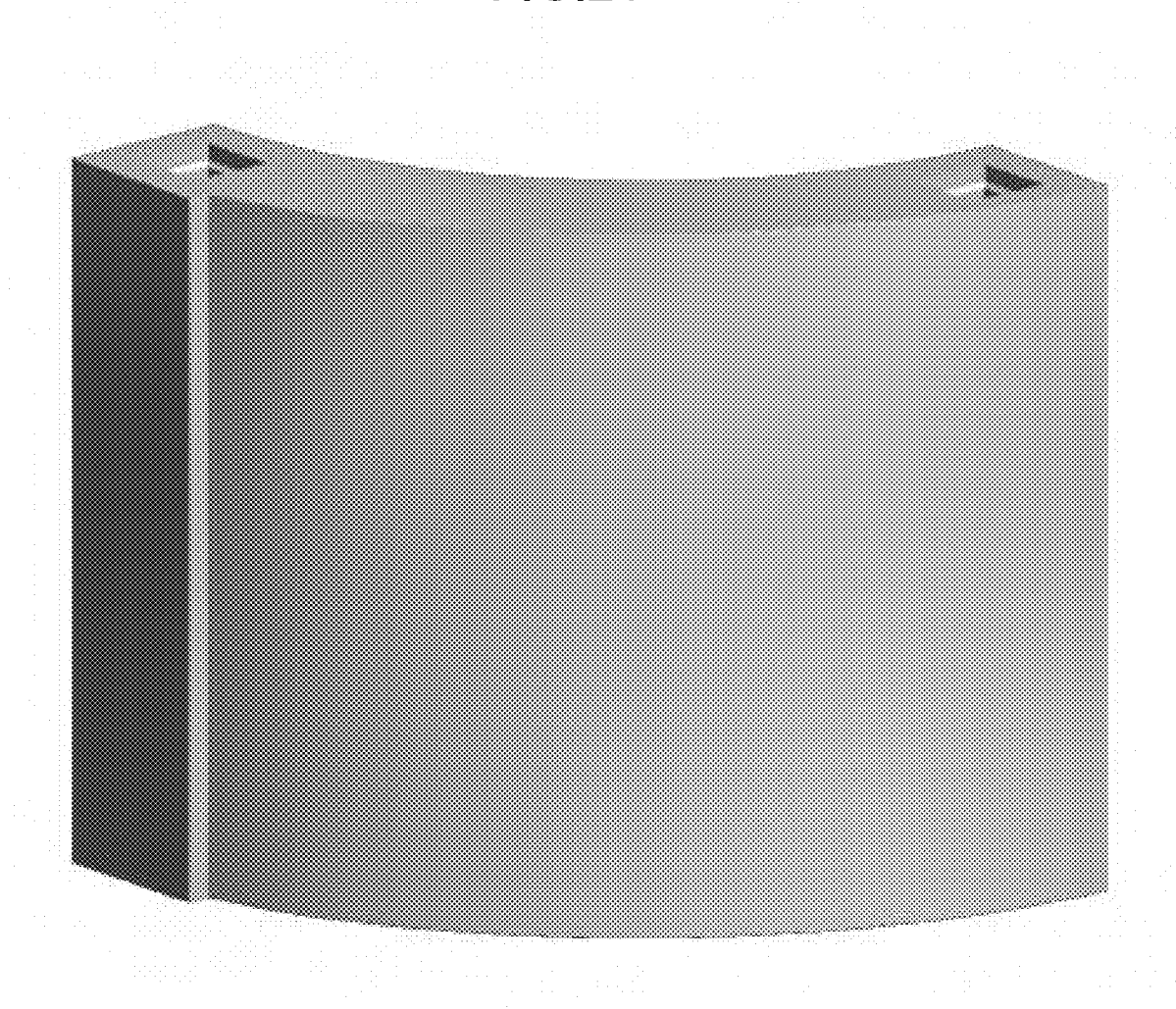
Figure 22:
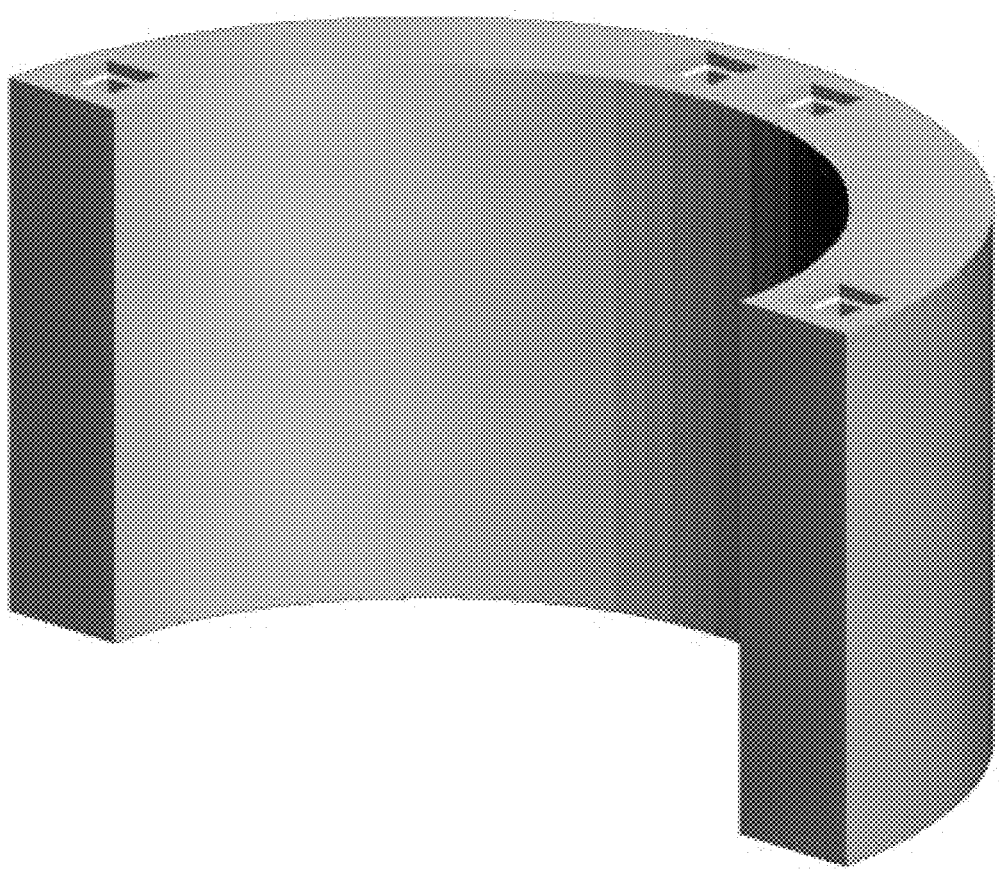
Figure 23:
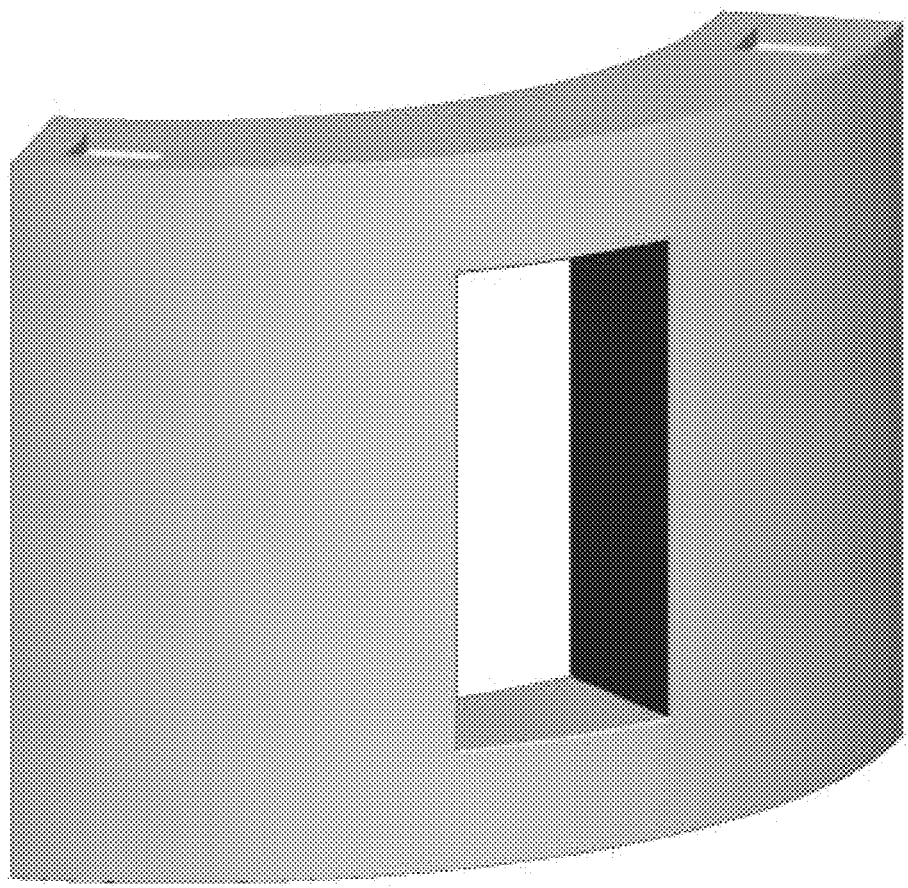
Figure 24:
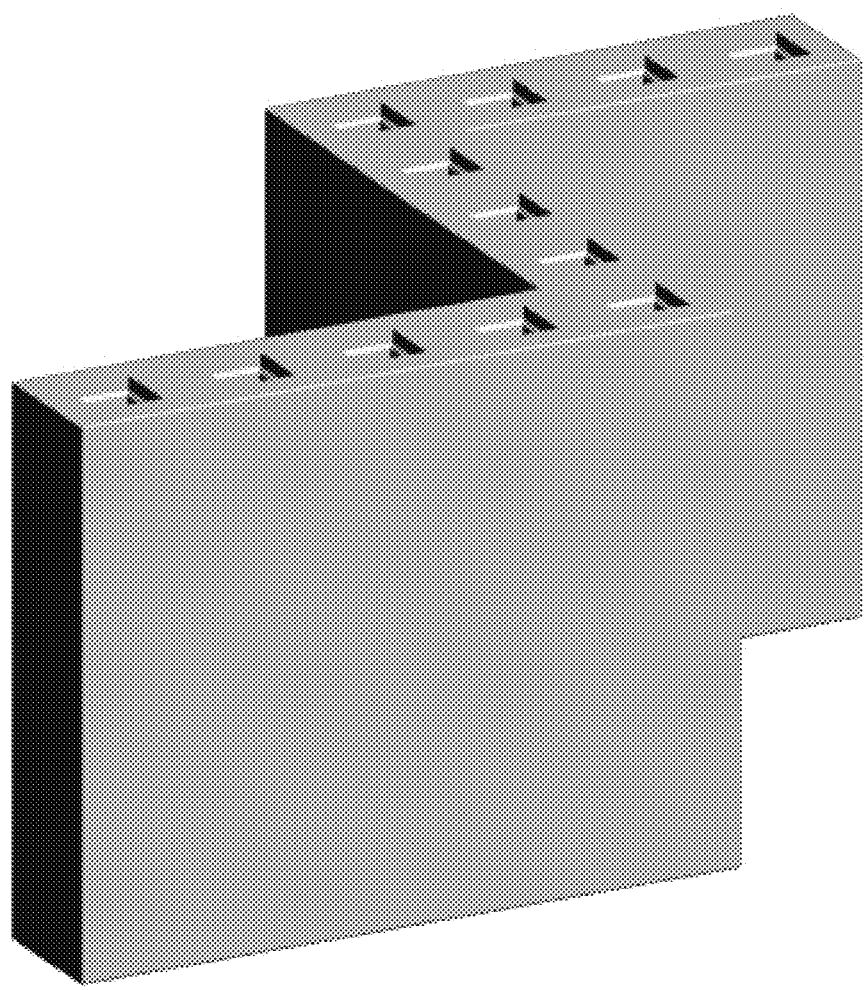
Figure 25:
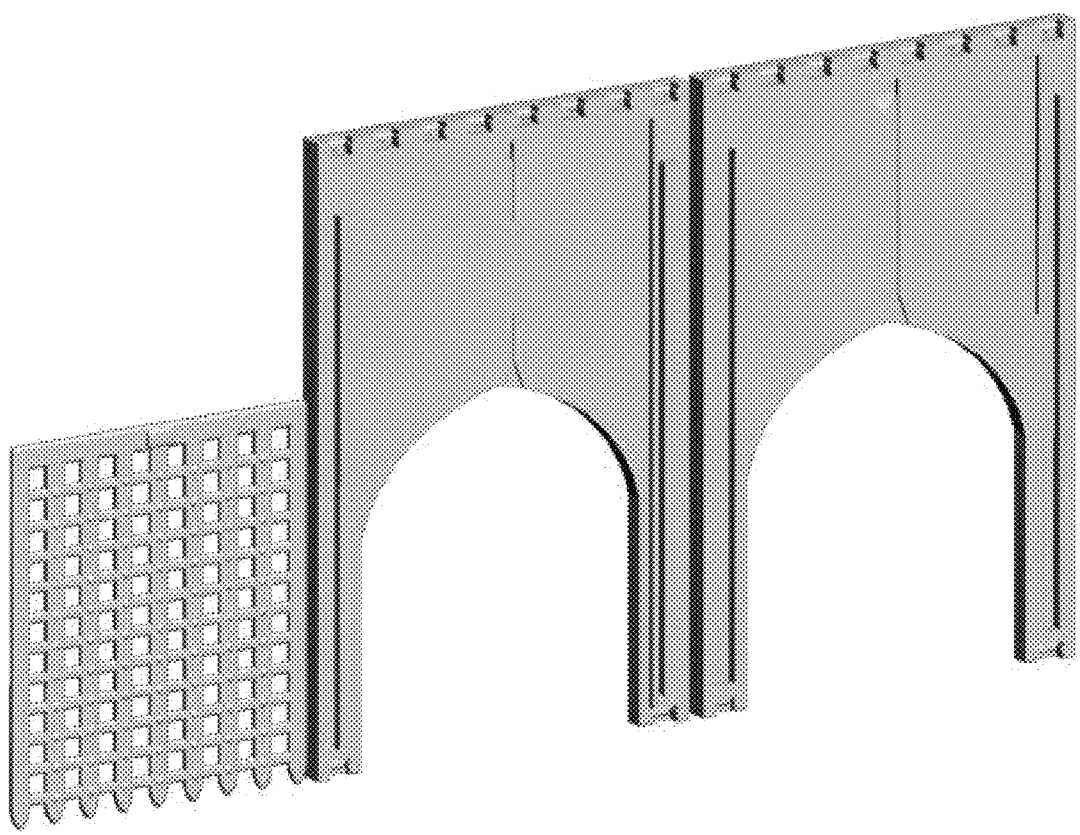
Figure 26:
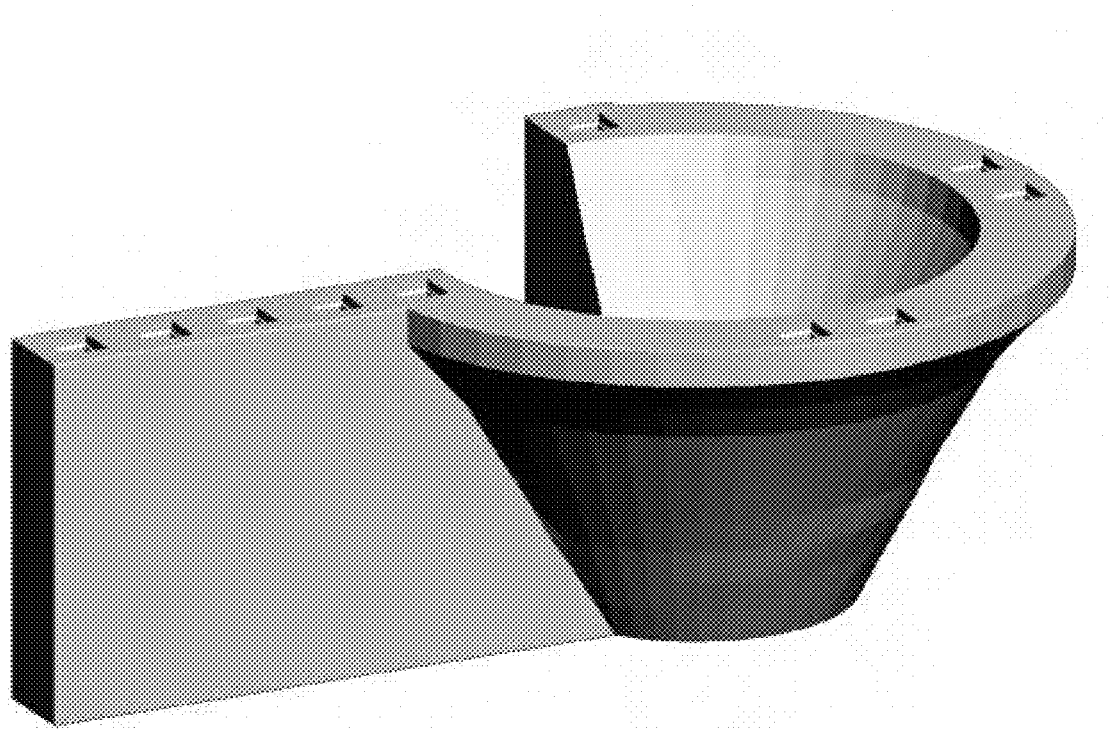
Figure 27:
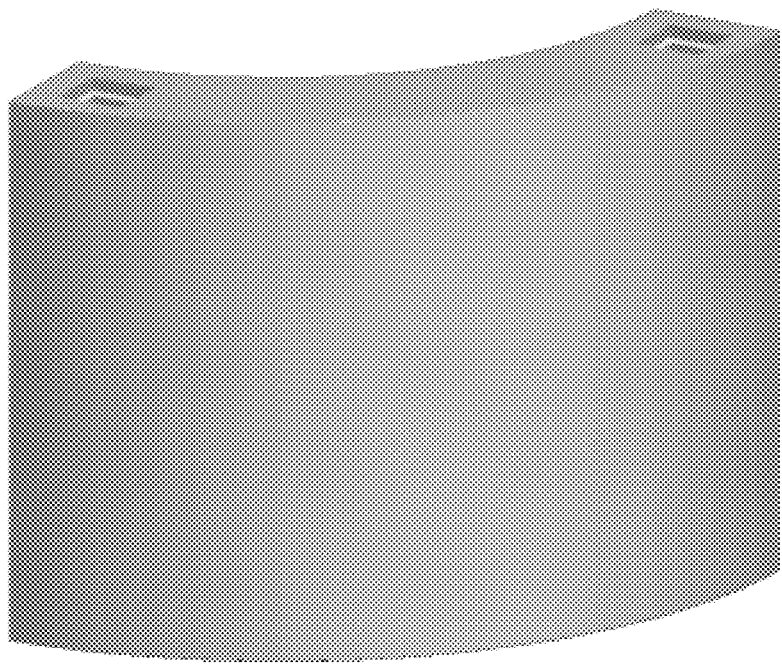
Figure 28:
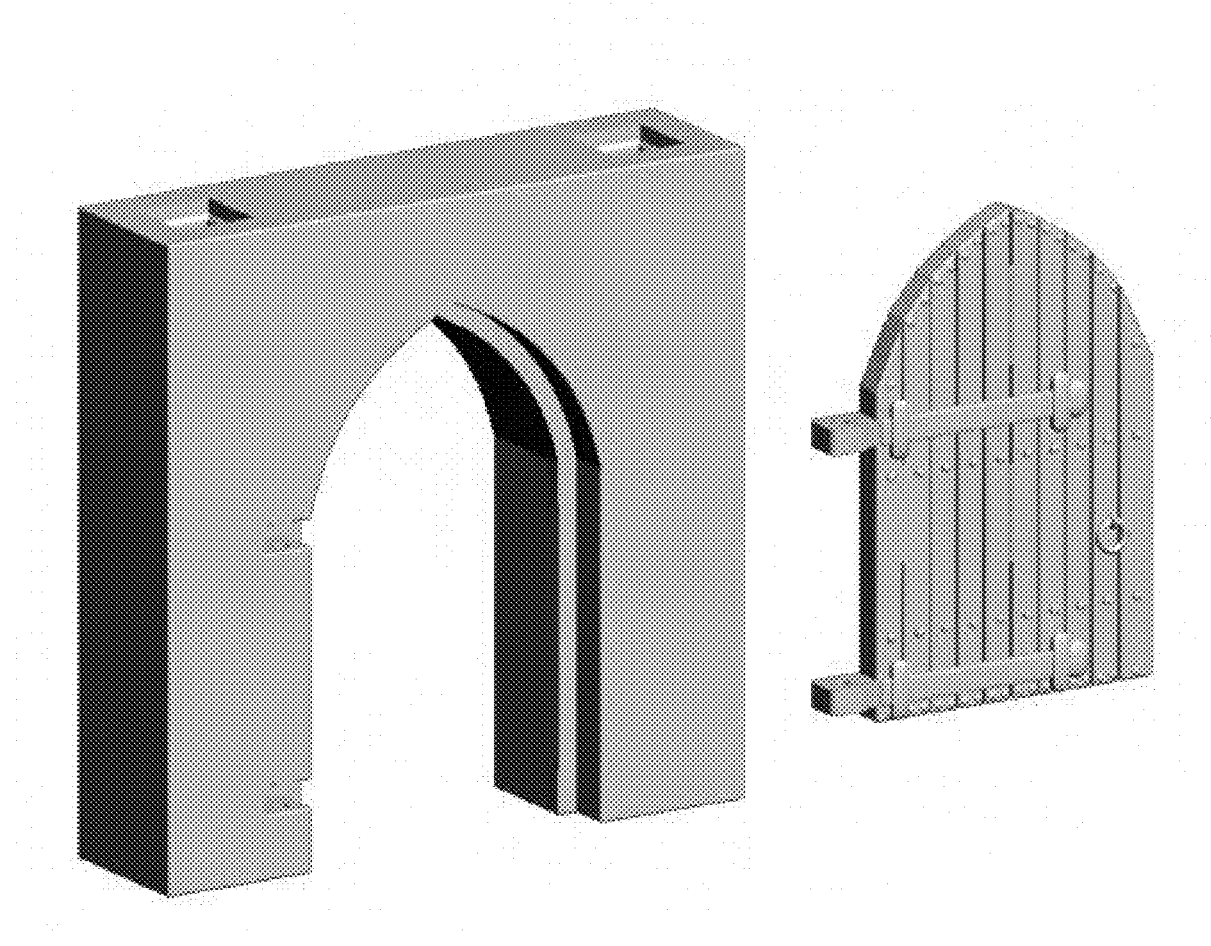
Figure 29:
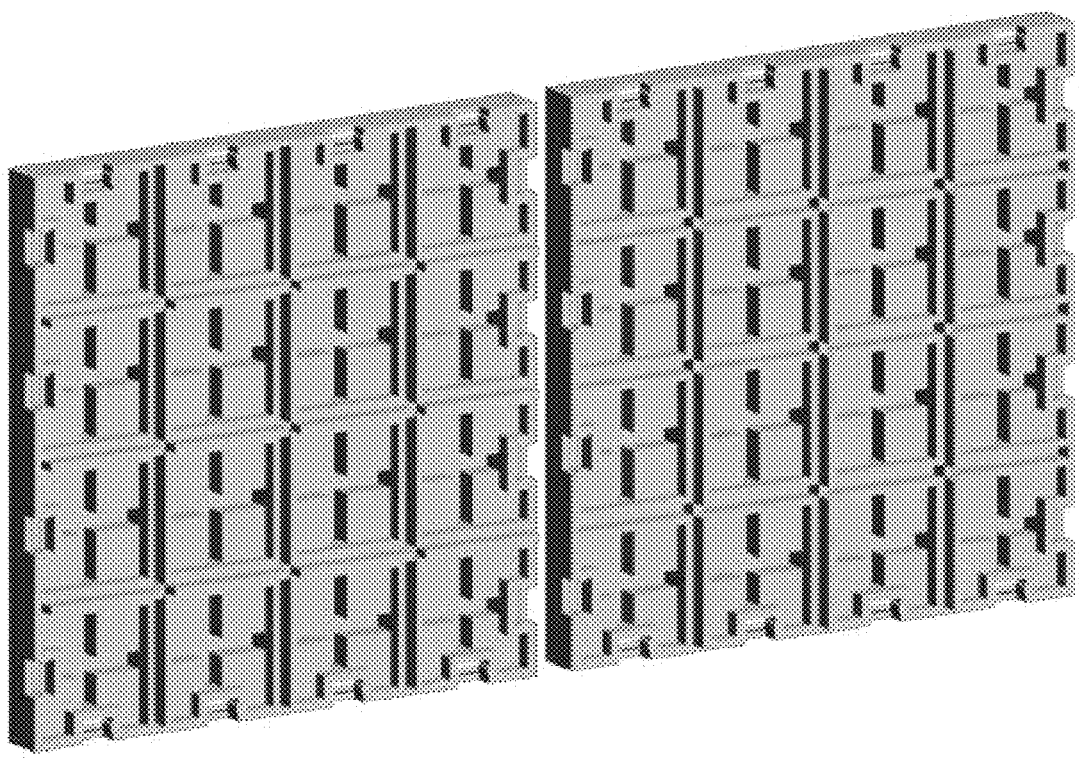
Figure 30:
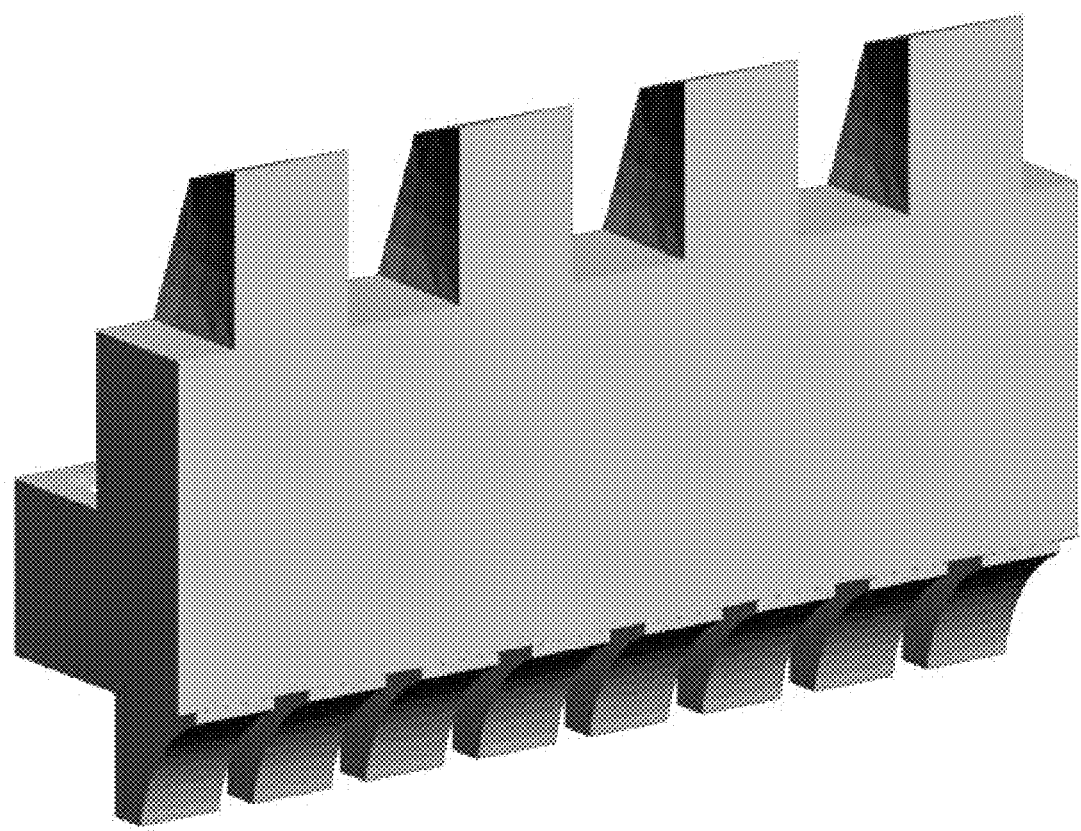
Figure 31:
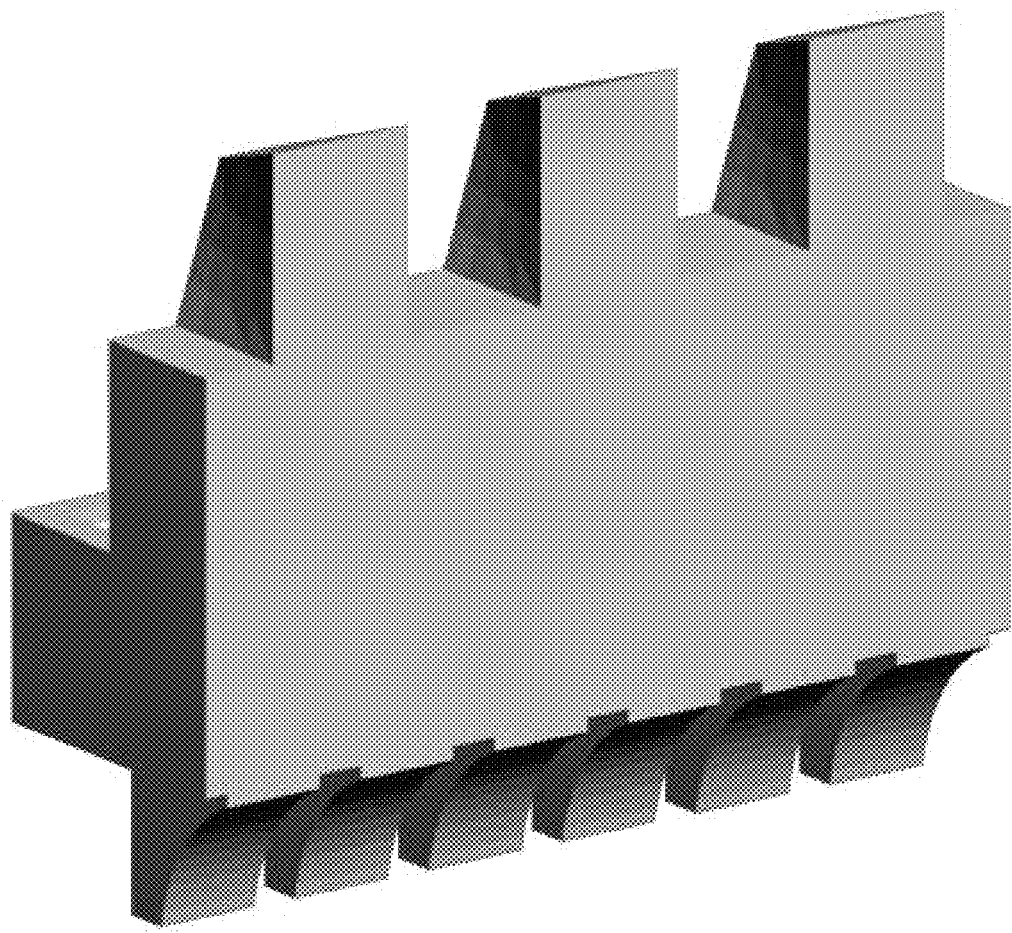
Figure 32:
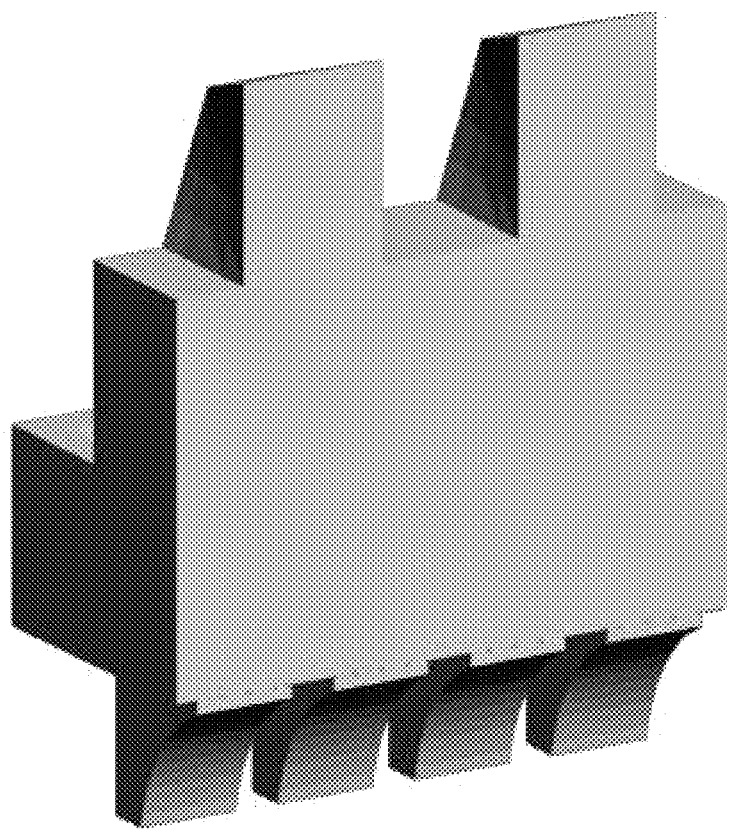
Figure 33:
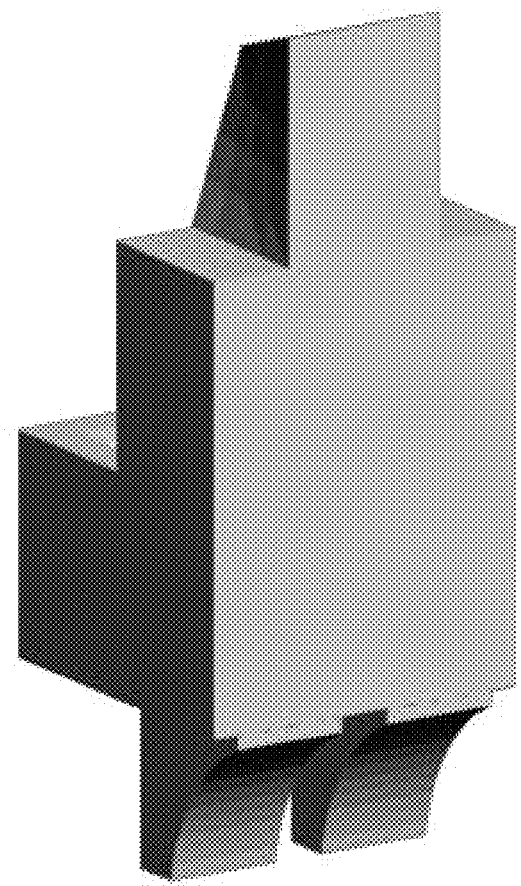
Figure 34:
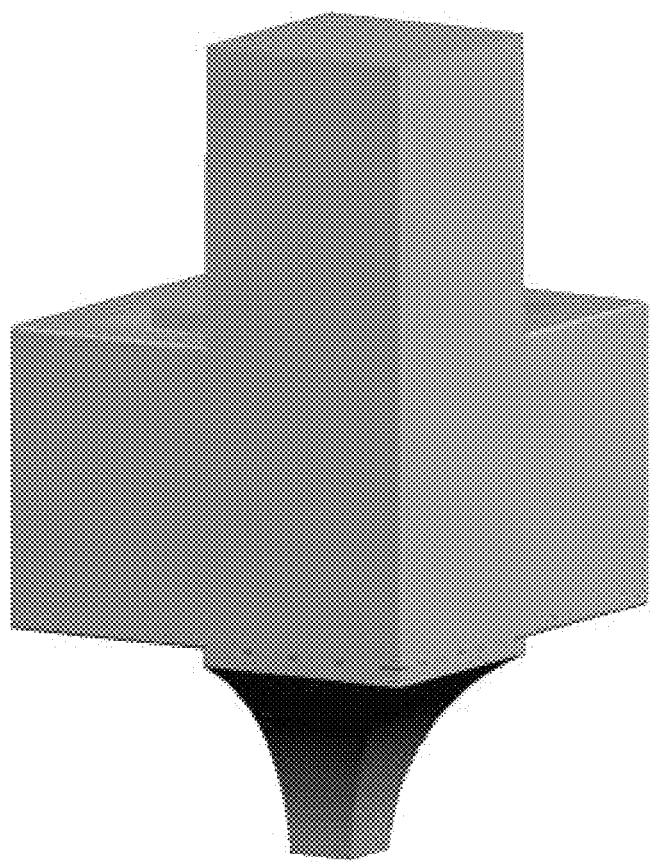
Figure 35:
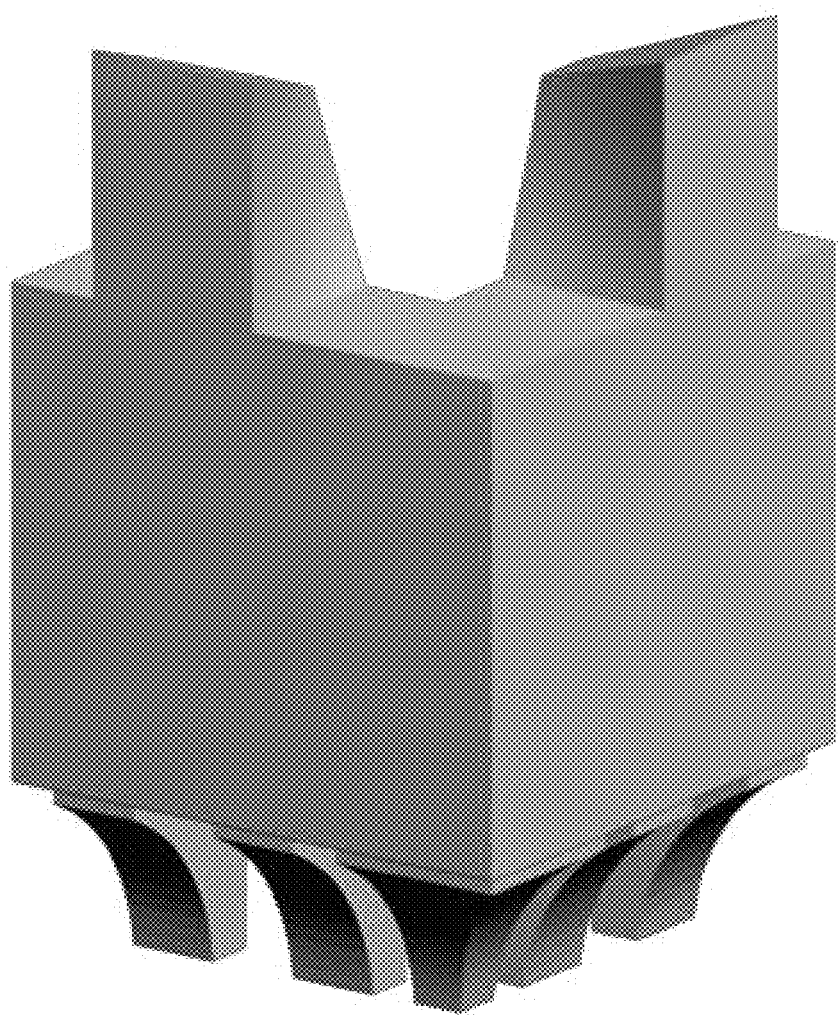
Figure 36:
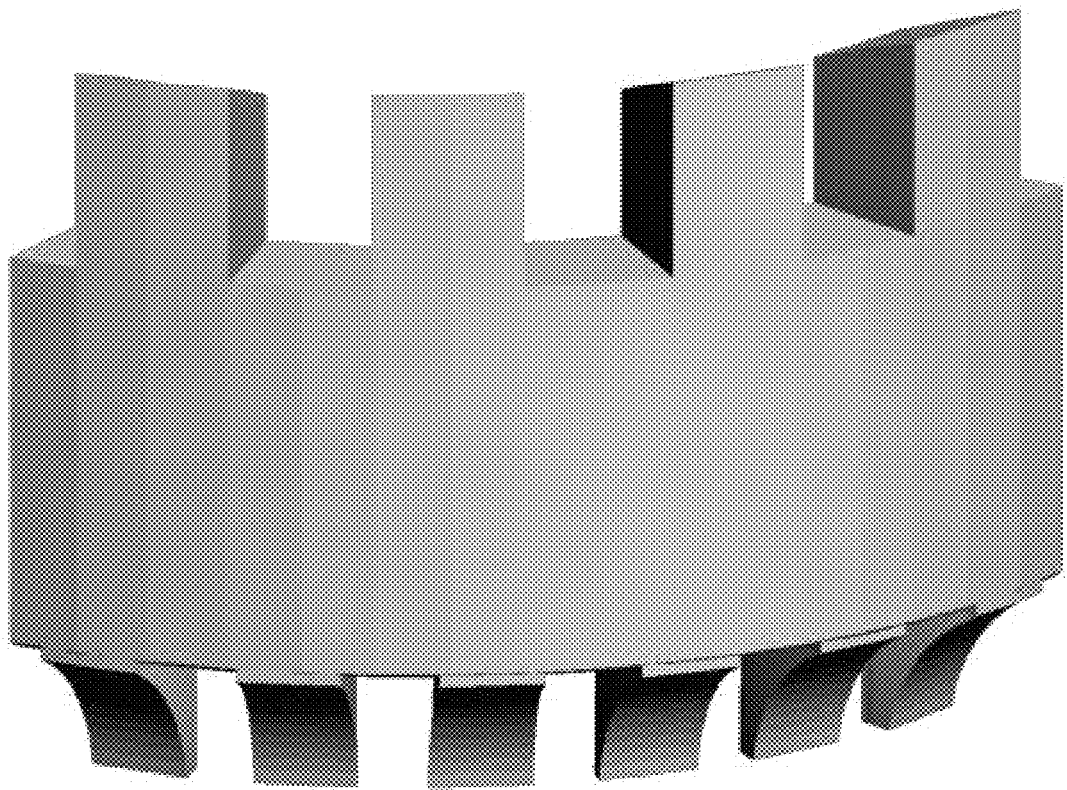
Figure 37:
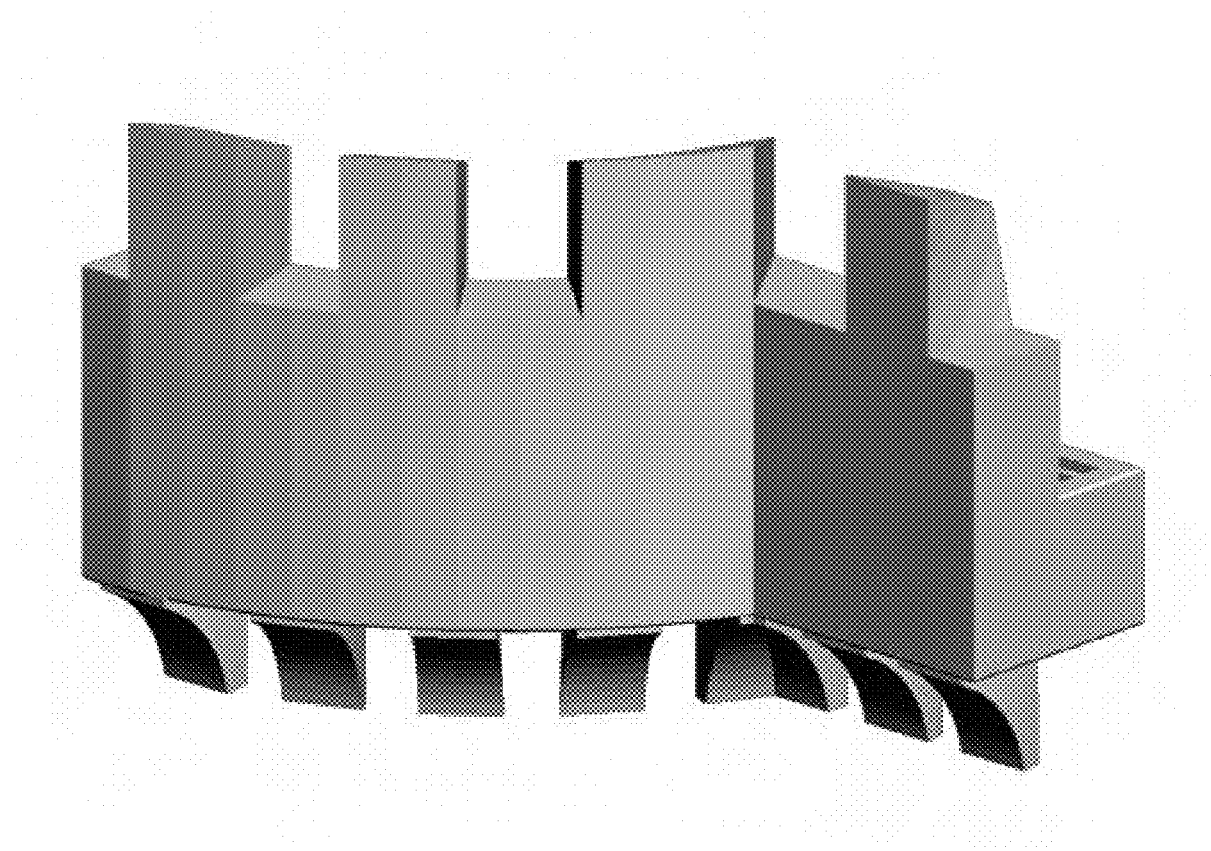
Figure 38:
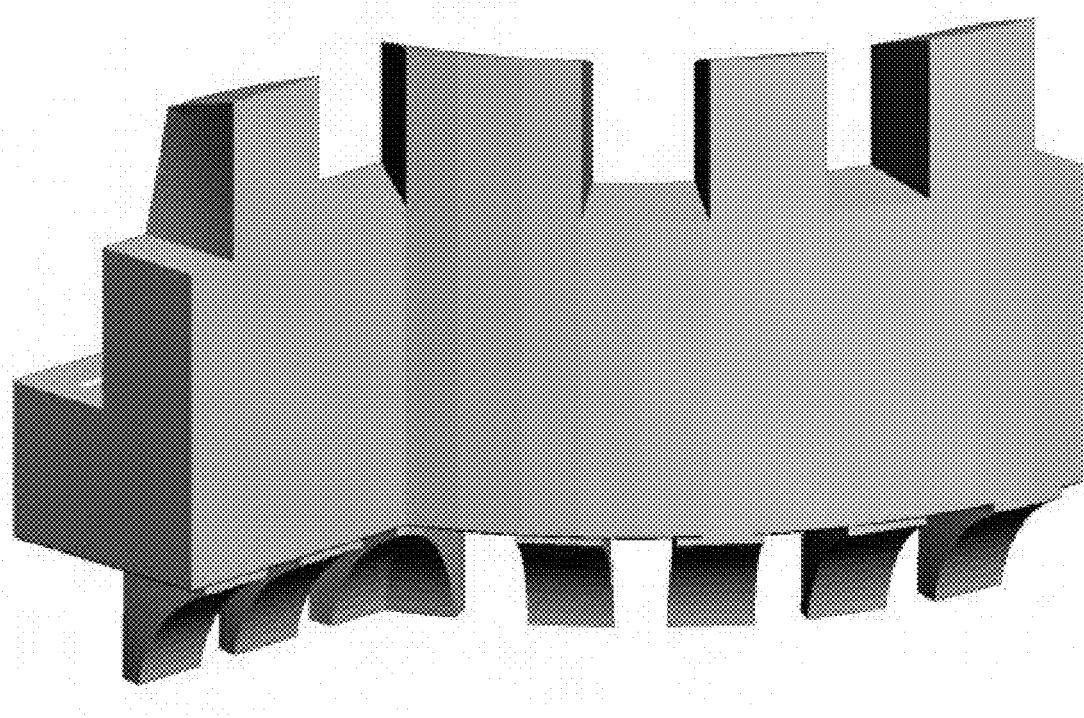
Figure 39:
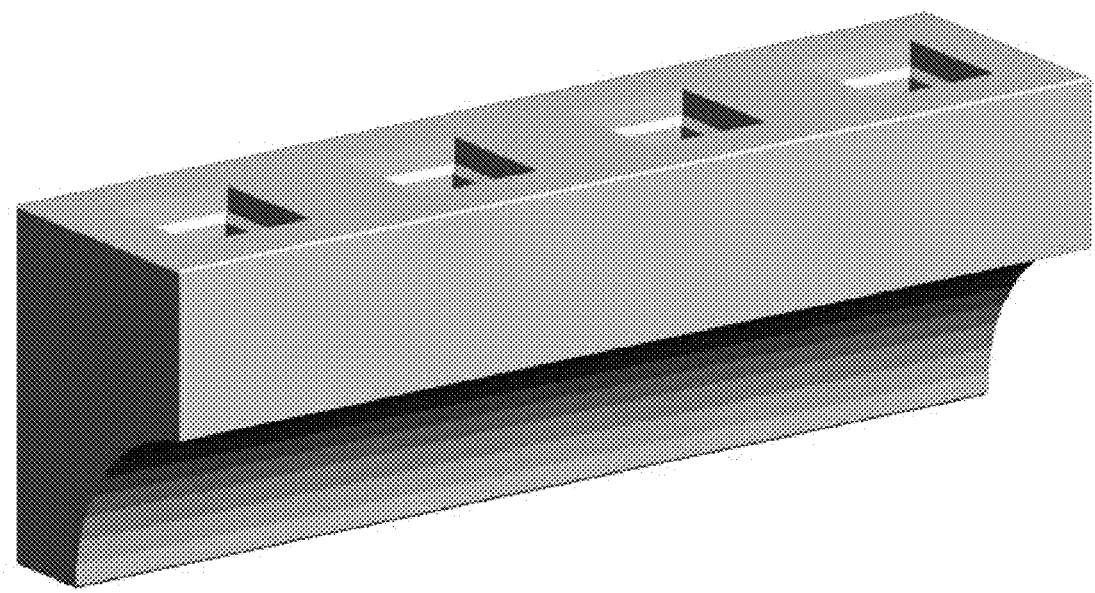
Figure 40:
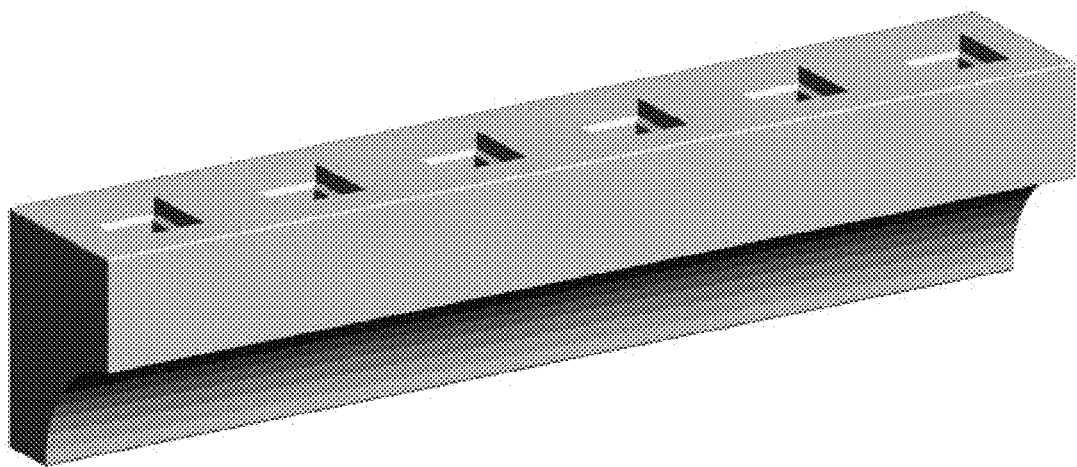
Figure 41:
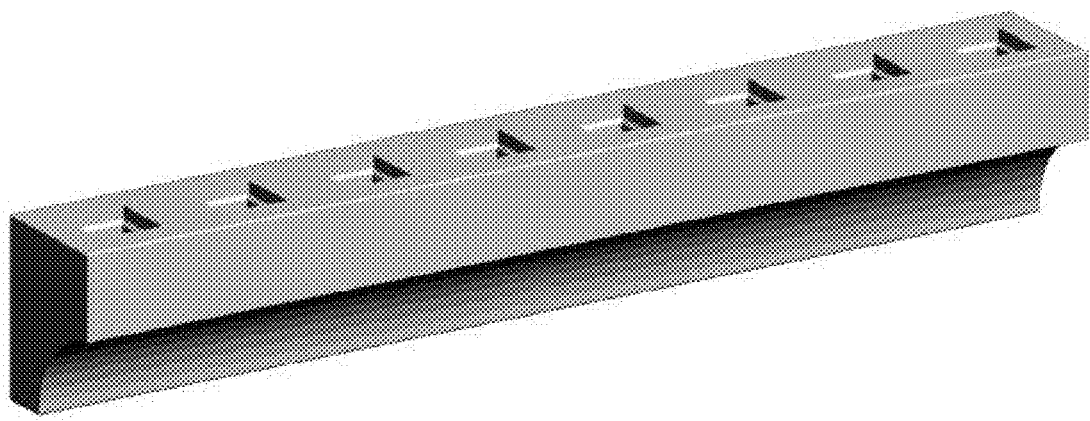
Figure 42:
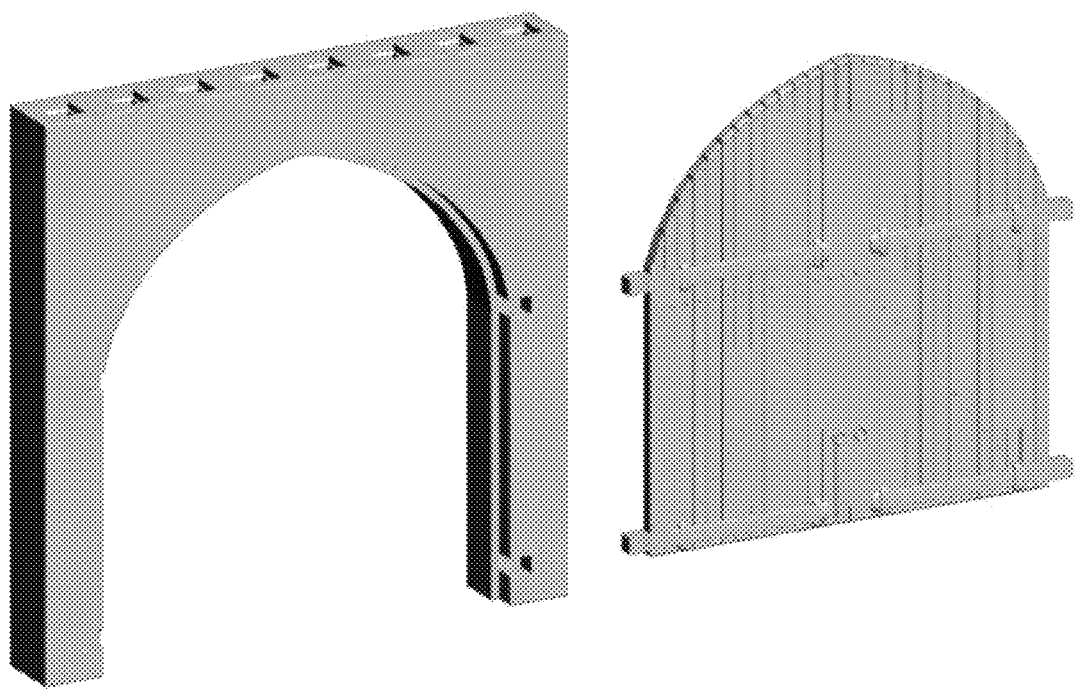
Figure 43:
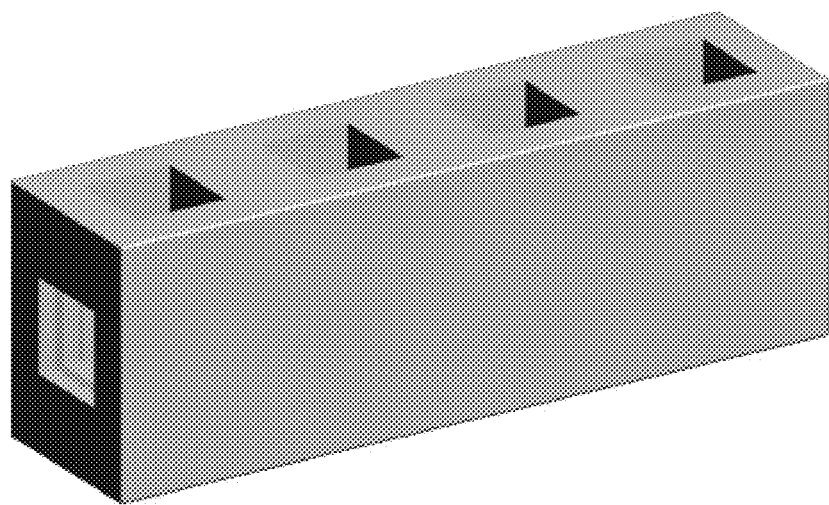
Figure 44:
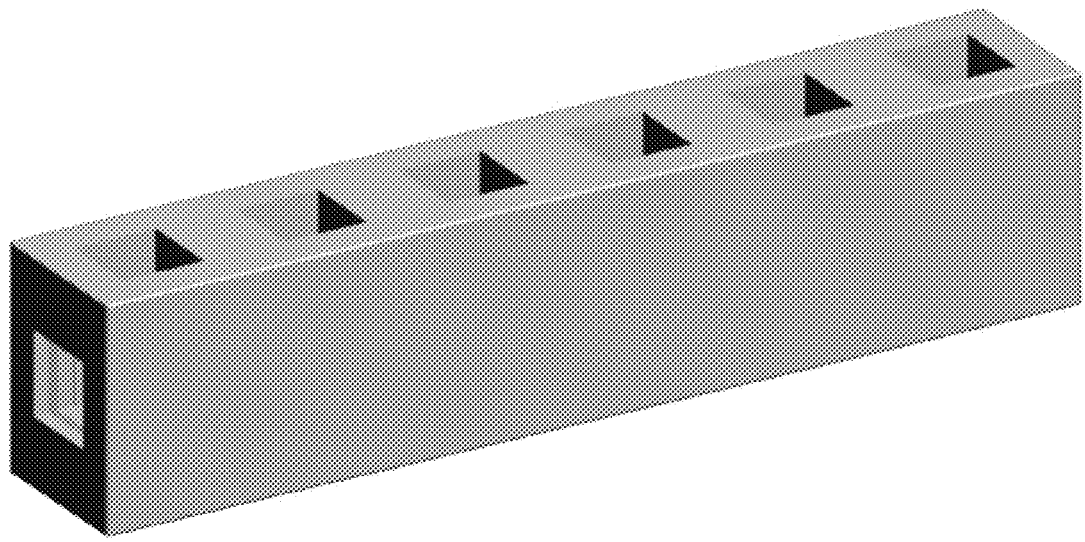
Figure 45:
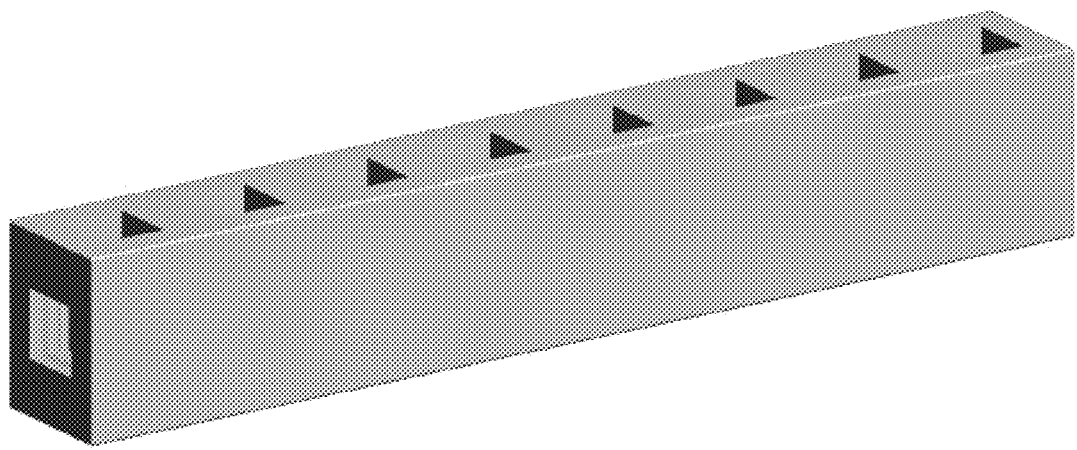
Figure 46:
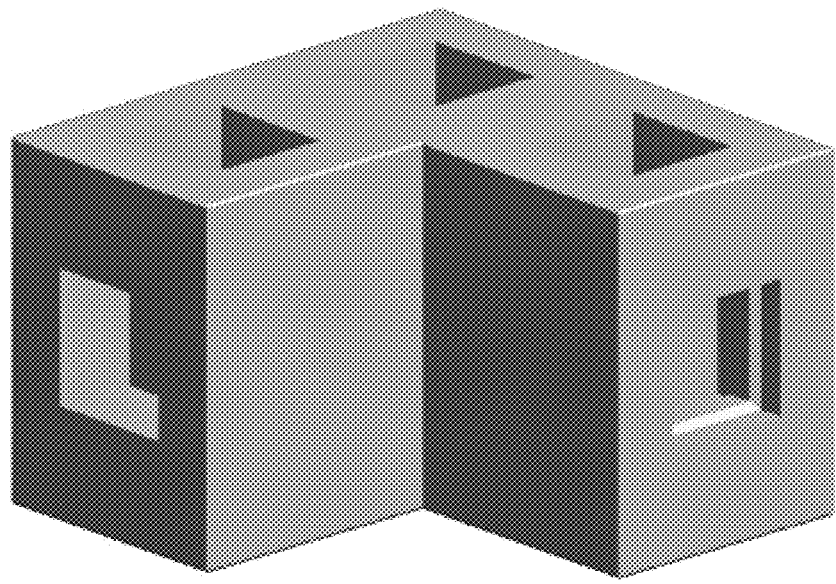
Figure 47:
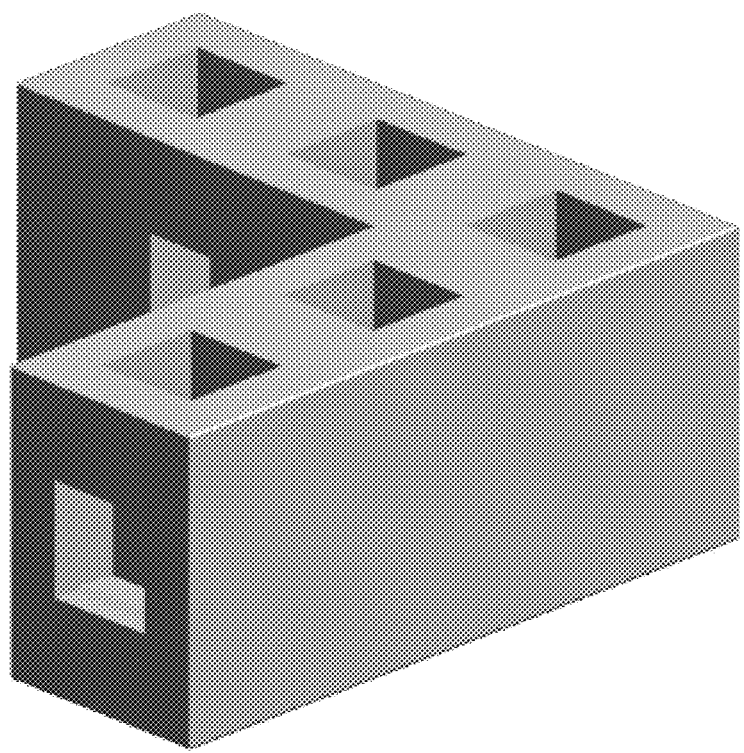
Figure 48:
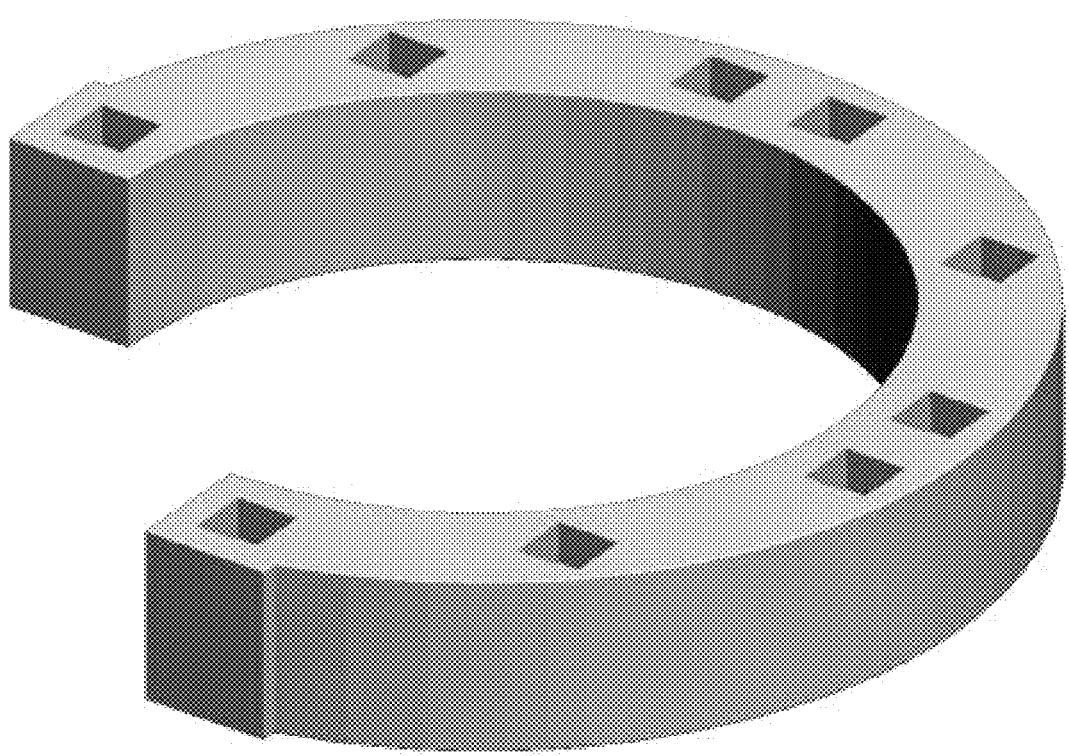
Figure 49:
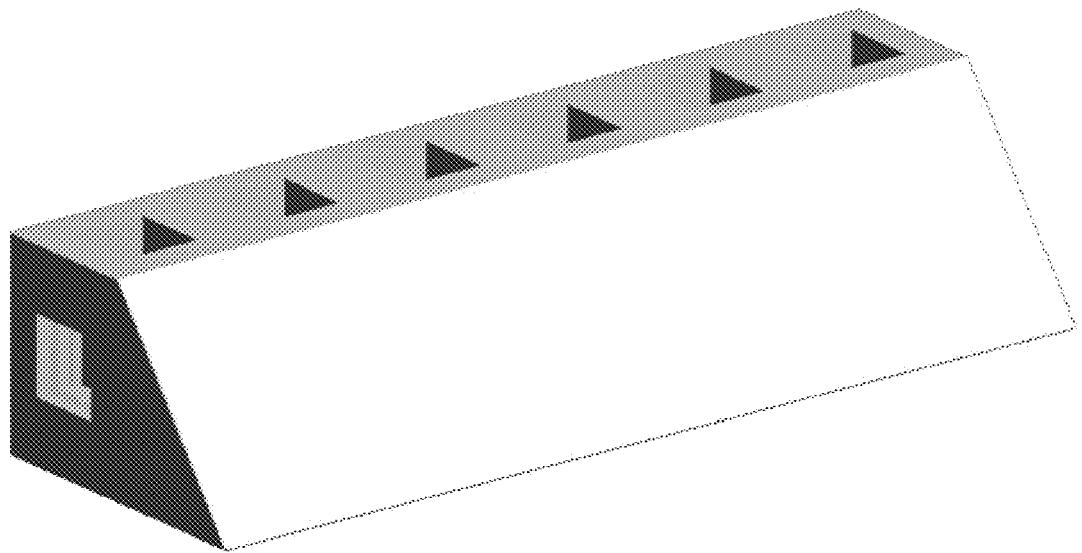
Figure 50:
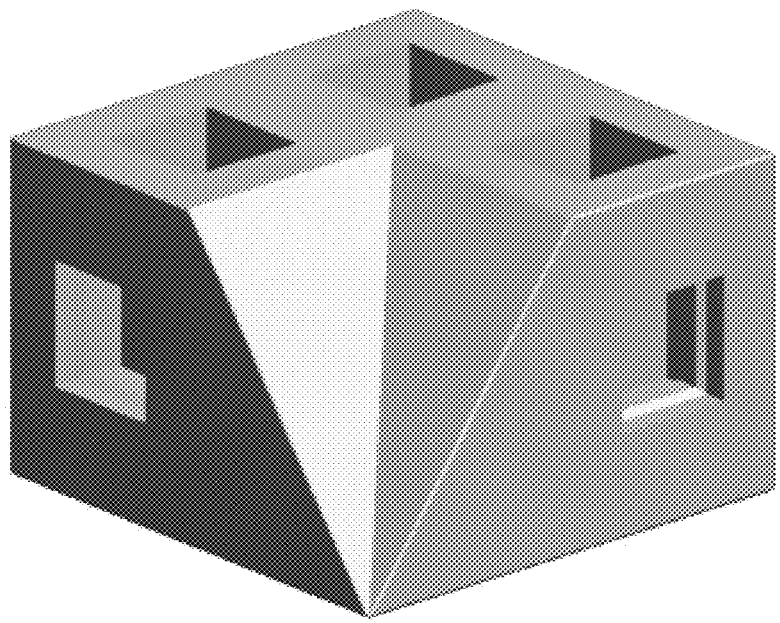
Figure 51:
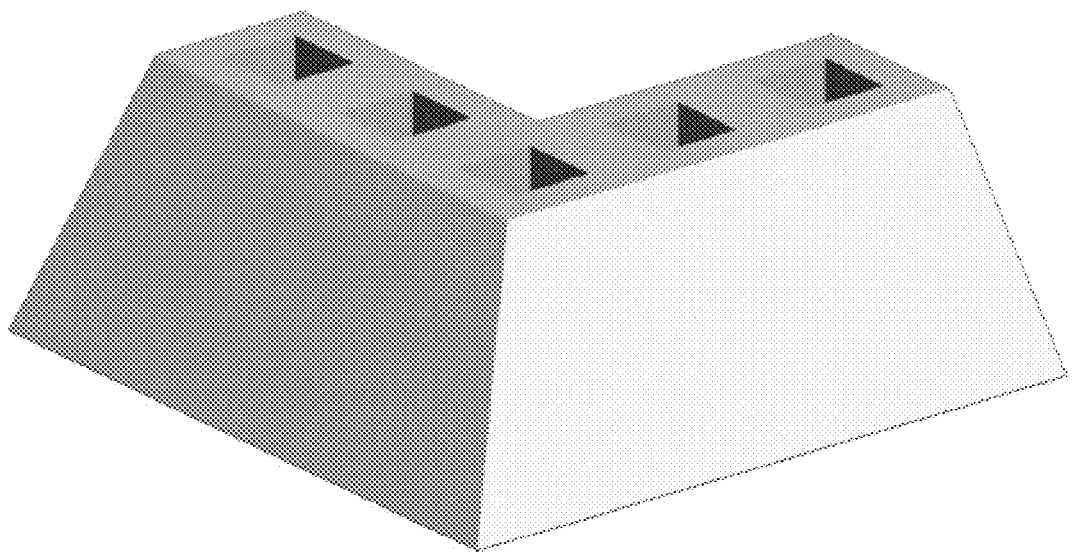
Figure 52:
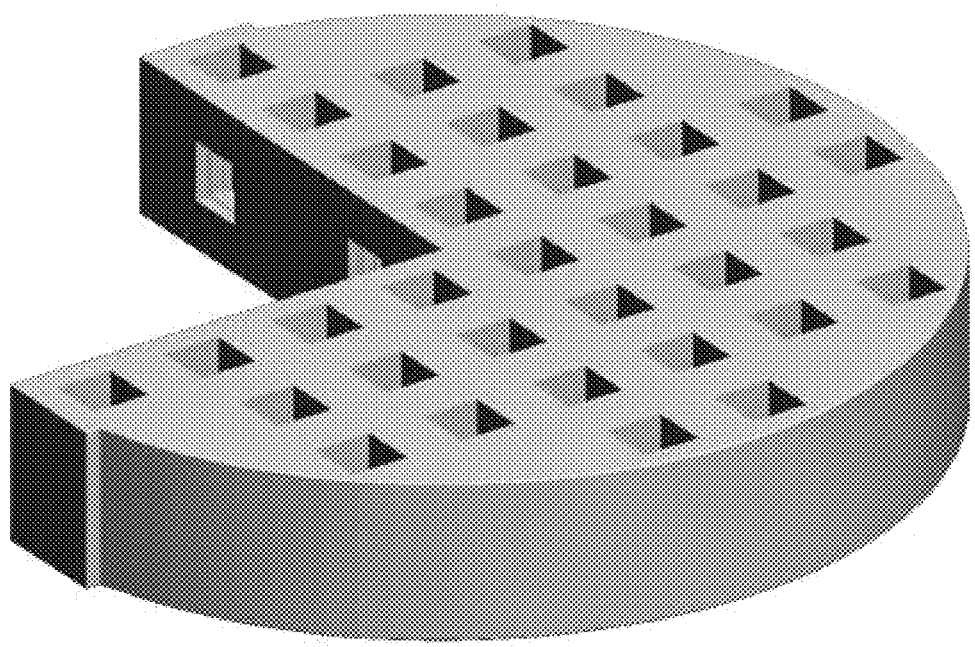
Figure 53:
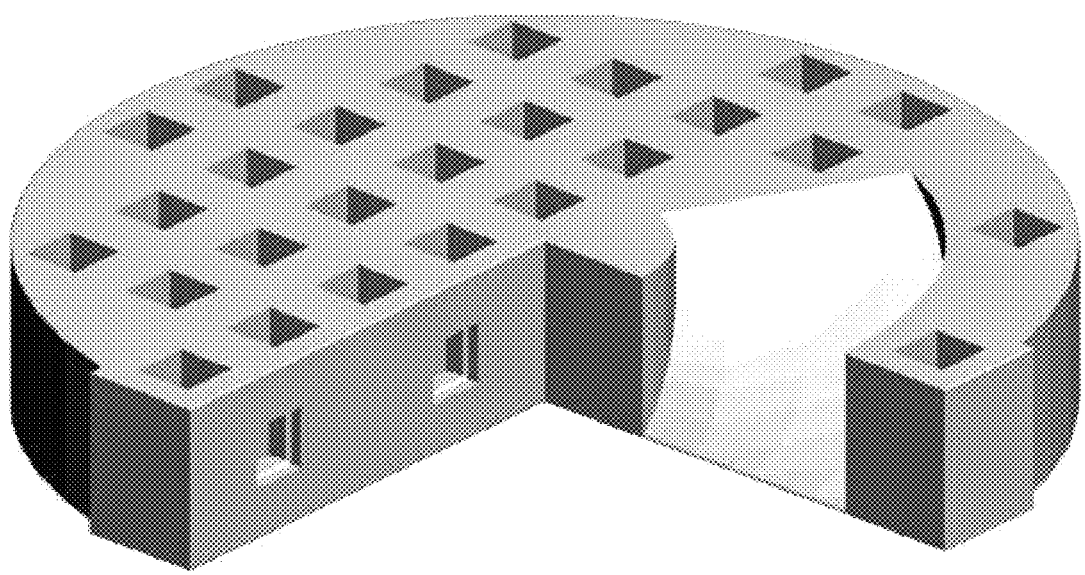
Figure 54:
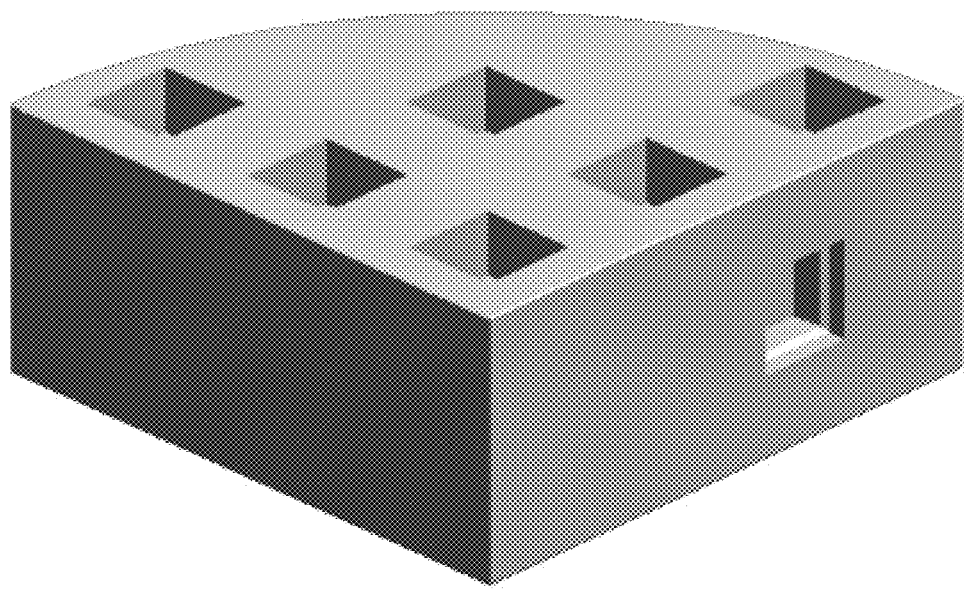
Figure 55:
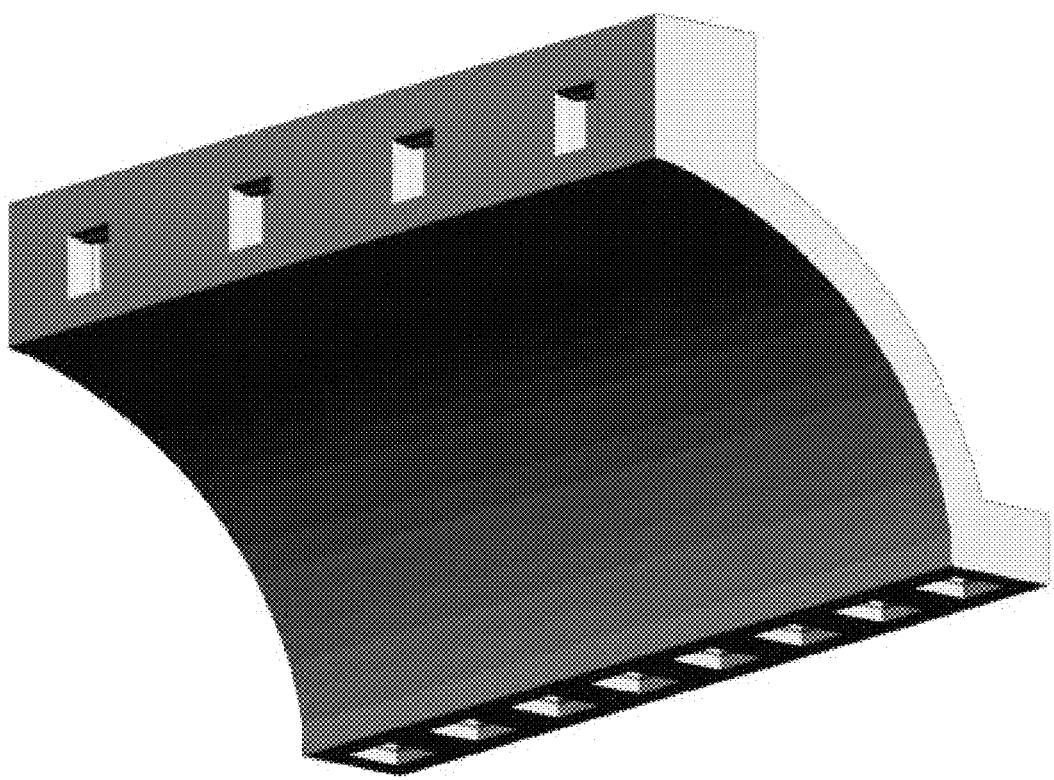
Figure 56:
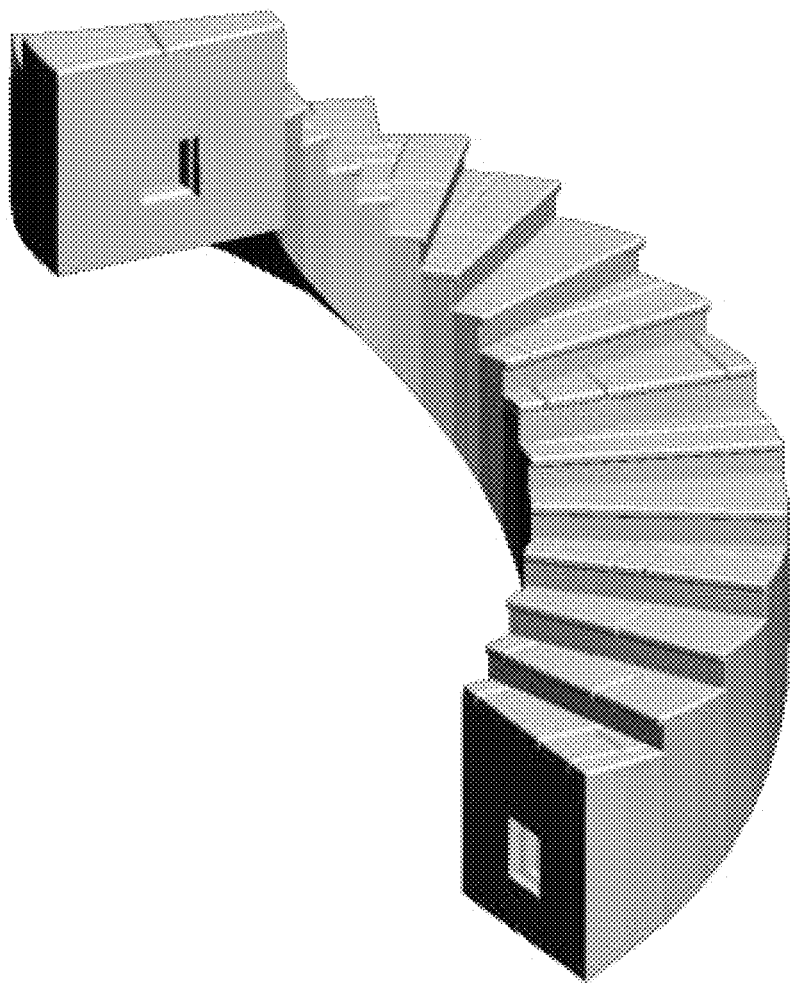
Figure 57:
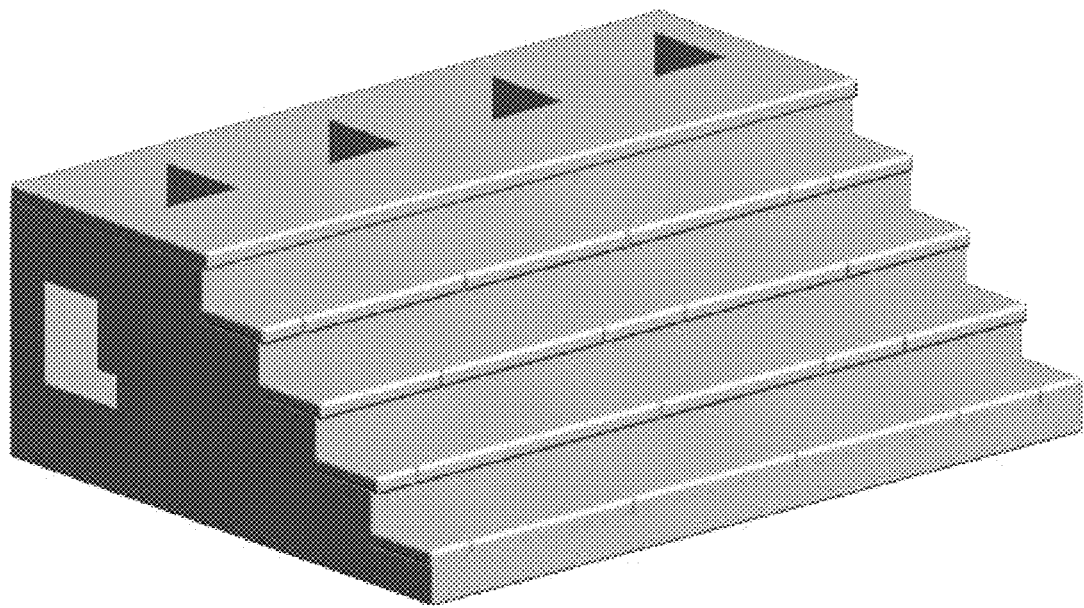
Figure 58:
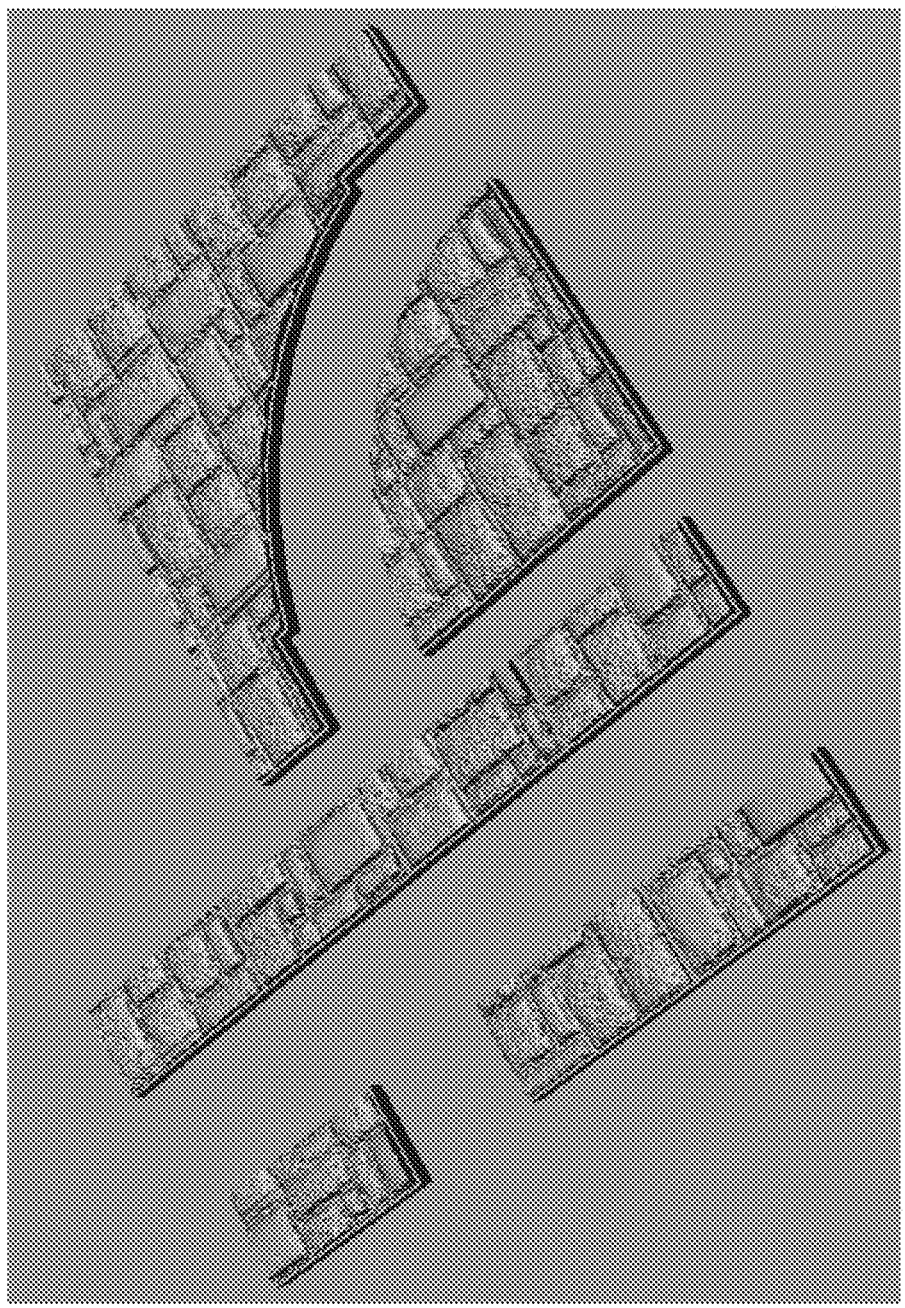
Figure 59:
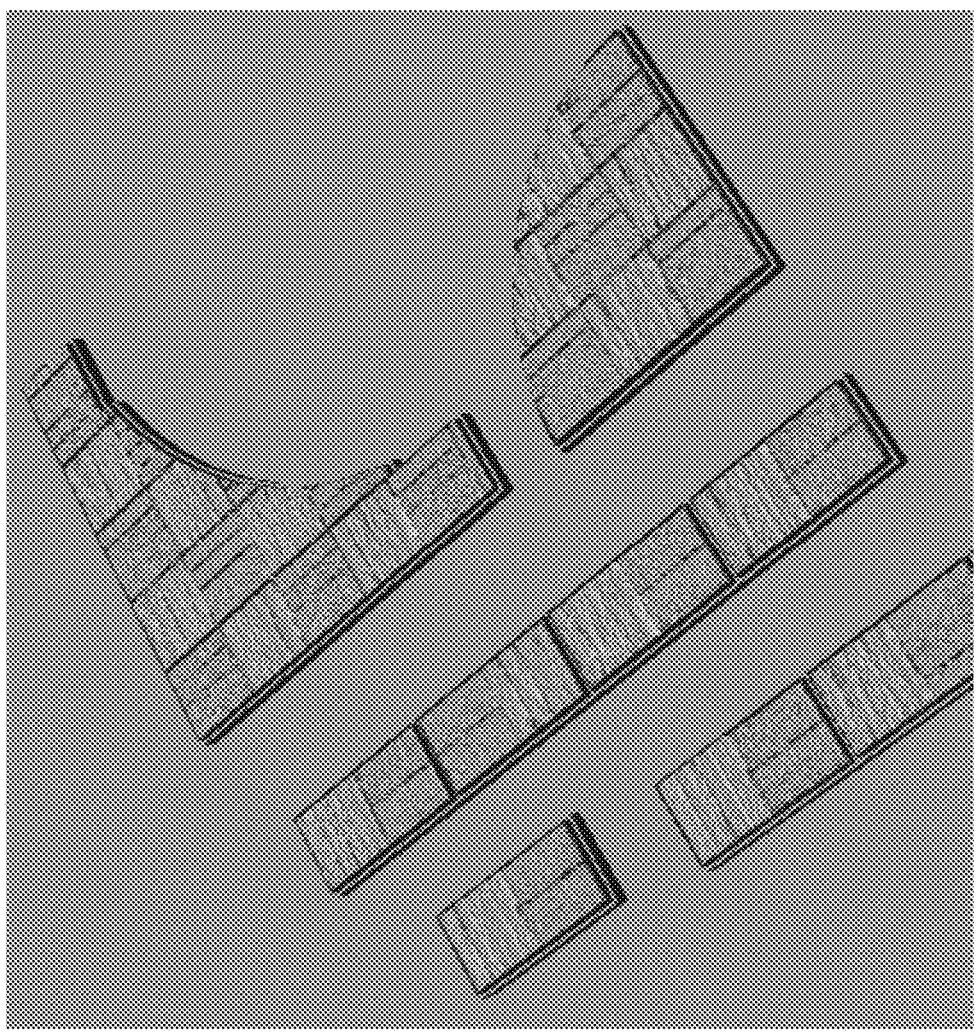
Figure 60:
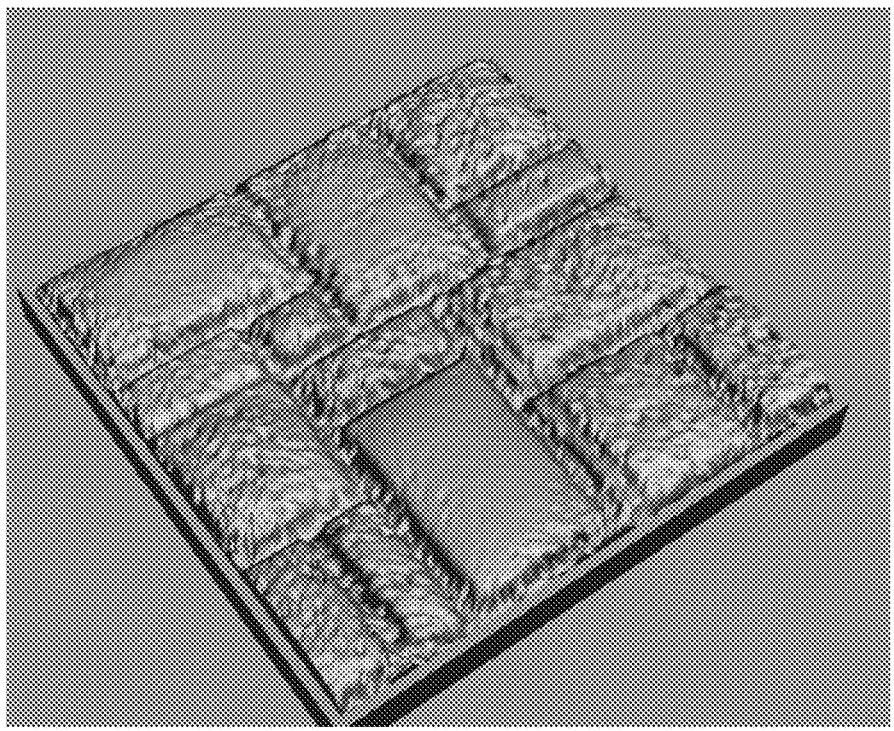
Figure 61:
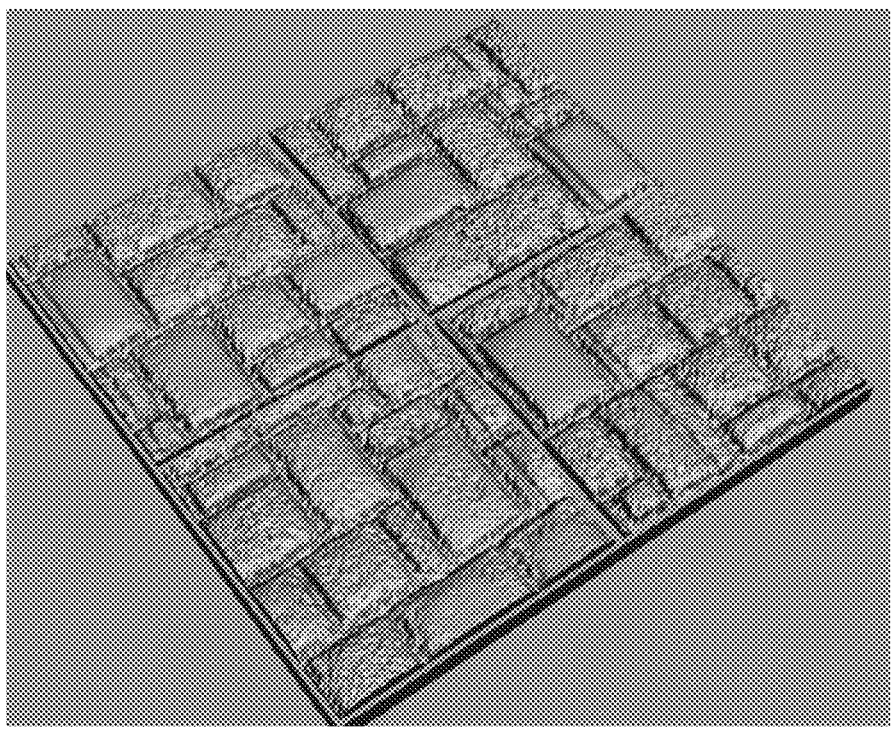
Figure 62:
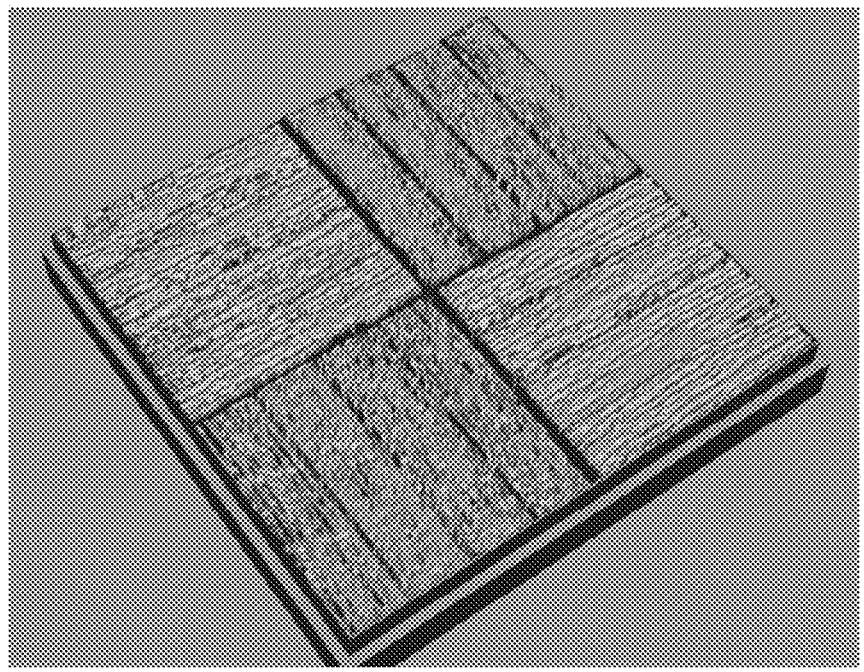
Figure 63:
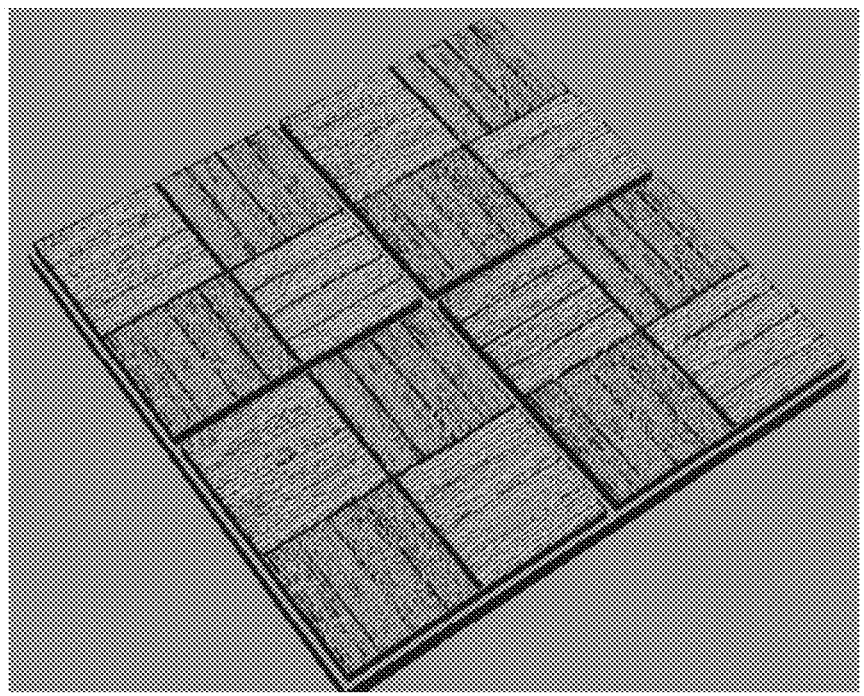
Figure 66:
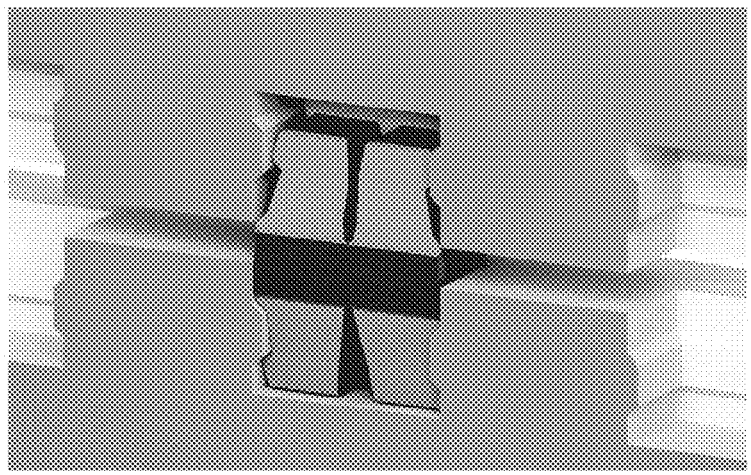
Figure 67:
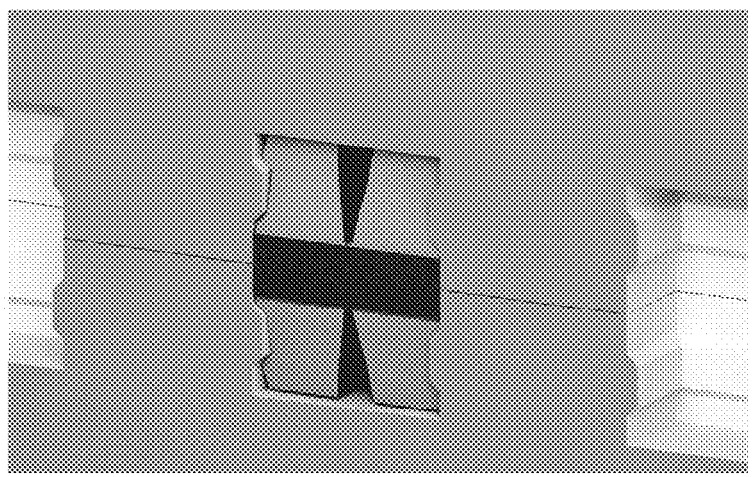
Figure 68:
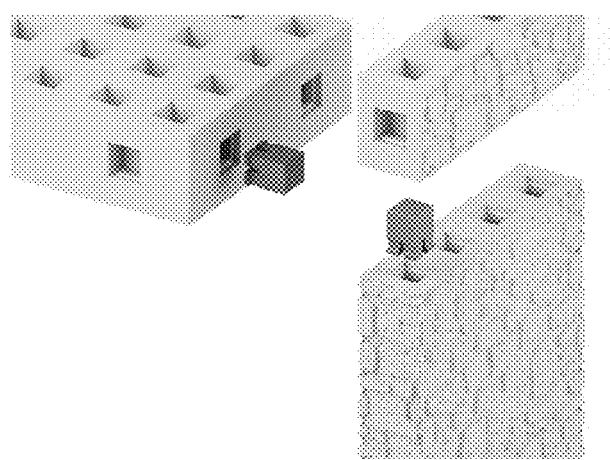
Figure 69:
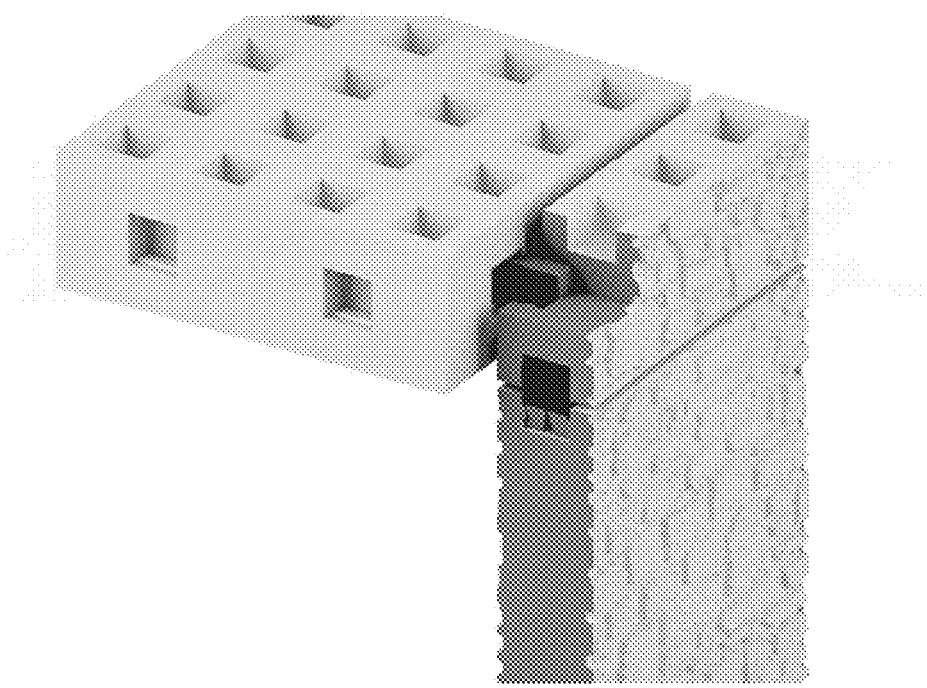
Figure 70:
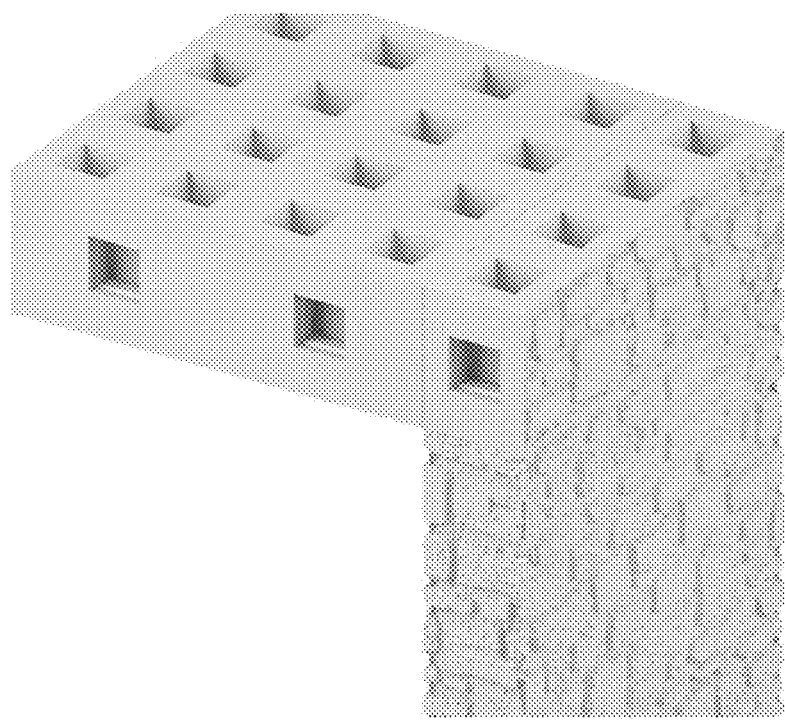
Figure 71:
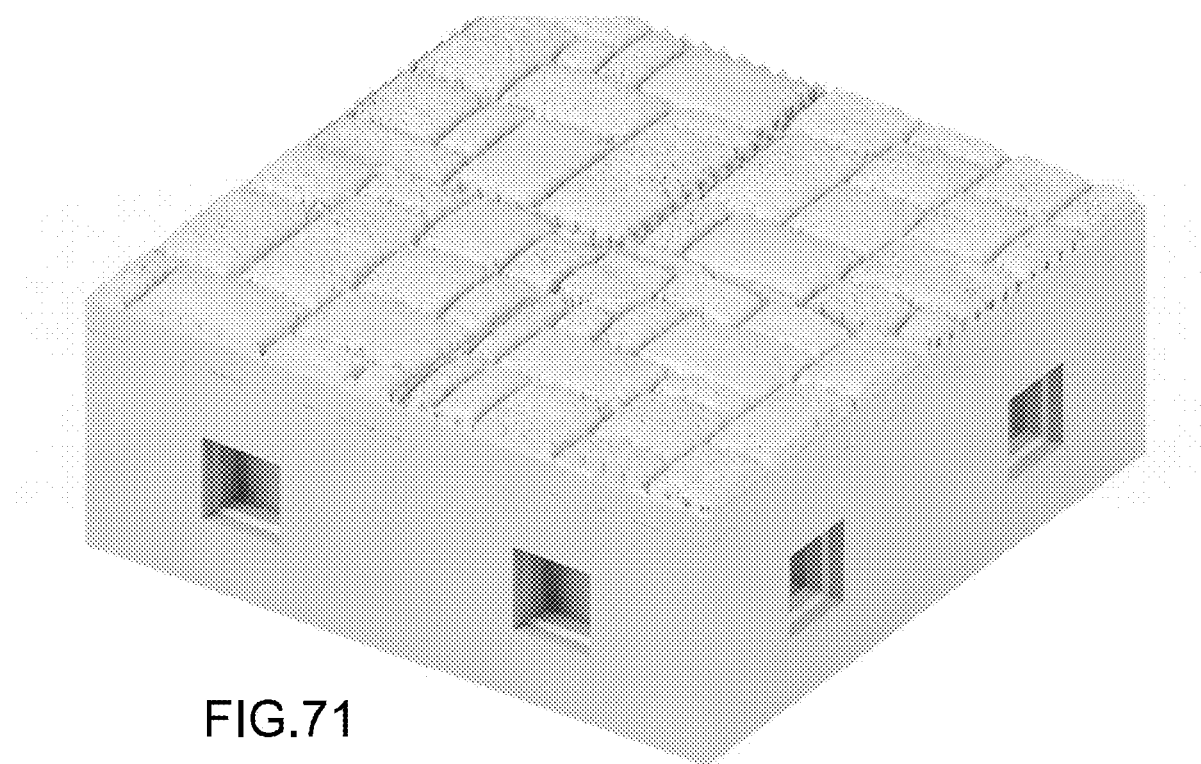
Figure 72:
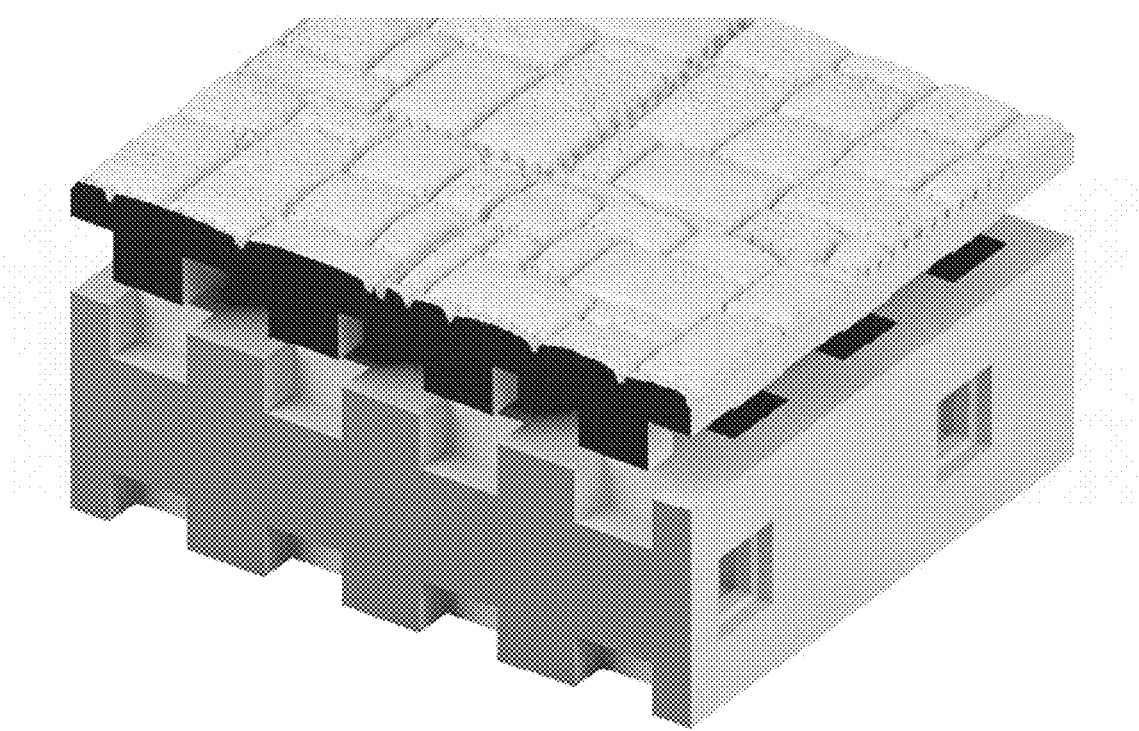
Figure 73:
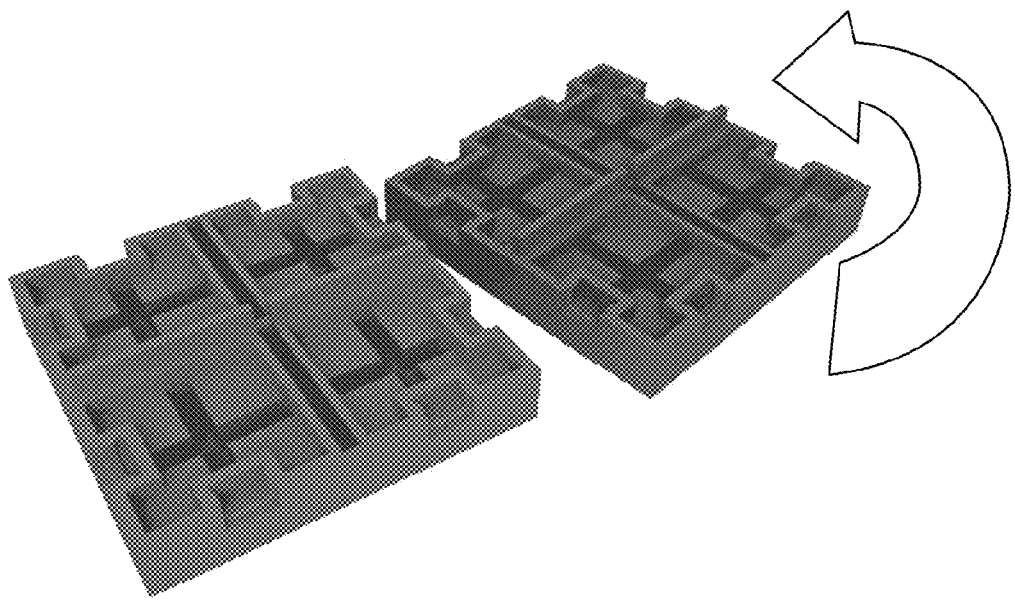
Figure 74:
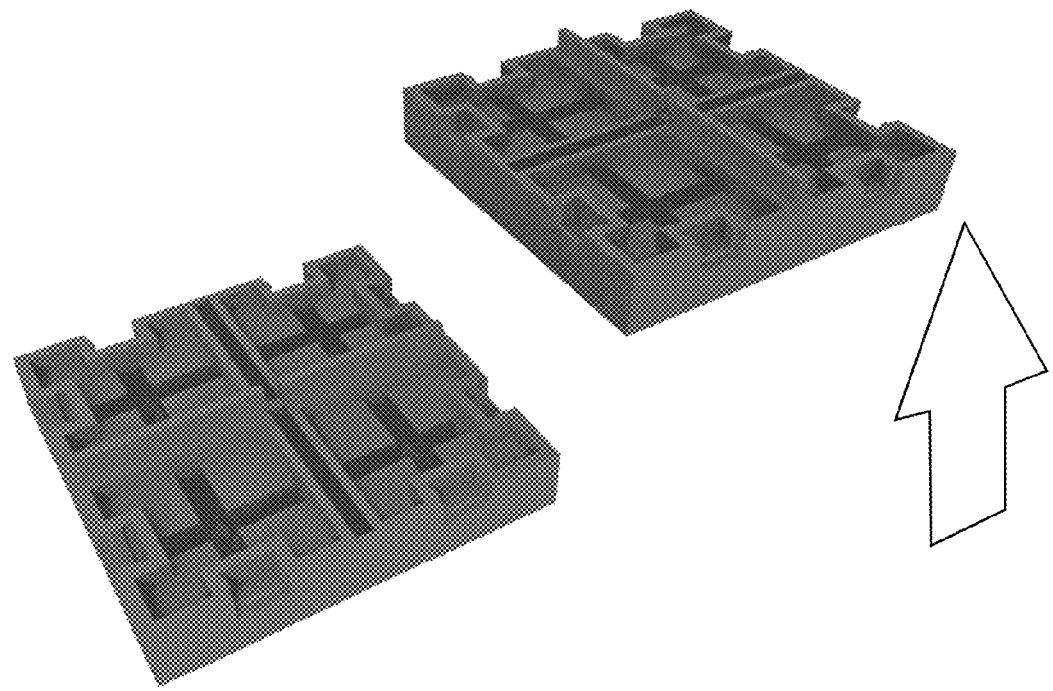
Figure 75:
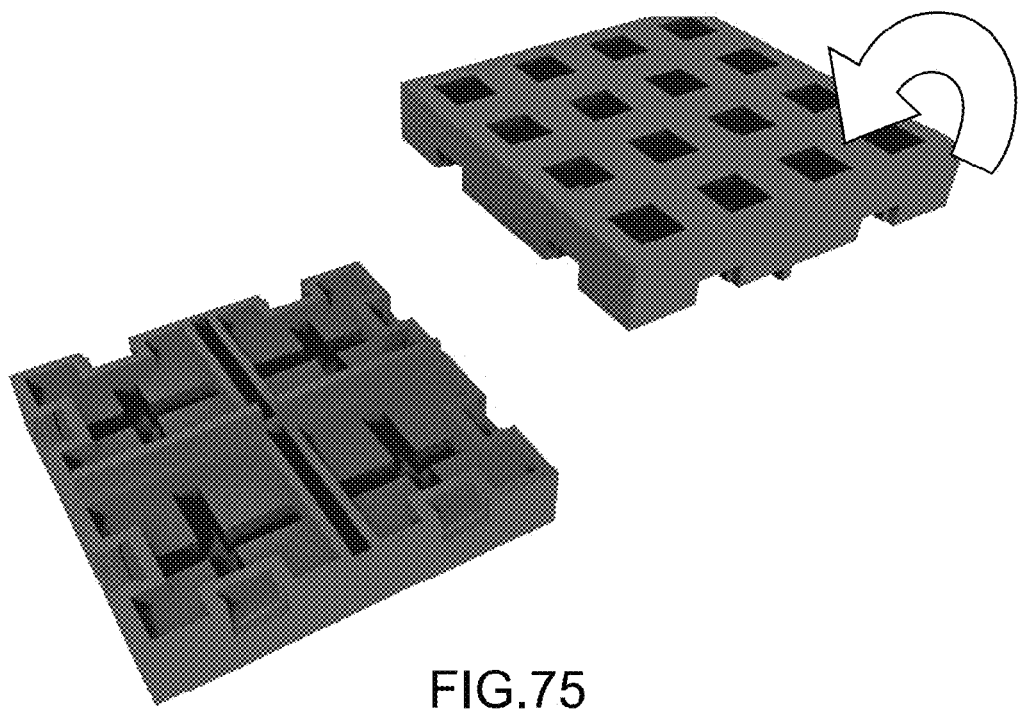
Figure 76:
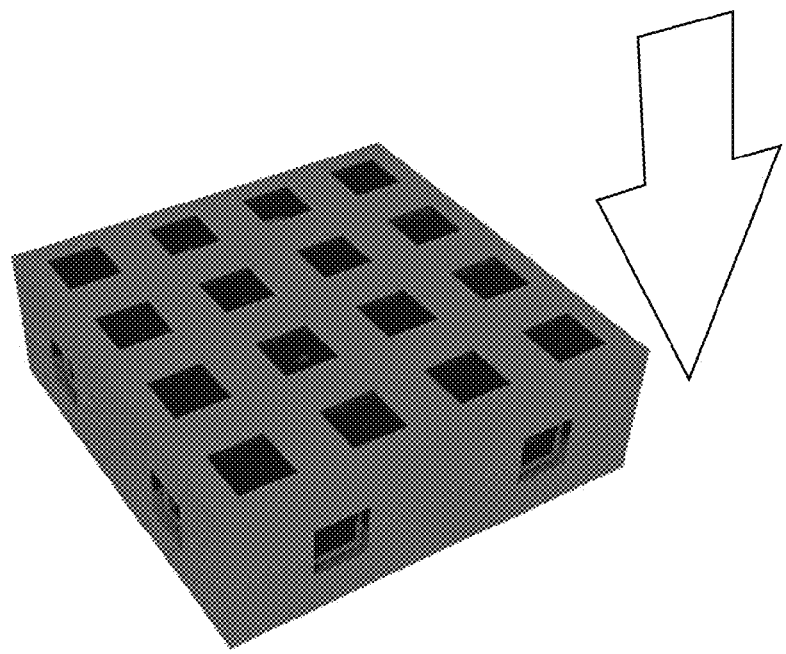
Figure 77:
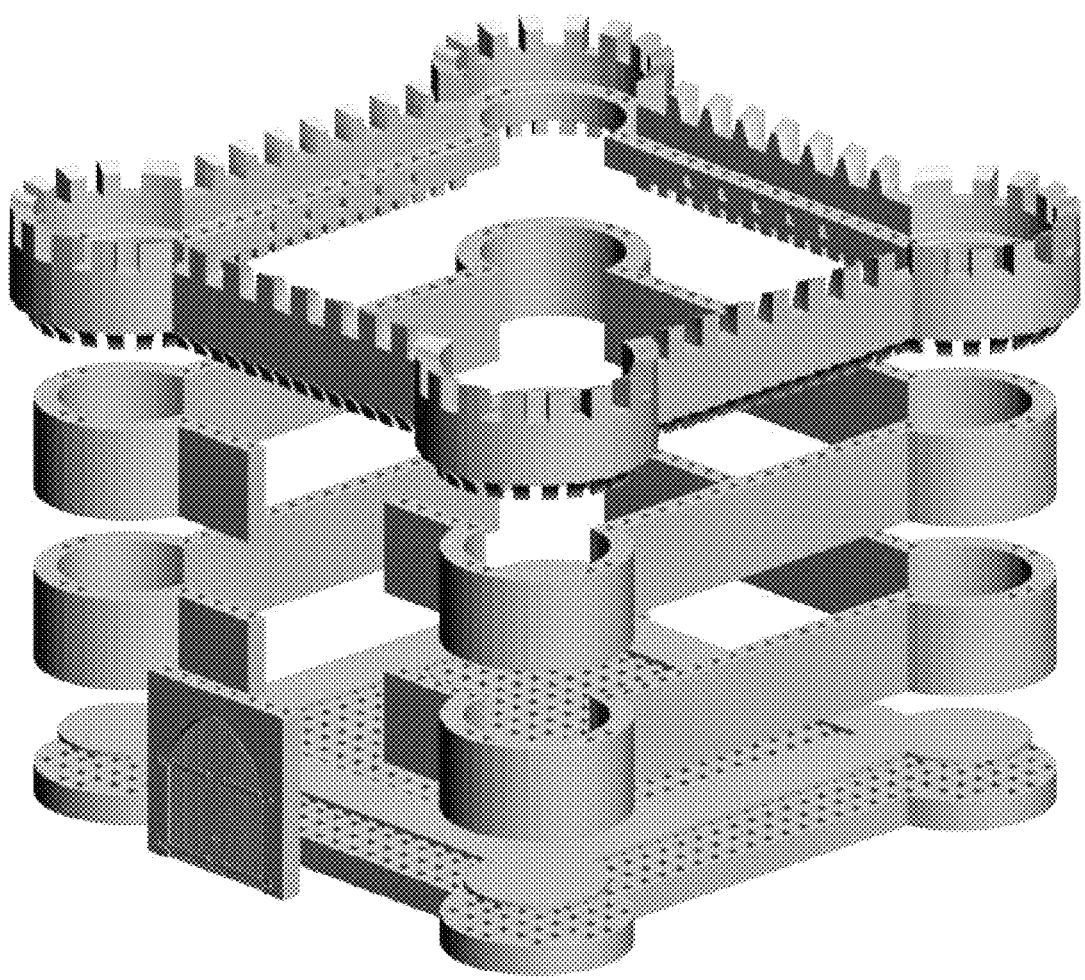
FIGS. 77-84 show various views of example assembled products and/or portions thereof, assembled, disassembled, and use in accordance with aspects of the present invention.
Figure 78:
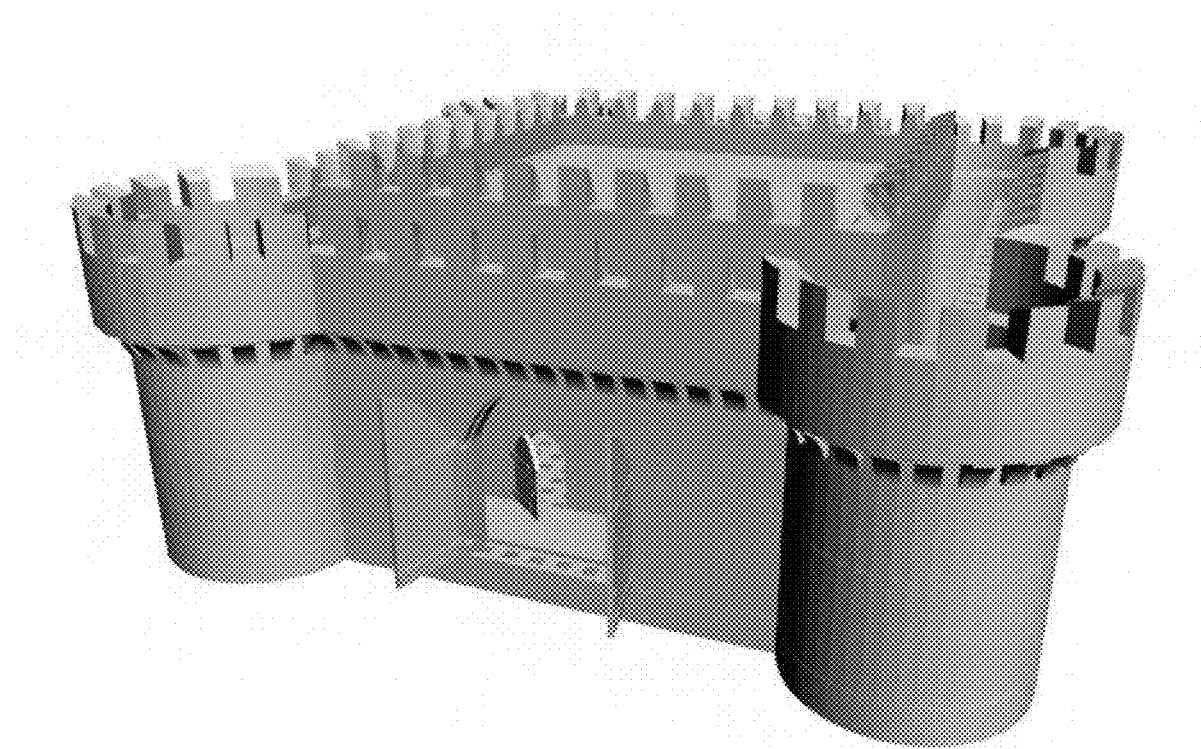
Figure 79:
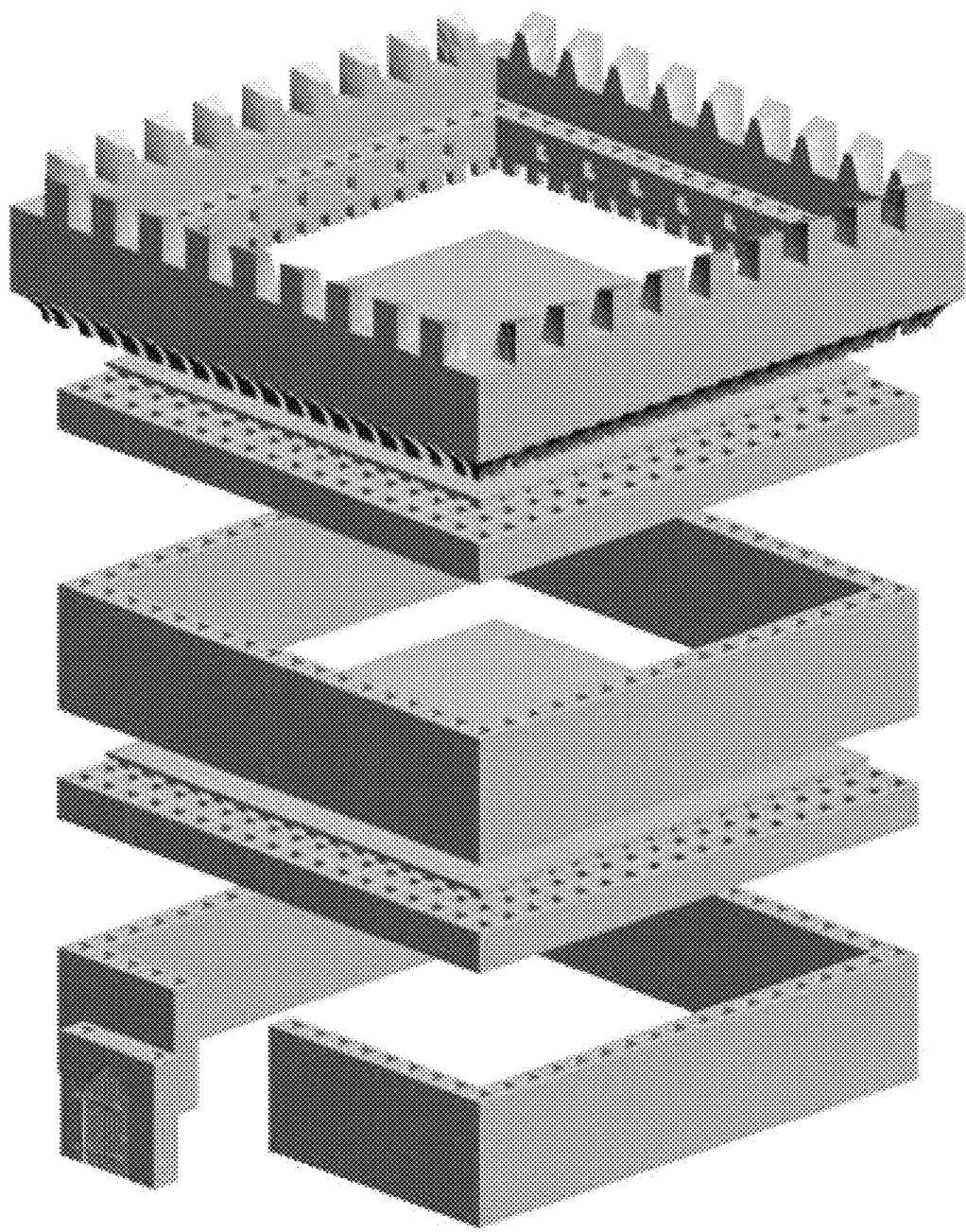
Figure 80:
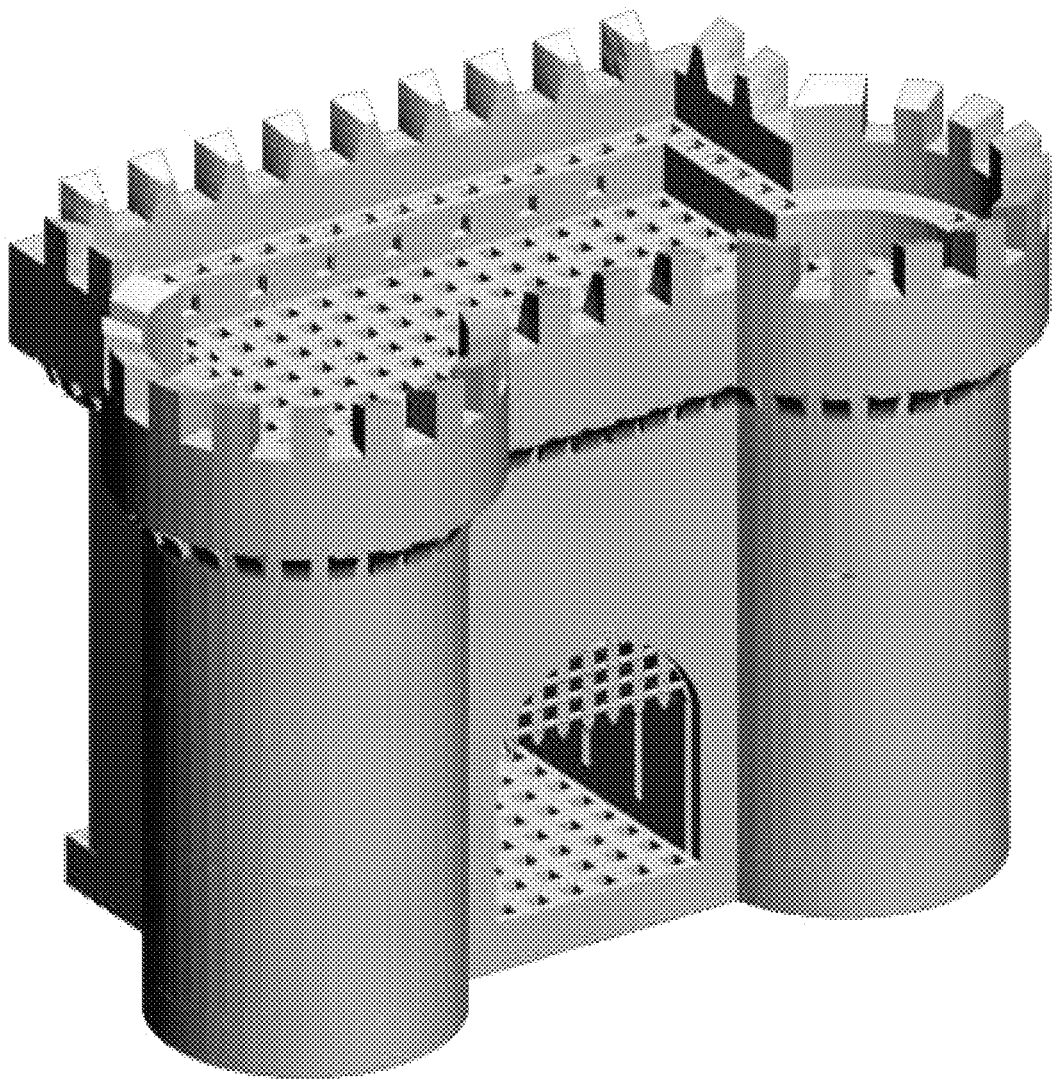
Figure 81:
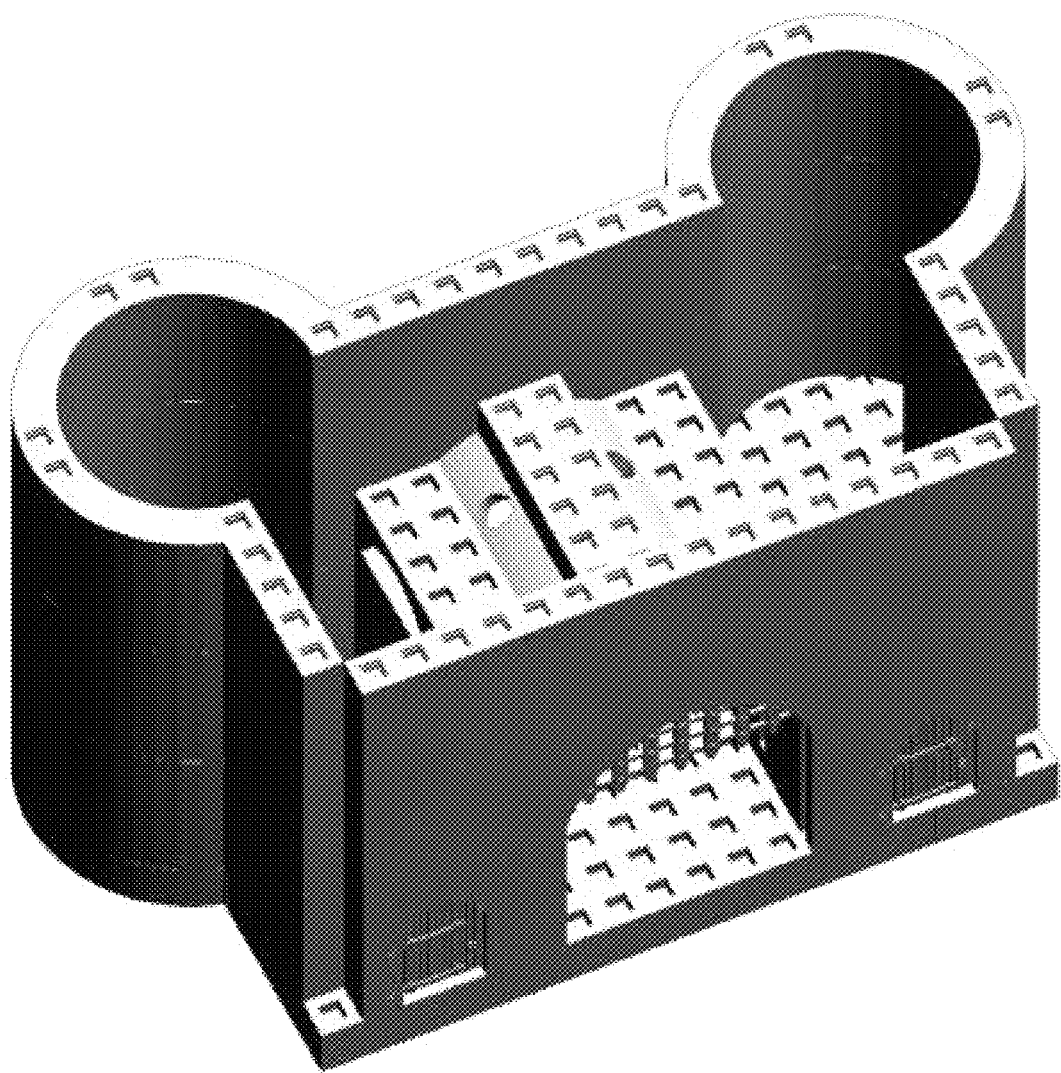
Figure 82:
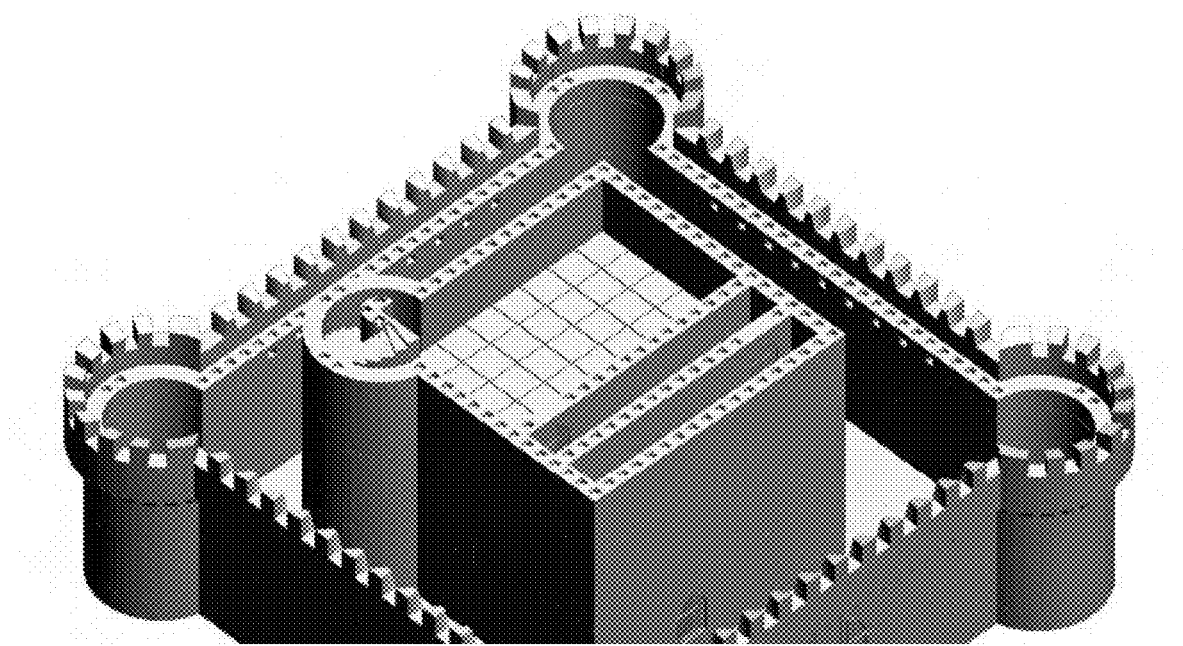
Figure 83:
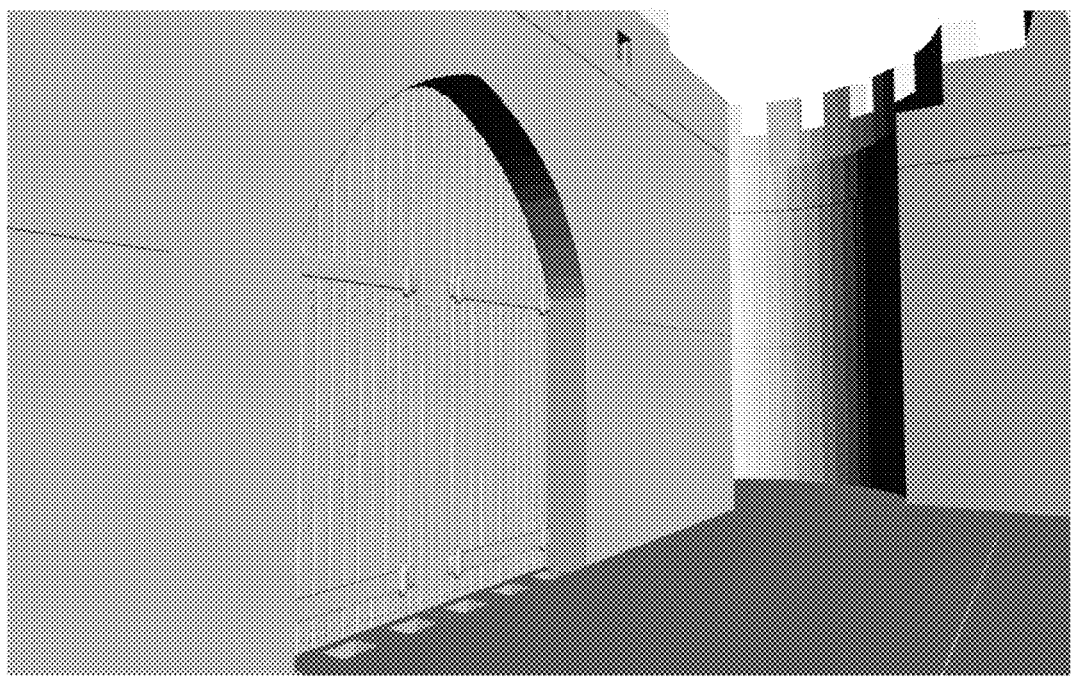
Figure 84:
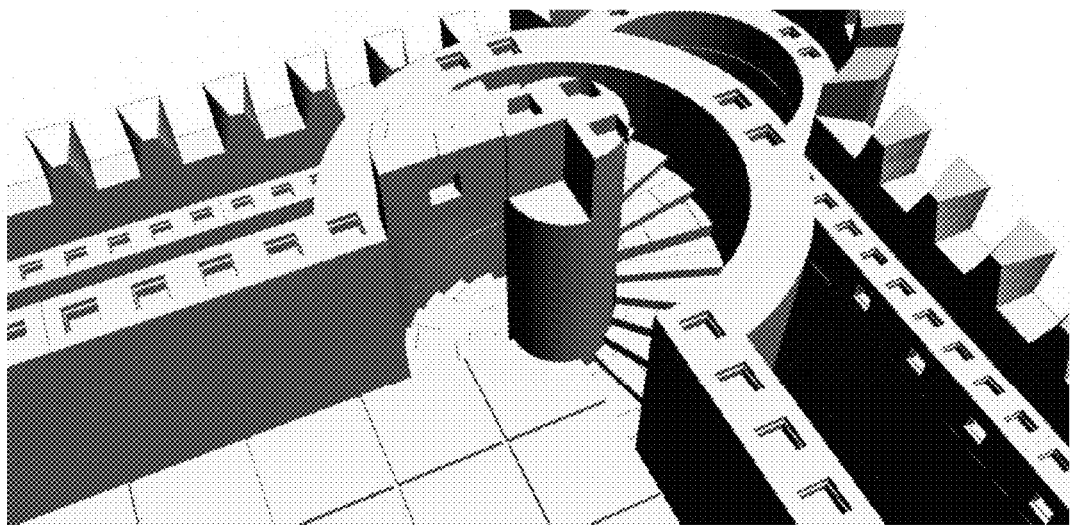

FIGS. 8A-8C show example perspective views of the Peg Type 1 mechanism for holding the product together. As further shown in FIGS. 9A-9F, example Peg Type 1 may be designed, for example, such that the male portion of each of the connectors has legs or extensions biased to an extended position, such that when inserted into the female opening in the D direction as shown in FIGS. 9A-9F, the legs or extensions biasedly engage a receiving slot shoulder in the female opening wall, thereby retaining the male legs or extensions within the female opening. In the example implementation shown in FIGS. 9A-9F, these legs may be positioned such that one or more of the legs engage the sides (flats) of the female openings in order to avoid, for example, detritus from the casting process that may be left in the corners of the cast pieces.

Example Peg Type 2 (as discussed further below) may also allow for slightly more displacement between connected pieces than example Peg Type 1, in order to allow for potential tolerance discrepancies among pieces. Once inserted, a second piece may be attached to the opposite end of the peg for a tight connection, similarly to as shown and discussed with regard to FIG. 7.

The pegs may be made from and/or incorporate various grades of plastic or other similar material, for example, to provide differing degrees of hardness, so as to achieve multiple holding strengths, depending upon the desired application. Pegs may be color coded or otherwise marked or indicated, such as to reflect different hardnesses and/or differing uses/applications.

FIGS. 10A-10F, 11, and 12 show an example second type connector mechanism (also interchangeably referred to herein as example Peg Type 2) usable in accordance with aspects of the present invention for holding pieces of the system together. As shown in FIGS. 10A-10F, example Peg Type 2 may operate similarly to example Peg Type 1, except that Peg Type 2 may be designed, for example, such that the male portion of each of the connectors has legs or extensions on one side only, which are biased to an extended position, so that when inserted into the female opening in the E direction, the legs or extensions biasedly engage a receiving slot shoulder in the female opening wall, thereby retaining the male extension within the female opening. Unlike some other example peg types disclosed herein, the E direction half of example Peg Type 3 may be generally smooth on its external surface and designed to slidably fit inside of the shoulders that are integral to the retention features of the female receiving opening. The slidable fit may be an interference fit to assist in semi-permanently retaining the E direction half within the female receiving opening. These features, among other things, allow a user to create a slidable fit with the E directionally engaged piece as shown in FIGS. 10A-10F above, but leaving the locking mechanism exposed in the E' direction so as to be able to lock only to the piece engaged from the E' direction.

As with some other variations disclosed herein, the example pegs of FIGS. 10A-10F may be made from and/or incorporate various grades of plastic or similar materials, for example, so as to provide different hardnesses to achieve multiple holding strengths depending upon the desired application, and they may be color coded or otherwise marked or indicated.

FIGS. 13A-13E, and 14 show a third example connection mechanism (also interchangeably referred to herein as example Peg Type 3) for holding various portions of the product together. Example Peg Type 3 may be designed such that the male portion of the connectors have legs or extensions biased to an extended position, such that when inserted into the female opening in the F direction, the legs or extensions biasedly engage a receiving slot shoulder in the female opening wall, thereby retaining the male extension within the female opening. This example variation of the connection mechanism may operate similarly to that of example Peg Type 1, for example, except that, in this variation, the legs or extensions may be positioned such that they engage into the corners of the female receiver (as opposed to with the flat side portions of the cavity, as shown and described with respect to example Peg Type 1) for minimal displacement between connected pieces. Once inserted, a second piece may be attached to the opposite end of the peg for a tight connection.

As with some other variations disclosed herein, the example pegs of FIGS. 13A-13E, and 14 may be made from and/or incorporate various grades of plastic or similar materials, for example, so as to provide different hardnesses to achieve multiple holding strengths depending upon the desired application, and they may be color coded and/or otherwise marked or indicated.

FIGS. 15-63 show perspective and other views of various example connectible product portions for use in accordance with aspects of the present invention. Pairs of each of these example connectible product portions may be assembled together in various orientations, for example, using connectors and connection system features in accordance with aspects of the present invention, so as to form structures or other items.

FIGS. 64A-64C and 65-76 show perspective, partial cutaway, and other views of example connectible product portions and connectors, and systems therefore, in various states of partial and full assembly, in accordance with aspects of the present invention.

FIGS. 77-84 show various views of example assembled products and/or portions thereof, in accordance with aspects of the present invention.

Although exemplary aspects of the present invention have now been discussed in accordance with the above advantages, it will be appreciated by one of ordinary skill in the art that these examples are merely illustrative and that numerous variations and/or modifications may be made without departing from the spirit or scope hereof.

The invention claimed is:

1. A system for assembling a plurality of pieces into a structure, the system comprising:

a first structural assembly component, wherein the first structural assembly component comprises a surface having at least a portion thereof visible in an assembled orientation, the first structural assembly component having a first female cavity with an open end, the cavity having an extending shoulder portion, the shoulder portion including an inclined ramp extending away from the open end, and the cavity having a retaining section adjacent the shoulder portion opposite the open end;

a second structural assembly component, wherein the second structural assembly component comprises a surface having at least a portion thereof visible in the assembled orientation, the second structural assembly component having a second female cavity with an open end, the cavity having an extending shoulder portion, the shoulder portion including an inclined ramp extending away from the open end, and the cavity having a retaining section adjacent the shoulder portion opposite the open end; and a male connector portion having a first extending end, a second extending end, and a central body portion having at least one planar surface extending between the first extending end and the second extending end, the at least one planar surface having a width extending an entire width of the central body portion, wherein the width of the at least one planar surface extends transverse to the direction of extension of the first and second extending ends, at least one of the first or second extending ends of the male connector portion having at least a pair of legs, each of the at least a pair of legs being biased to a first extended position from each other of the at least a pair of legs, wherein each of the at least a pair of legs comprises a planar portion that extends in a direction parallel to a direction of extension of the at least one planar surface of the central body portion, wherein the planar portion of each of the legs has an outwardly extending tab at a first end thereof, the outwardly extending tab having a first ramped portion and a second ramped portion, wherein the first ramped portion and the second ramped portion each comprises a generally planar ramped surface, wherein the first ramped portion is contiguous with the second ramped portion, wherein the first ramped portion and the second ramped portion extend in a direction toward the first end, and wherein the first ramped portion and the second ramped portion are angled relative to the planar portion;

the male connector portion being configured to be slidably received at its first end in the first female cavity of the first structural assembly component and configured to be slidably received at its second end in the second female cavity of the second structural assembly component, such that the first structural assembly component is abuttably connected to the second structural assembly component;

the male connector portion being configured such that, for each end having at least a pair of legs, the legs are slidably receivable within either the first female cavity or the second female cavity so as to deflect opposite their bias along the inclined ramp, and to biasedly re-extend into the retaining section upon being received past the ramp, such that the male connector is biasedly retained within the receiving first or second female cavity, and wherein in the assembled orientation, the central body portion is contained within the first female cavity and the second female cavity such that the male connector portion is contained within the first or second female cavity.

2. The system of claim 1, wherein each extending tab cooperates with the shoulder portion of each female cavity to retain the male connector within the female cavity upon the male connector potion being received within the first female cavity or the second female cavity.

3. The system of claim 1, wherein each female cavity has a generally square cross-sectionally shaped opening.

4. The system of claim 3, wherein the at least a pair of legs includes four legs.

5. The system of claim 4, wherein each of the four legs is configured to slidably pass along one of the side walls of the generally square cross-sectionally shaped openings when the male connector portion is slidably received within the female cavity.

6. The system of claim 4, wherein each of the four legs is configured to slidably pass along two adjacent side walls of the generally square cross-sectionally shaped openings when the male connector portion is slidably received within the female cavity.

7. The system of claim 1, wherein at least one of the first or second extending ends of the male connector portion comprises a generally planar external surface extension configured to be slidably received within the female cavity.

8. The system of claim 7, wherein the generally smooth external surface extension is configured to be slidably received within the female cavity via an interference fit.

* * * * *